US006738750B2

(12) United States Patent
Stone et al.

(10) Patent No.: US 6,738,750 B2
(45) Date of Patent: May 18, 2004

(54) METHOD OF USING A NETWORK OF COMPUTERS TO FACILITATE AND CONTROL ACCESS OR ADMISSION TO FACILITY, SITE, BUSINESS, OR VENUE

(76) Inventors: Lucinda Stone, 6610 Regalbluff, Dallas, TX (US) 75240; Michael A. Dean, 6610 Regalbluff, Dallas, TX (US) 75240

( * ) Notice: Subject to any disclaimer, the term of this patent is extended or adjusted under 35 U.S.C. 154(b) by 0 days.

(21) Appl. No.: 10/165,094

(22) Filed: Jun. 7, 2002

(65) Prior Publication Data

US 2002/0169694 A1 Nov. 14, 2002

Related U.S. Application Data

(62) Division of application No. 09/480,303, filed on Jan. 10, 2000, now Pat. No. 6,446,045.

(51) Int. Cl.[7] .............................................. G06F 17/60
(52) U.S. Cl. ............................ 705/26; 705/40; 235/384
(58) Field of Search ............................... 705/26, 27, 40; 235/384

(56) References Cited

U.S. PATENT DOCUMENTS

| 5,193,656 A | | 3/1993 | Boes | |
|---|---|---|---|---|
| 5,504,321 A | * | 4/1996 | Sheldon | ........................ 705/5 |
| 5,581,461 A | | 12/1996 | Coll et al. | |
| 5,613,012 A | | 3/1997 | Hoffman et al. | |
| 5,615,277 A | | 3/1997 | Hoffman | |
| 5,724,520 A | | 3/1998 | Goheen | |
| 5,787,186 A | | 7/1998 | Schroeder | |
| 5,794,207 A | | 8/1998 | Walker et al. | |
| 5,797,126 A | | 8/1998 | Helbling et al. | |
| 5,845,261 A | | 12/1998 | McAbian | |
| 5,870,723 A | | 2/1999 | Pare, Jr. et al. | |
| 5,878,139 A | * | 3/1999 | Rosen | ........................ 705/26 |
| 5,878,141 A | | 3/1999 | Daly et al. | |
| 5,884,277 A | | 3/1999 | Khosla | |
| 5,893,076 A | | 4/1999 | Hafner et al. | |

(List continued on next page.)

FOREIGN PATENT DOCUMENTS

JP     2001-117986 A   *   4/2001   ........... G06F/17/60

OTHER PUBLICATIONS

"Media Metrix Moviefone.com One of the Top 15 Fastest Growing Sites on the Web", Dec. 23, 1999, Business Wire.*
Soriano, Cesar, "Get Jump on 'Menace' Tickets", Apr. 30, 1999, USA Today, p. 5E.*
"MovieFone, Inc. Announces Circuit–Wide Licensing Agreement With United Artists Theatre Circuit", Oct. 13, 1998, Business Wire.*
"City Cinemas and MovieFone Launch www.city–cinemas.com", Jul. 1, 1998, Business Wire.*
"General Cinema, MovieFone Pact for Teleticketing", May 4, 1998, Business Wire.*

*Primary Examiner*—Bryan Jaketic
(74) *Attorney, Agent, or Firm*—Henry Croskell

(57) ABSTRACT

The present invention is a method and apparatus that allows for the verification and substantiation of the purchase of access or admission to those facilities, sites, businesses, venues, sporting events, or reserved services that traditionally have controlled access by means of tickets, passes, admission documents, reservations, reservation confirmations, or other substantiation. The invention provides several methods for the buyer to provide an ID at the time of purchase, which is then transmitted electronically to the facility, site, business, venue, sporting event, or reserved service. That buyer ID is then confirmed by the facility, site, business, or venue by means of readers or scanners of the magnetic, smart, or optical ID cards or by other electronic means. This confirmation may automatically result in the printing of the tickets, passes, admission documents, reservation confirmations, or other documents required for admittance or automatic and immediate physical admittance of the buyer or ID holder.

11 Claims, 35 Drawing Sheets

U.S. PATENT DOCUMENTS

| | | | |
|---|---|---|---|
| 5,946,646 A | | 8/1999 | Schena et al. |
| 5,953,705 A | * | 9/1999 | Oneda .......................... 705/5 |
| 6,044,353 A | * | 3/2000 | Pugliese, III ................. 705/5 |
| 6,094,640 A | * | 7/2000 | Goheen ........................ 705/5 |
| 6,101,477 A | * | 8/2000 | Hohle et al. .................. 705/5 |
| 6,119,096 A | * | 9/2000 | Mann et al. ................. 705/40 |
| 6,223,166 B1 | * | 4/2001 | Kay ............................ 705/26 |
| 6,233,565 B1 | * | 5/2001 | Lewis et al. ................. 705/26 |
| 6,240,396 B1 | * | 5/2001 | Walker et al. ............... 705/26 |
| 6,269,348 B1 | | 7/2001 | Pare, Jr. et al. |
| 2001/0018660 A1 | | 8/2001 | Sehr |

* cited by examiner

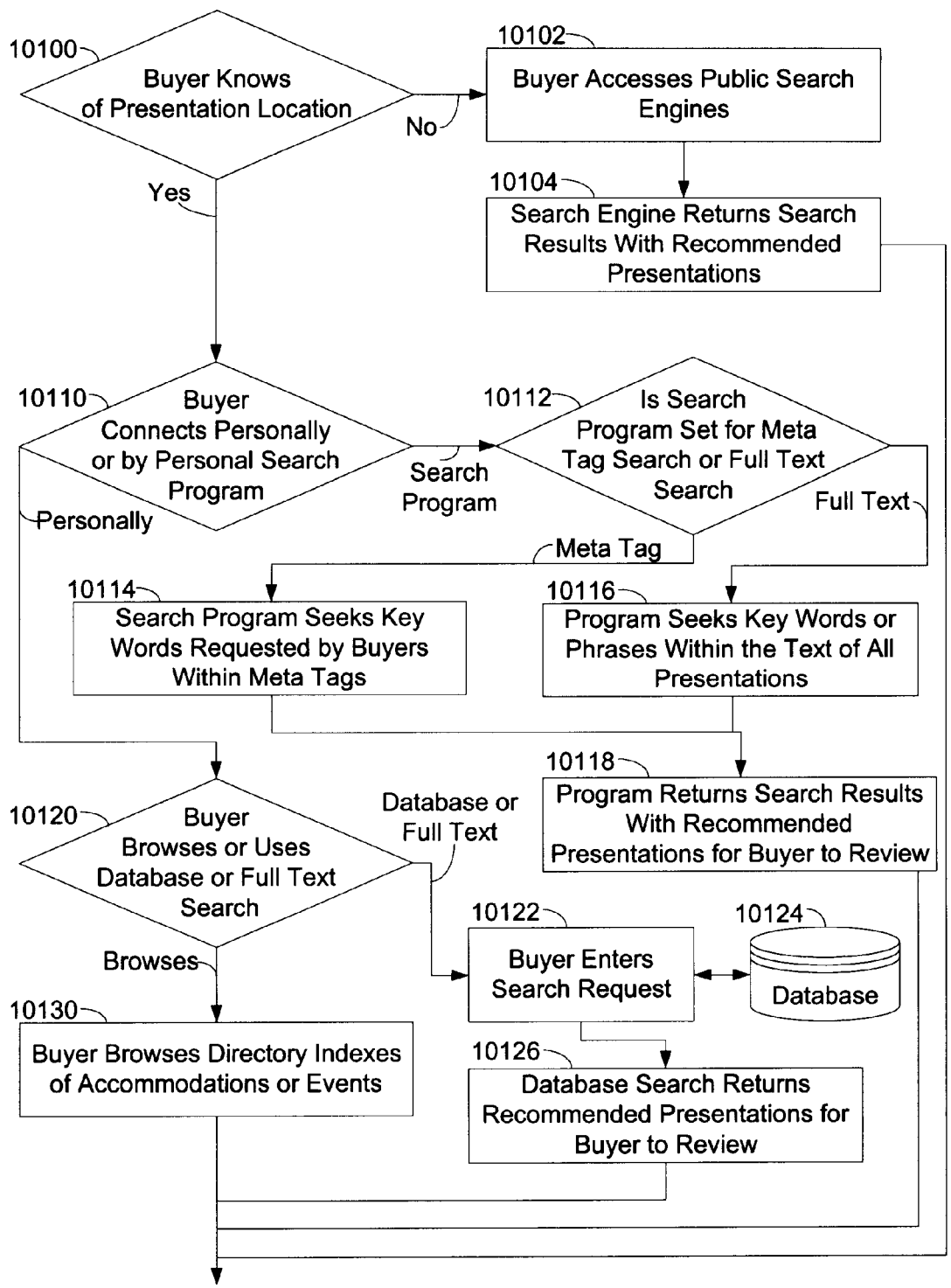

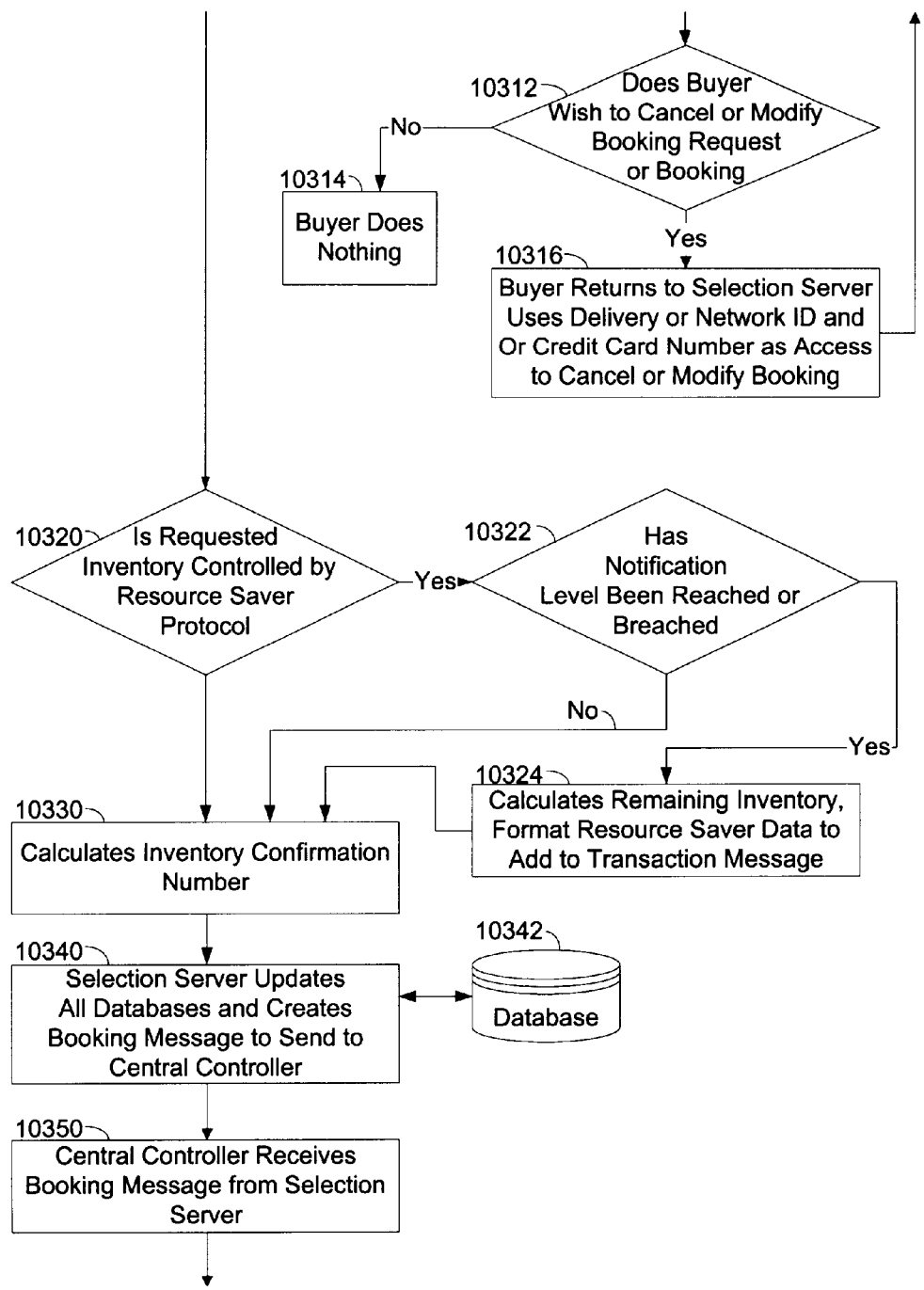

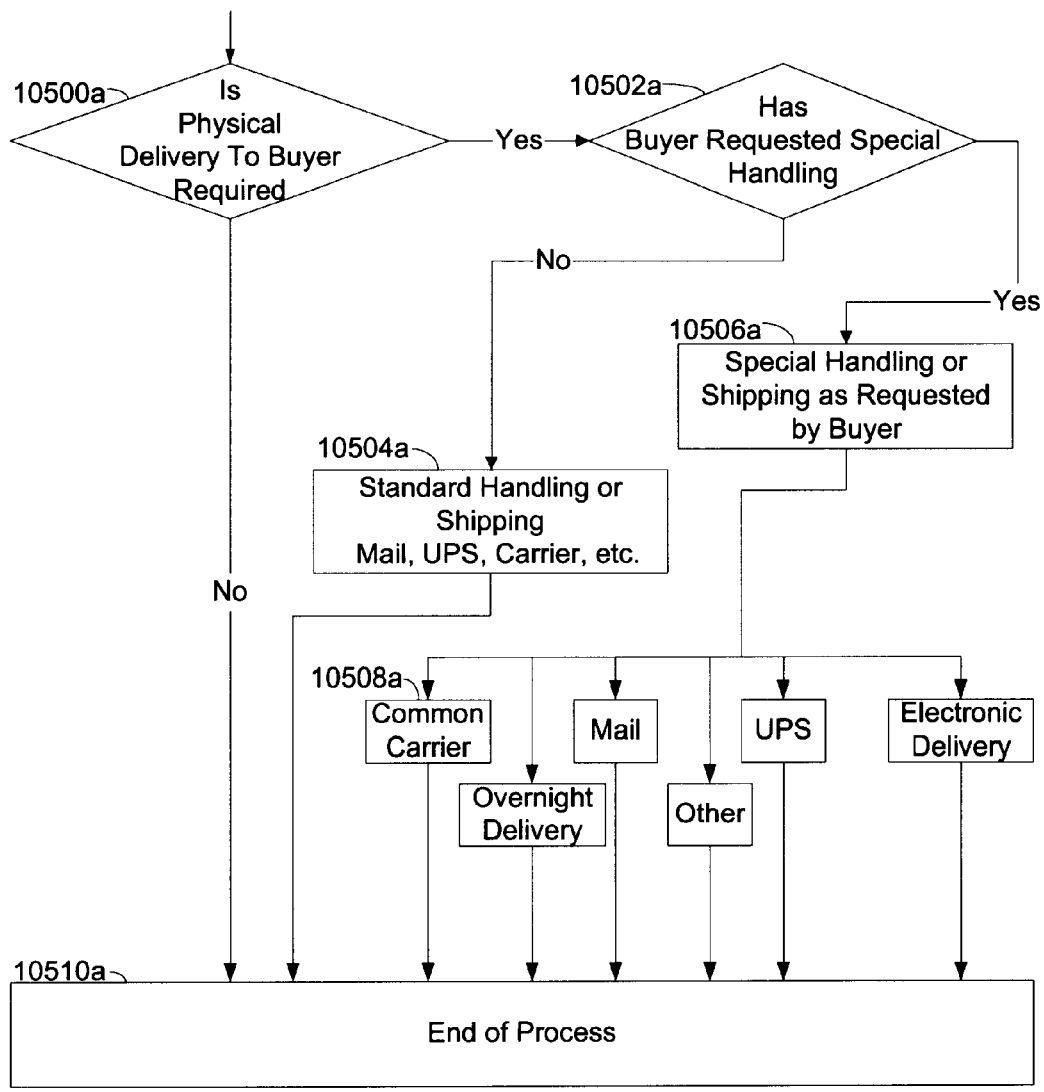
Fig. 3i-a

METHOD OF USING A NETWORK OF COMPUTERS TO FACILITATE AND CONTROL ACCESS OR ADMISSION TO FACILITY, SITE, BUSINESS, OR VENUE

This application is a divisional of parent application Ser. No. 09/480,303, filed Jan. 10, 2000, now U.S. Pat. No. 6,446,045.

BACKGROUND OF THE INVENTION

Field of Invention

The method and apparatus of the present invention is related to Automated Media Creation and Publication Engine with Resource Saver, Inventory Control, and Ticket Distribution Vending System.

The invention also relates to the Automated Media Creation, Publication, Placement, and Control Engine with Processing and Communications Resource Saver, including a Sales and Inventory Control protocol, and a Reservation, Access, and Verification System Utilizing Ticket and Confirmation Replacement Methods.

In another aspect the invention relates to Automated Media Creation, Publication, Placement, and Control Engine with Processing and Communications Resource Saver, including a Sales and Inventory Control protocol, and a Reservation, Access, and Verification System Replacing Traditional Ticket and Confirmation Methods.

In yet another aspect the invention relates to Automated Media Creation, Publication, Placement, and Control Engine, including a Sales and Inventory Control protocol with Processing and Communications Resource Saver, and a Reservation, Access, and Verification System Replacing Traditional Ticket and Confirmation Methods.

Prior art for electronic and other presentations of commercial products, goods, and services is accomplished by individual sellers or seller organizations or their agents submitting materials to each and every media outlet or to stand-alone electronic malls, outlets, or directories. Most sellers choose the media or outlet for the sale of their products, goods, or services; obtain the guidelines and requirements; negotiate a contract; and then compile material and design individual presentations to conform to the requirements for each media. This time consuming and costly business necessity has created huge marketing programs and agencies for large businesses.

When created individually by sellers or seller organizations, media presentations may not be standardized in that they do not carry consistent, up-to-date inventory, pricing, and information for the consumer. A buyer may find conflicting presentations on different electronic or traditional channels or outlets. The management for the advertising and electronic commerce for many small to mid-size sellers falls either as additional duties to current staff or as new departments. In the media of electronic presentations, the lack of experience may result in presentations that are cumbersome, ineffective, or not accessible to the widest range of consumer. Currently, the non-standardized format for the presentation of products, goods, and services provides for both the advantage of allowing unlimited creativeness in presentation and the disadvantage, in inexperienced hands, of not delivering the most effective and motivating sales message. In many cases, this lack of standardization appropriate to each and every venue or media outlet may result in the presenting of goods and services in a way that does not entice the buyer to make a purchase.

In the prior art, electronic Internet and Intranet presentations are developed either as static files that require constant and laborious manual updating or as dynamic (database-driven)

Although the dynamic presentations require less labor to produce and update, the various Internet or Intranet search or retrieval programs do not generally read or index them because of their "dynamic, database-driven" nature. This fact alone substantially reduces their effectiveness in reaching the most motivated buying public because those presentations are largely invisible to the wide range of automated searches conducted by potential buyers. With either design choice, substantial cost is experienced for the small to mid-size seller, either in the form of labor intensive presentation methods or in lost sales opportunity, which can never be recovered.

The electronic Internet malls and electronic directories, although generally much better staffed and able to produce effectively designed and edited content to motivate the buyer, suffer in part from the same dilemma. They are still faced with the same no-win choice between the labor intensive creation and placement for each presentation that gets the maximum visibility to the search methods of potential buyers and the easier database-driven presentation which get minimal visibility. One of the disadvantages to the advertising client of these electronic directories is that they find themselves publishing the same information in multiple directories or indexes as well as in their own stand-alone presentations in order to obtain the maximum coverage for access to the buying public. This supervision of multiple presentations is a control and management problem that is very costly and inefficient for the seller.

Electronic malls and electronic directories also experience a high ratio of cost to generated income associated with sales, billing, and collections. The clients of these electronic malls and directories are typically contracted for some period of time and then billed for that period of time during the contract period.

Currently, the sale of tickets, passes, admission documents, or reserved services is performed in a variety of ways that require the buyer to either call the agent or seller, contact a third-party seller, have a specific ID for that venue or event, or make the purchase electronically using a network presentation of some kind, usually the Internet. Upon the sale of those tickets, passes, admission documents, or reserved services, the transaction requires, or, would be enhanced by, the physical delivery of those proofs of purchase. In the prior state of the art, proof of purchase must be picked up at some physical facility or point of sale when the tickets, passes, admission, or reserved services are purchased. Or, they must be delivered via mail or one of the overnight services, delivered by courier, or picked up on a "will call" basis at the facility, site, business, or venue. Or, they must be a member and a holder of a specific ID used by that Seller of goods or services. All of these methods, at the very least, create additional inconvenience for the Buyer, requiring either travel time, waiting in lines, applying for and receiving specific ID card, or the uncertainty of last-minute delivery. In many cases where last-minute purchase decisions are made, there is additional expense to either the Buyer or Seller to insure timely delivery. In prior art, if the buyer is a existing member of an organization that issues special single purpose ID cards, the buyer may apply for and use that special single purpose ID card for access. This forces the buyer to have an individual access ID for each service that he wishes to periodically use.

In regards to the Resource Saver Protocol, prior art requires a message to be recorded and sent for each and every transaction (purchase) at a resource cost for each transaction or transmission. If a Seller has inventory on multiple electronic sites or channels, each and every site must be updated and adjusted on an individual basis, one-by-one manually. It must be noted that prior art does not even communicate in an automated two-way method. This means that in many cases, the Seller has to receive the transmission of sale, record the inventory change manually onto his management or accounting software, and then update each and every place where this inventory is offered for sale. Through prior art, buyers and sellers often experience mistakes in over-selling or overbooking products, goods, or service because of the delays of manual updating.

SUMMARY

The invention allows sellers to present their inventory, products, goods and services in a choice of one or a variety of supported media outlets: in print, such as newspapers, magazines, periodicals, guidebooks, catalogs, brochures, fliers, and directories; in electronic form, such as online directories, web sites, bulletin boards, news groups, CD-ROMs, and interactive media and networks; and in other media, such as billboards, skywriters, bus benches, radio, interactive kiosk and any other form of customer outreach or information distribution. When these media choices are made, the present invention prompts the seller for information that is then used in the creation of presentations for the media outlets he has chosen. The Presentation Rules Database holds all the criteria, formatting architecture, and distribution factors for each participating media outlet. The present invention's Presentation Generation Program, along with the Presentation Rules Database, then creates a presentation for each and every media outlet the seller has chosen. The Presentation Generation Program then either transmits the presentation to the appropriate destination or holds it for a publication date to be submitted for a particular deadline or predetermined promotional market.

The seller can then print out a report that shows him each presentation, distribution or media outlet, and the pricing of each media choice for an overall marketing valuation.

The present invention allows the Seller to update, change, control inventory, and automatically process sales either from his in-house or third party accounting or management software that has a compatible communication component with the present invention or in the present invention. He can accomplish this updating and inventory control to all media outlets simultaneously.

The invention is a method and apparatus that allows for the creation of presentations for the commerce of products, goods and services for any and all size of business; the accessibility of those presentations to a vast population of the buying public both in print, electronic, interactive electronic, and other media; the sale, reservation, and purchasing of those products, goods and services; the confirmation of these purchases and reservations through a Network ID or confirmation system; and the management of inventory control through multiple media outlets while saving resources of processing, transmission, and communications.

The invention is a method and apparatus that allows for the creation of presentations that comply with the design and architectural requirements of any and all participating media. This is applicable to all media either in print, such as newspapers, magazines, advertisements, guidebooks, directories, fliers, and brochures; and electronic media, such as online directories and malls, web sites, bulletin boards, news groups, CD-ROMs, and interactive media and networks; and other media, such as billboards, skywriters, bus benches, radio, interactive kiosk, and any other form of customer advertising, outreach, or information distribution. These presentations can be updated for either presentation content or inventory control in near real time, by either manual or automatic means, via electronic message units from third-party management or inventory control software. Electronic presentations created can be either static open-access or database driven dynamic server presentations. Where appropriate, these presentations allow for the sale of products, goods, or services and for the making of payments by buyers. Inventory adjustments for production, sales, and other reasons are made in near real time, allowing for an accurate presentation of availability of inventory to buyers. The present invention allows for lower cost to management when used with all media outlets by creating a self-serve, automated billing environment for the seller's creation and display of presentations.

The invention is a method and apparatus that allows for the creation of both static and dynamic Internet and Intranet presentations for the sale of products, goods, and services to be accessible to the maximum number buyers and the interactive purchase of those products, goods and service. The present invention is a method and apparatus that allows buyers to purchase products, goods and service electronically and receive confirmation of that purchase.

The invention allows for the verification and substantiation of the purchase of access or admission to those services or events that traditionally have controlled access by means of tickets, passes, admission documents, reservations, reservation confirmations, or other substantiation at the facility, site, business, or venue. The invention provides several methods for the buyer to provide a ID at the time of purchase, which is then transmitted electronically to the facility, site, business, or venue. That buyer Network ID is then confirmed by the facility, site, business, or venue by means of readers or scanners of the magnetic, smart, or optical ID cards or by other electronic means when biometric authentication is required. This confirmation may automatically result in the printing of the tickets, passes, admission documents, reservation confirmations, or other documents required for admittance or in the automatic and immediate physical admittance of the buyer or ID holder.

The present invention allows for both complete inventory control and management and the global updating and accessibility of real-time and time-sensitive inventory while saving communication resources and time for any and all businesses that sell products, goods, and services regionally or world-wide. The invention allows for a substantial reduction of the communications and computer resources necessary to control and coordinate the availability, presentation, and sales of common, unique, or time-sensitive products, goods, and services. The present invention allows for the sales process to be adjusted so as to optimize the communications and computer resources used in relationship to the sales volume and Seller, Buyer, and usage profiles.

OBJECTS AND ADVANTAGES

Several objects and advantages of the Presentation Generation component of the present invention are:

To provide an effective system of edit and content control for the creation and publishing of commercial sales or information-oriented traditional media and electronic presentations in a cost-effective manner for small, medium, and large sellers of products, goods, and services. This invention improves on the prior art by creating a controlled, managed environment for the sellers in which to create their presentations. This invention automatically applies not only editing, style, graphics, data, and content controls but also design specification and architectural requirements to the design environment of all forms of specific member media venues or outlets, both electronic print and all other media formats.

To create open-access electronic presentations that can receive maximum electronic visibility from private, public, or commercial search algorithms and commercial search engines and indexes, as well as from other automated or on-demand computer search systems. This invention improves on the prior art by automatically publishing the information and data received from sellers in an open-access format that is readily available to public automatic search and index programs as well as to on-demand search programs. With this invention, the seller's presentation can be published in several different directories or indexes, taking on a different style, look, and feel in each as a result of the automatic restructuring of the data entered by the seller. This is accomplished by using different presentation formatting guidelines and rules for the targeted directories or indexes. This single-entry and automatically distributed method is more efficient than managing each directory or index individually.

To allow sellers to create presentations on their computers that are automatically transmitted to be published and viewed on electronic networks and other traditional advertising media. The present invention partially resides on the sellers' computers, controls and edits the presentation, and then automatically transmits that information and data for publication in traditional media and electronic networks.

To allow media venues, outlets, vendors, and representatives automated presentations giving media buyers' self-serve access to their products and services.

To allow for the automatic publishing or updating of presentations within a simple environment that does not require lower-level coding or formatting of the presentation material. The present invention employs a text-only entry of information and data, thereby not requiring the seller to have knowledge of presentation computer codes or low-level formatting.

To allow for automatic global updating of the description, price, quantity, and availability of products, goods, and services in traditional periodic media or electronic presentations. The present invention allows for the direct input of this information as well as for the automatic transmission of presentation-related data by compatible third-party, accounting, inventory control, or other management software for the inclusion or updating of the electronic presentation through common message files read and transmitted by the present invention.

To allow for the central control and management of presentations, thereby allowing for a greater degree of promotion and flexibility of the category or group of products, goods, or services by the controlling server in order to attract more buyers. The present invention directs all presentations through a central controller, which standardizes the presentations within the style, editing, and content standards set by the controller standards for each presentation, directory, or index. All electronic interactive presentations are optimized for presentation search visibility by the controller and can then be globally refined, based on traffic analysis.

To provide lower overhead cost associated with sales, billing, and collections for the operators of the present invention. By creating a self-serve, automated, direct billing environment for the sellers to create their presentations in, the operators of the present invention will experience substantial savings over traditional sales and billing methods. Allowing the sellers to create their presentations with a cafeteria-style selection and billing that presents all their options, including the associated cost up front, will also result in greater add-on sales without the associated sales overhead.

Several objects and advantages of the Resource Saver Protocol component of the present invention are:

To allow for the presentation of availability of products, goods, and services for sale in a real-time environment without requiring constant real-time communications during the sales process.

To allow a substantial portion of the real-time sales to be completed without the overhead of a concurrent verification process.

To reduce the necessary processing and communications resources used to control inventory presentations of products, goods, and services.

To reduce the necessary processing and communications resources used to control sales and/or reservations of products, goods, and services.

To transfer communications and processing resources to time periods of lower utilization of those resources.

Several objects and advantages of the Network ID and Purchase Verification System component of the present invention are:

To allow for the replacement of traditional tickets, passes, admission documents, reservations, reservation confirmations, and other means of verification that require prior or "will call" delivery to the buyer. The present invention improves on the prior art by creating a controlled universal ID at time of purchase that can be transmitted to the facility, site, business, or venue to be used for verification of the buyer and purchase. This ID can be used for one purchase or maintained within the network for future use as a permanent ID for the purchase and access to any facility, site, business, or venue that is represented by that instance of the present invention.

To allow for a more convenient method of purchase of tickets, passes, admission documents, or reserved services, or for the late purchase of those tickets, passes, admission documents, or reserved services beyond what would be feasible if physical delivery of the access or admission documents were required. The present invention allows for purchases to be made and buyer IDs to be transmitted to the facility, site, business or venue within a matter of minutes of the buyer arriving for admittance. By using an electronic network, Internet, Intranet, or phone service, a buyer could literally make the purchase by laptop computer with wireless modem or by cell phone from the car on the way to the facility, site, business, or venue for admittance. The invention, when used in conjunction with an electronic inventory-available presentation, can allow buyers to become aware of and take advantage of last-minute cancellations and changes of availability.

The invention reduces labor and material requirements by the sellers of tickets, passes, admission documents, or reserved services. The invention substantially reduces the labor and material requirement for fulfillment of purchases of tickets, passes, admissions, or reserved services in several ways. By eliminating the requirement of delivery of those documents that allow the buyer admittance, there is no outgoing correspondence and/or fulfillment package to prepare. The costs associated with shipping, tracking, or follow-up on lost items as well as the customer service costs that accompany late or poorly communicated delivery instructions are reduced or eliminated. At admission time, additional costs are saved with the full implementation of the present invention by the use of automatic vendors that print the admission documents on demand by the buyer and with automated verification of the buyer's ID. This function replaces the "will call" method of admission document delivery and the associated cost in labor and facility overhead.

Further objects and advantages of the present invention will become apparent from a consideration of the drawings and ensuing description.

BRIEF DESCRIPTION OF DRAWINGS

FIGS. 3a through 3k and 3i-a is a block diagram showing the transaction processing and buyer's use of one embodiment of the present invention. This Example Embodiment of this invention is configured for delivery of tickets or reservation confirmation.

Further Breakdown of the block diagrams 5a through h.

Figure 5A:
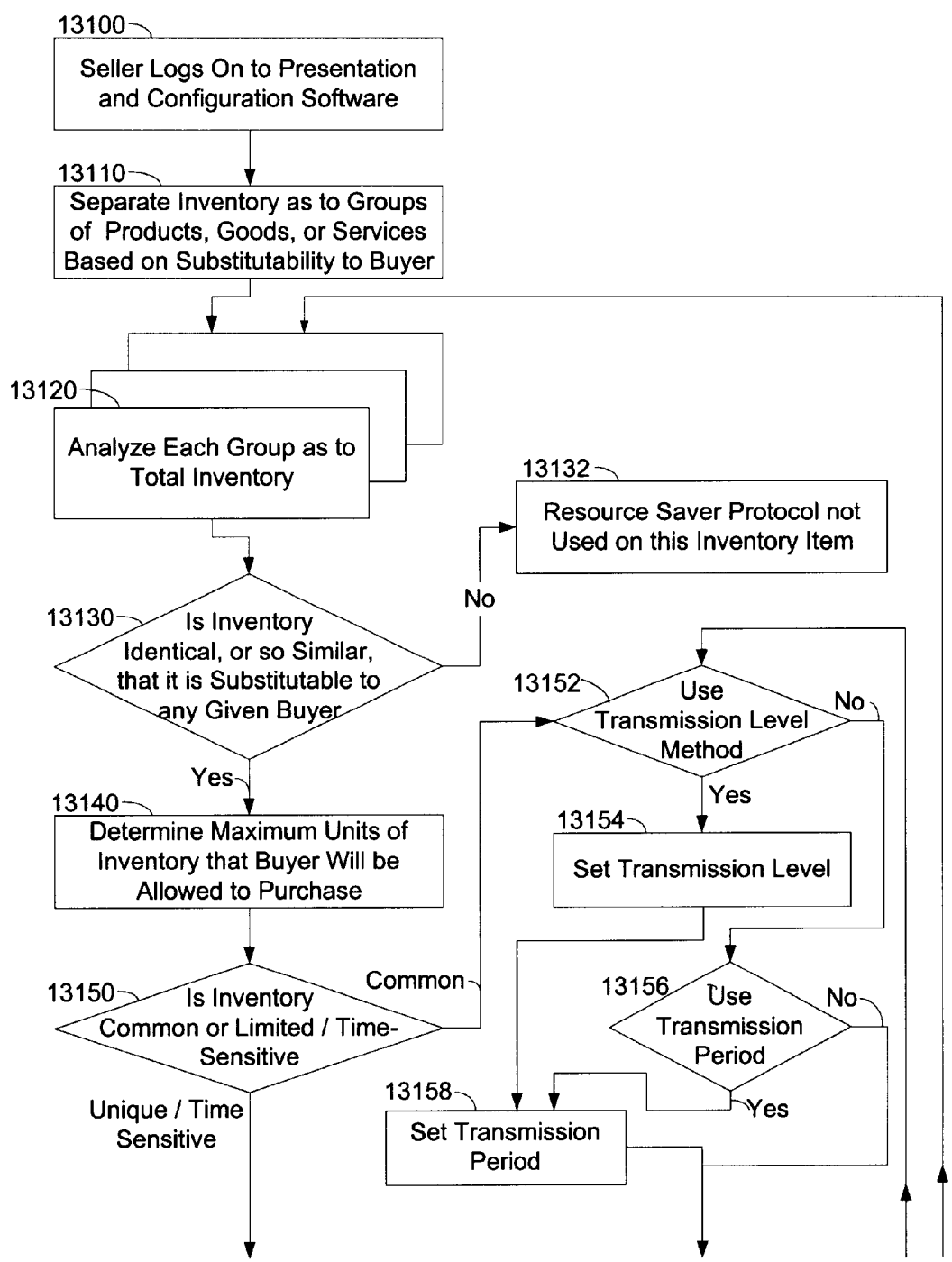
FIGS. 5a through 5h is a block diagram showing the Seller's use of the Resource Saver Protocol of the invention. This Example Embodiment of this invention is configured for delivery of tickets or reservation confirmation.
Figure 5B:
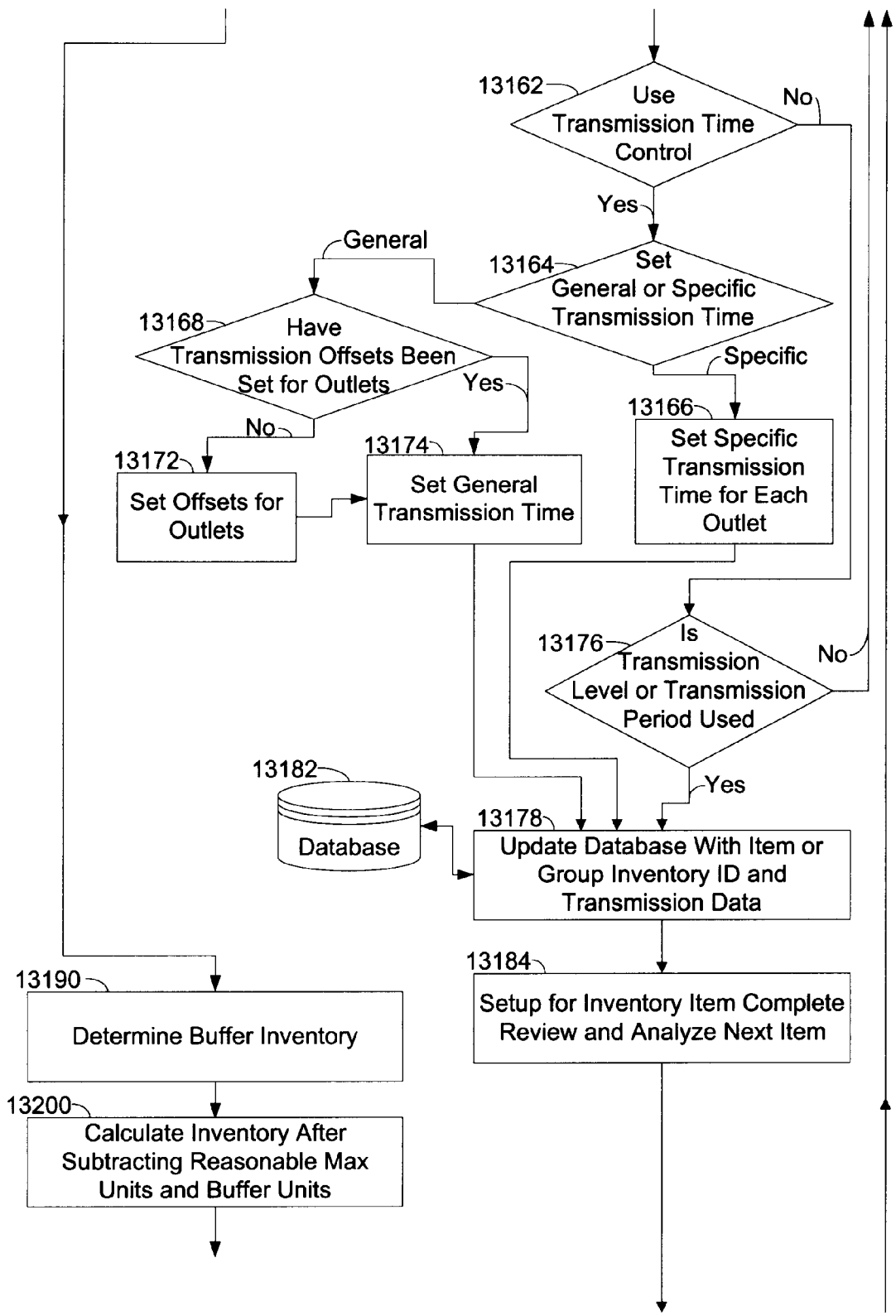
Figure 5C:
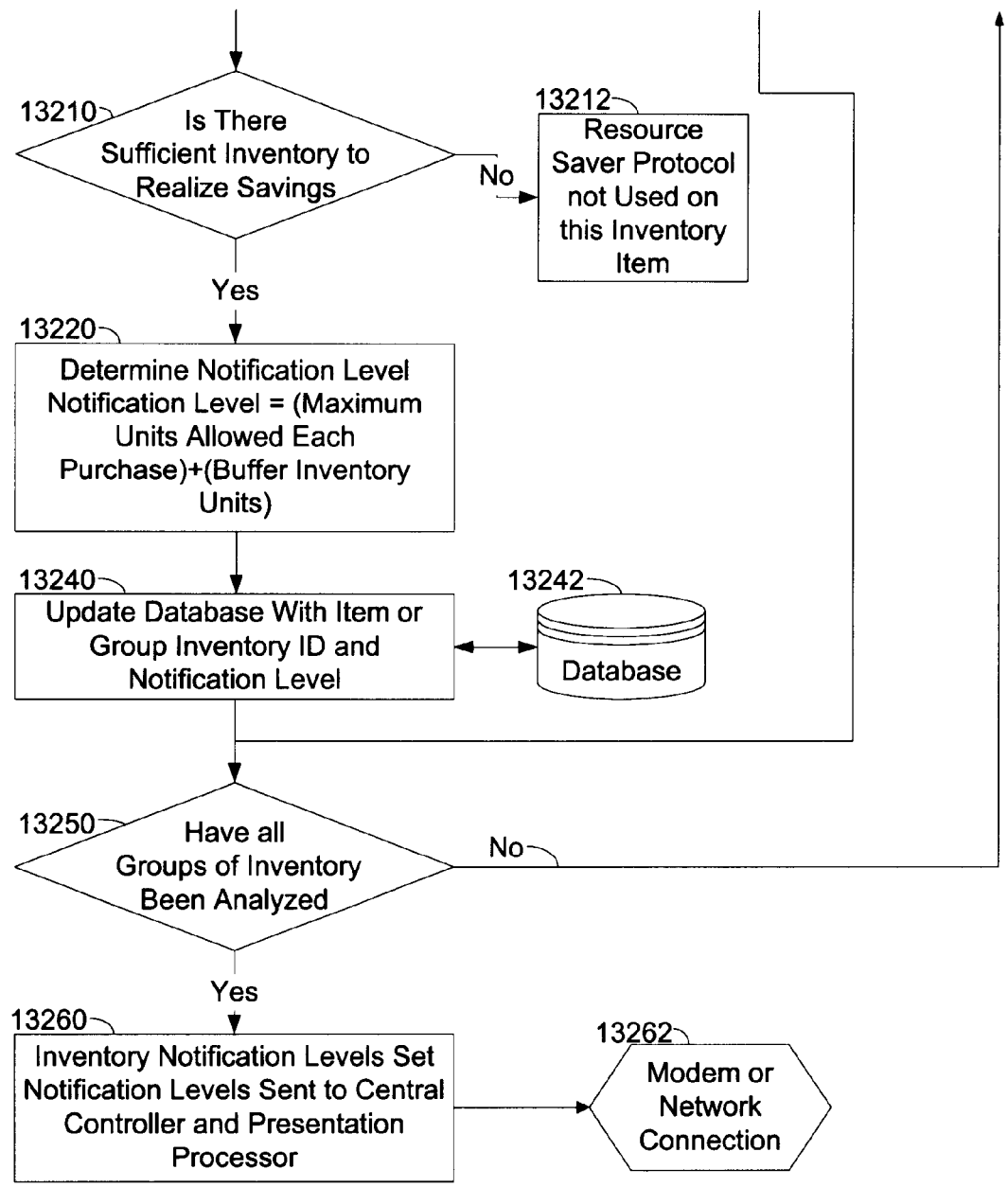

FIGS. 5a through 5c is a block diagram showing Seller's Setup and use of Resource Saver Protocol.

Figure 5D:
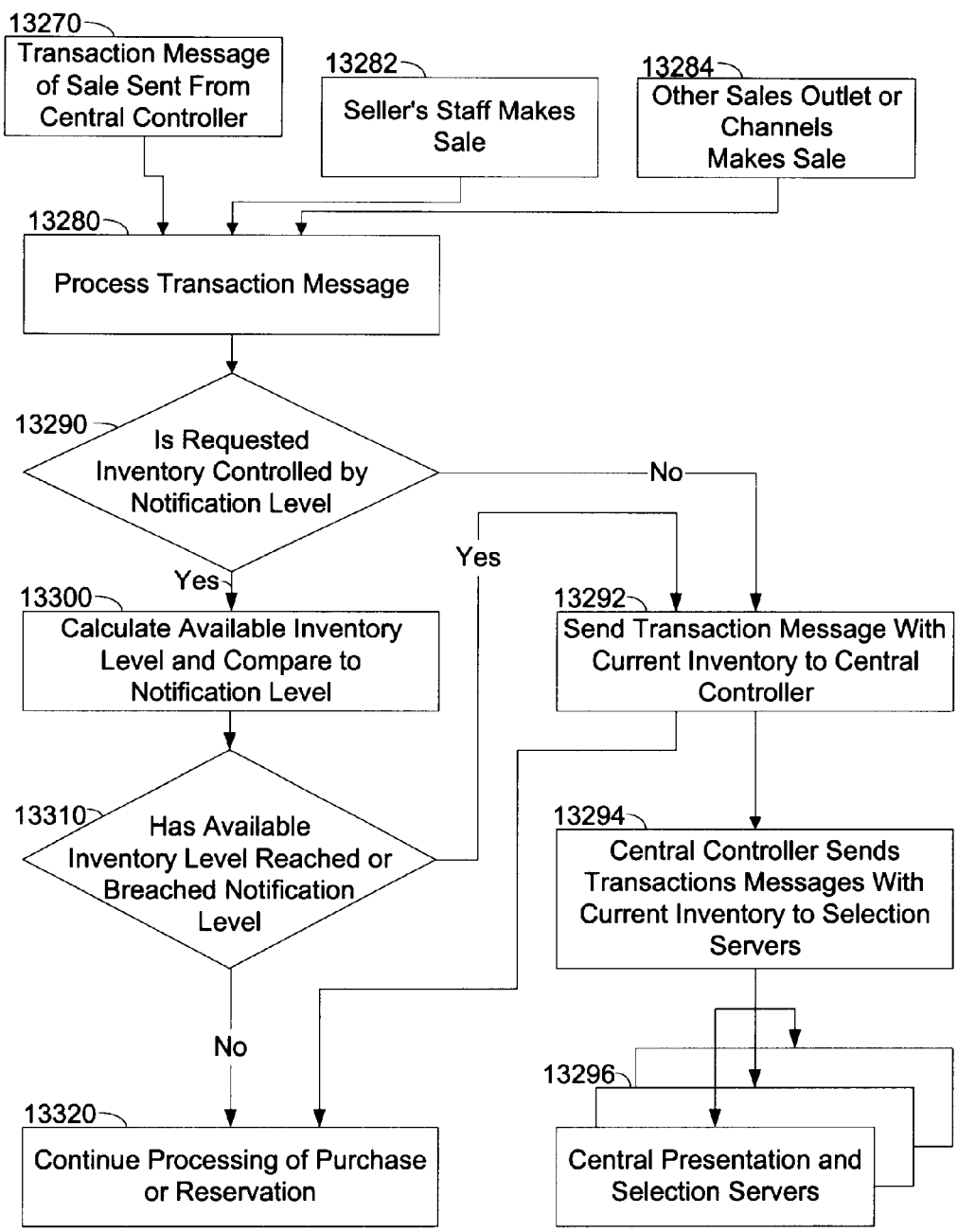

FIG. 5d is a block diagram showing the Seller's Use of Notification Level Processing of Resource Saver Protocol at Seller Interface 4000.

Figure 5E:
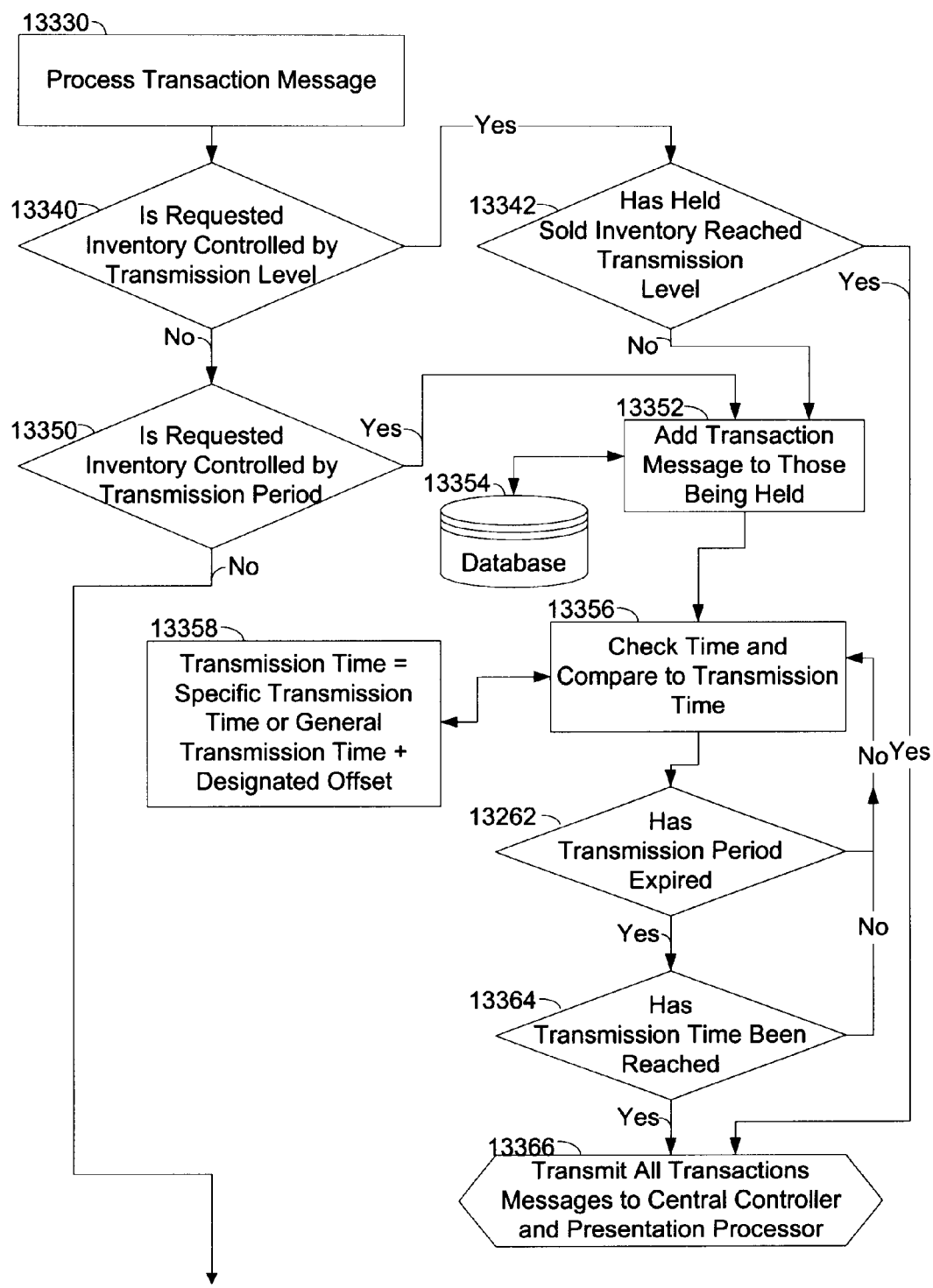
Figure 5F:
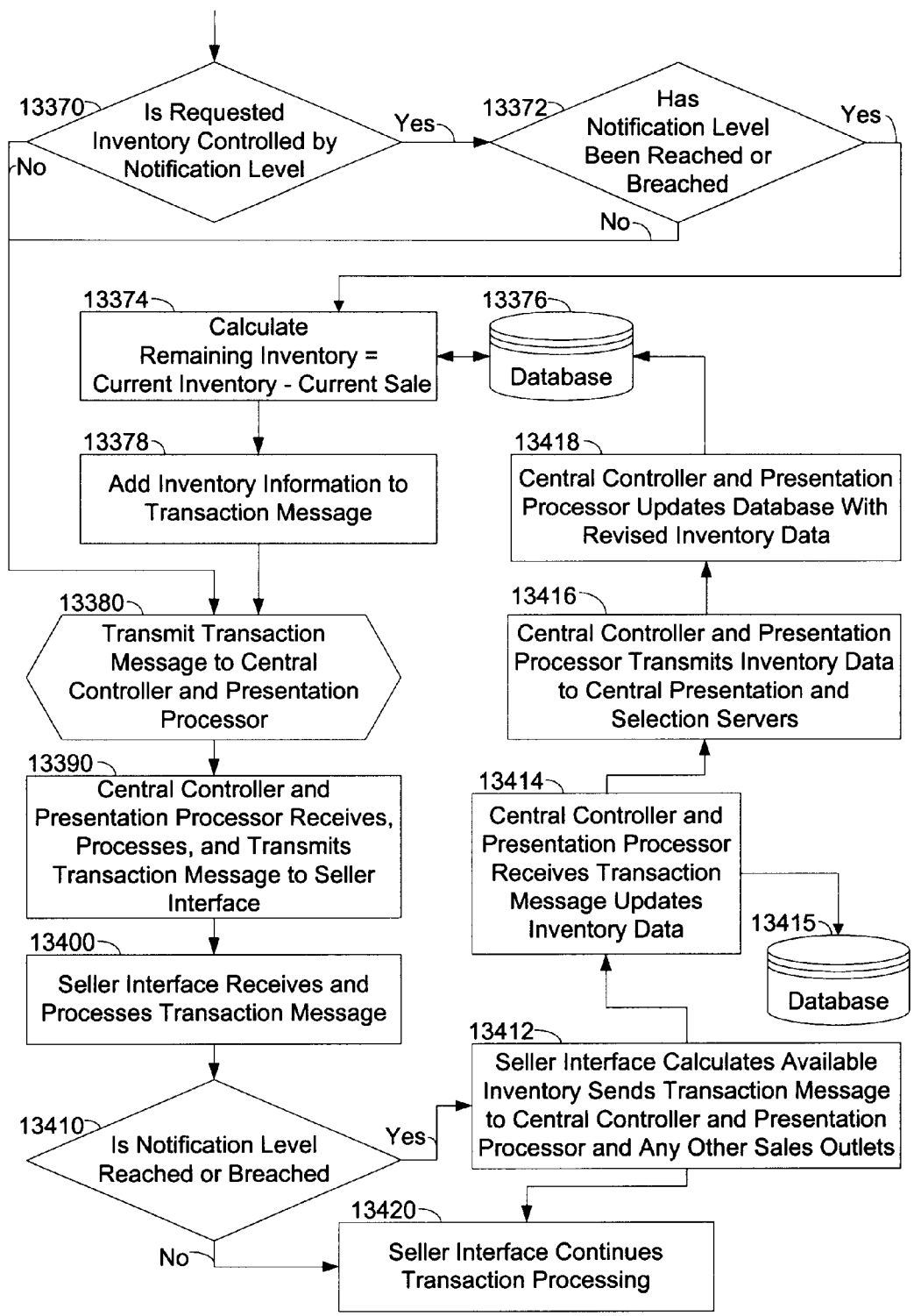

FIGS. 5e through 5f is a block diagram showing the Seller's Use of Resource Saver Protocol on Central Presentation and Selection Server 2000 or Other Selling Outlets.

Figure 5G:
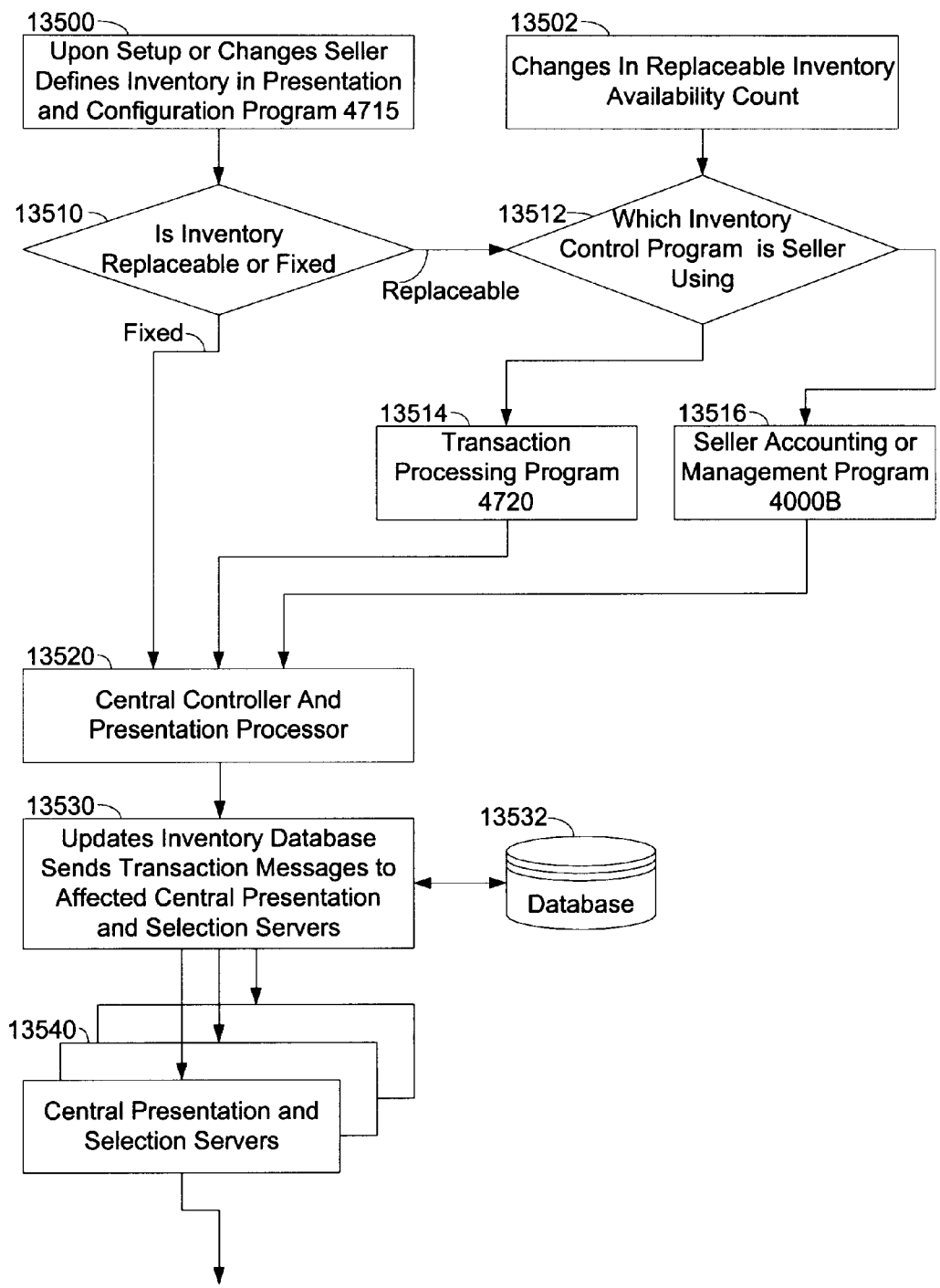
Figure 5H:
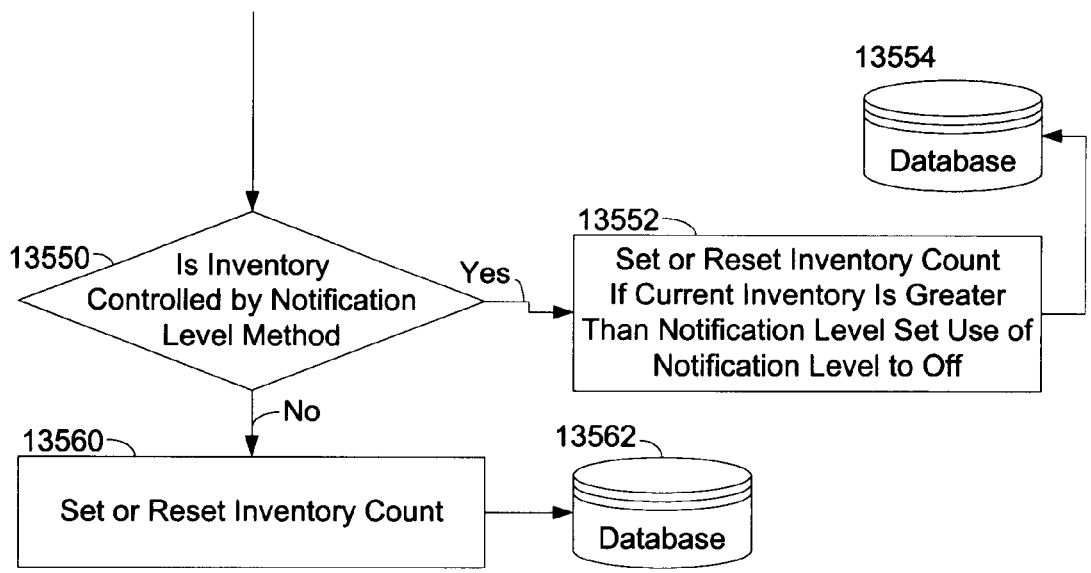

FIGS. 5g through 5h is a block diagram showing the Seller's Use of Resource Saver Protocol for Inventory Adjustment or Replacement.

PATENT APPLICATION GLOSSARY

The following are explanations and or definitions of names or descriptors as used in the invention. For the purpose of this invention the following terms have the following definitions. These are meant to aid the reader in understanding the inventors' descriptions of the present invention and its components, design, use, and purpose.

Advertising

Any presentation or effort to inform or influence target demographics or the general public. This includes all media types and methods such as but not limited to audio and visual, print, electronic, multimedia etc.

Algorithm

The method or logic that performs given functions within a program. Typically can be described as a series of information access, comparisons, decisions, choices, and resulting outputs.

Automatic Searches

These are information text-based searches that are conducted of targeted Internet or Intranet sites on a page-by-page basis using either the information contained within the meta tags of each HTML page or full text searches of all content.

Automatic Vendors

Machines that read or scan the Delivery or Network ID Cards, access a database of Buyer information for confirmation of ID, and then dispense a custom printed ticket, pass, admission document, or reservation confirmation showing the appropriate access information. The tickets, passes, admission documents, reservations, or reservation confirmations could then be processed with normal procedures.

Biometric Identification

Identification that is accomplished by using an individuals distinctive natural biological differences, such as finger prints, iris scans, full face scans, voice prints, DNA etc.

Buyer

Any person, corporation, partnership, group, or any other legal entity that desires or may desire or consume the purchase, reservation, acquisition, consumption, of items, services, or ideas offered by the Seller either paid for or as a gratuity.

Central Controller

Refers to the Controller part or function of the Central Controller and Presentation Processor 1000

Central Processor

The CPU or main processing computer chip or unit within a given computer. Depending on the operating system a computer must have one but may have more than one CPU thereby increasing the processing speed of the computer.

Client Channel

Means, outlet, or avenue of advertising, marketing, distribution, or sales.

Cookies

Information formatted to be delivered or downloaded to the Internet Browser utilized by the Buyer Interface 5000, stored on the Data Storage Device 5500 within the Location for Cookie Storage 5695, and then accessed later by that Internet Browser. This information would thereby provide a carryover of information such as Buyer preferences.

Database

The term Database is used referring not only to the structured or relational storage of data within files, but also to the tables or sub divisions of data storage within those databases or files or any method or system of organizing data for storage and access by computers.

Directory

A consolidation, accumulation, or compilation of similar, competing, or complementing "Sellers" (see above) that are offered or presented in some logical or systematic presentation allowing "Buyers" (see above) to review, compare, and contrast the offerings or presentations. These directories may or may not allow for direct access or interactive sales or acquisition. These directories may be in any media such as, but not limited to, electronic, Internet, Intranet, CD-ROM, or print.

Dynamic Presentations

These are presentations that are created when the reader or viewer accesses them. They are typically created in response to queries or actions of the reader or viewer and are generated from database information that resides at the server that is being accessed. (See "Static Presentations")

Editorial and Design Standards

These are the editorial, design, and style guidelines, standards, restrictions, and other specifications that are specific to each media venue that control the look and content of all presentations within that media venue.

Electronic Directory

Internet, Intranet, or bulletin board based directories or indexes focusing on narrow based collections of sellers, suppliers, vendors, purveyors, or providers of goods, products, services, information, ideas, etc.

Electronic Mall

A collection of electronic directories, indexes, "Sellers" (see above), or other Internet or Intranet sites at one place.

Fixed Inventory

Refers to Inventory that is limited and constant in its availability. One example might be rooms in a hotel. If the hotel has 300 identical rooms, then the fixed inventory is 300 units for each day into the future that the hotel is open for business. Adjustments can be made for units taken off line or made not available for maintenance etc. but rooms cannot easily be added.

Given Instance

For the purpose of this application the term "Given Instance" refers to a single particular established configuration of the present invention that has been designed to serve a defined demographics of Buyers and/or Sellers. A single copy of the present invention would be an instance of the present invention.

Goods

Merchandise or wares that are to be sold or transferred.

Identification Documents

Any artificial method of specifically Identifying an individual such as Credit Cards, Drivers License, Identification Cards, Membership Cards, and Academic Identification Cards etc. These documents may be read magnetically, optically or in some other manner to allow for verification.

Independent Presentations Directories and Indexes

Those directories and indexes, operated by management other than that of a given instance of the present invention, that have associated themselves with one or more Central Presentation and Selection Servers 2000 of the present invention for the purpose of utilizing the content and interactive services of those Central Presentation and Selection Servers 2000.

Index

Same as "Directory" but with less information or material presented for the "Buyer."

Internet Browser

Any Client-side program that resides on the Buyer Interface 5000 to facilitate the reading and or viewing or pages or presentations on the Internet or Intranet. Typically pages or presentations are based on the HTML display language or one of its successors or derivatives for presentations. Examples of Browser software are Netscape, Internet Explorer, etc.

Inventory

Refers in a very broad and general sense to any identifiable measure, item, or unit that can be sold, transferred, conveyed, or reserved. The term inventory can apply to goods, products, services, reservations for services, or any other identifiable unit to be sold, conveyed, or reserved. Units of Inventory may actually be a function of time with the same item being used over and over such as a room in a lodging facility, a seat in a sports stadium, or a table at a restaurant.

Inventory Substitutability

Inventory (defined above) is used in a very broad sense. The substitutability of those items that make up any given line of inventory being offered within the present invention may not always be clear. Though not always clear, the substitutability of the inventory must be determined and represented by the Seller, who has the clearest understanding of the makeup of the Buyer and their use of the goods, products, and services. If the inventory were a one-of a-kind item, obviously there can be no substitutability and the inventory is unique. At the other extreme, for example, if the inventory were music CDs, with 1,000,000 copies in stock and another printing anticipated, then the inventory is common and substitutable. In between the extremes is a wide variety of items that are limited in quantity or availability and yet are substitutable. An example of an item that is limited in availability and is substitutable to the Buyer is rooms of a 100-room block at a hotel that are of the same standard (king bed, TV, phone, and desk). Although the rooms are not identical (as the CDs are) due to being on different floors and having different views, they are substitutable to the traveler.

Media

A means of communicating, delivering, or projecting concepts, ideas, or information to potential buyers, such as radio, television, newspapers, magazines, internet, Intranet, CD-ROMs, directories, brochures, flyers, billboards, bus benches, sky writers, direct mail or any other method or means of reaching a large number of people or a smaller number of targeted potential buyers or consumers.

Media Venues or Media Outlets

Those physical or virtual locations where presentations are placed or made available to present the information within the framework of the media so that it is accessible by the end users, consumers, viewers, or Buyers. This may mean an Internet directory, a newspaper, a multimedia CD-ROM, a travel guidebook, or any number of other examples.

Near Real Time

Refers to processing or access that takes place within a time frame that allows for some possibility that human interaction or other process may intercede or interpret that processing or access. For the purpose of this application, Near Real Time is referring to processing or access that take place within time limits that are unlikely to allow interruptions in the normal course of business. As an example, if you have a process that takes place randomly 15 times per day and each process takes within 1 minute due to communications delays, the likelihood of an interruption is approximately 1 chance in 1440 per event.

Network or Delivery ID

Magnetic, smart, or optical identification cards approved for use within the preferred embodiment of the present invention as identification, or biometric identification, that is used as substitution for the delivery of traditional tickets, to access to facilities, events, or venues.

Network of Computers

Two or more computers that may communicate either continuously or on-demand for the purpose of sharing processing, transferring information and data.

Non-Resident Media

Refers to media that is not wholly owned or controlled by the management, operators, or affiliates of the given instance of the present invention but are contracted for, designed, submitted, and controlled through the given instance of the present invention.

On-Demand

Functions, programs, or resources that are called or utilized when needed as opposed to being employed, engaged, or utilized continuously.

Presentation

Any content intended to inform or influence the viewers or readers of a given media venue. It may be in an advertising, public service, editorial, informational or any other format. It may be text, graphics, audio, multimedia, or a combination of any communication methods.

Products

Items that are manufactured, assembled, processed or created by the Seller and offered for sale or transfer.

Publishing

The act of placing or making available the presentation or information within the framework of media venue so that it is accessible by the end users, consumers, viewers, or Buyers. This may mean placing an HTML page on an Internet directory, printing a 12-word classified ad in a newspaper, adding a hotel presentation to a multimedia CD-ROM or guidebook, or any number of other examples.

Reader or Viewer Client

The reader or viewer client is the program that computer users use when accessing electronic information servers. The most common of these reader or viewer clients are Netscape Navigator and Internet Explorer, which are Internet Browsers.

Real-time

Refers to processing, communications, information transfer, or access that takes place within fractions of a second so that it is humanly impossible to discern, intercede or interpret that processing, communications, information transfer, or access. (See "Near Real Time".)

Resident Media

Refers to media that is wholly owned or controlled by the management, operators, or affiliates of the given instance of the present invention.

Replaceable Inventory

This is inventory that can either be purchased, manufactured, produced, or added to easily by the Seller thereby changing the inventory count and availability to the Buyer at any given time.

Reservation

A promise or commitment made by the Buyer and held by the Seller, to take, use, consume, utilize, attend, or enjoy a unit of inventory. Usually reservations are made by Buyers to reserve a time and facility to consume goods, products, or services.

Seller

A person, corporation, partnership, group, or any other legal entity that desires representation of its goods, products, services, reservations for services, ideas, views, or any legal intent or desire to be made public and offered for sale, exchange, trade, or distribution either paid for or free.

Seller Type

Refers to a category of Sellers that are offering comparable or similar information, products, or services classified by that type of information, product, or service.

Static Presentations

Presentations that are fixed in time as to the content that they display or convey to the client reader or viewer. They are created and then set into a presentation framework that can be accessed. These presentations are currently the most familiar to all of us now and are the standard presentations on the Internet or most Intranets. (See "Dynamic Presentations")

Transaction Message

Any unit of information that is transferred or communicated between clients, components, or programs of the present invention or third-party compatible clients, components, or programs.

Services

Duties or work offered to be performed for the buyer or consumer, often but not necessarily specialized or professional in nature.

Standalone Presentations

Refers to independent presentations that are not part of organized Directories or Indexes of complementing and/or competing products or services.

Traffic

Generally refers to the number of times users access Internet or Intranet sites or presentations. More specifically, traffic refers to how many times Buyers access an electronic presentation directory, index, server, or instance of the present invention.

Transmission Level

One of the variables set within the Resource Saver Protocol for use with common inventory. A predetermined number of units that triggers the immediate transmission of inventory sold or reserved. This count is the total inventory sold or reserved within the Transaction Messages, that are being held awaiting transmission from the Central Presentation and Selection Server 2000 or any other sales outlet to the Central Controller and Presentation Processor 1000.

Transmission Time Control

One of the variables set within the Resource Saver Protocol for use with common inventory. Transmission Time Control is a setting that controls the time of transmission for held transaction messages from the Central Presentation and Selection Server 2000 or any other sales outlet to the Central Controller and Presentation Processor 1000

Transaction Period

One of the variables set within the Resource Saver Protocol for use with common inventory. A setting to control the maximum period in hours that the Central Presentation and Selection Server 2000 or any other sales outlet may hold transaction messages prior to transmitting them to the Central Controller and Presentation Processor 1000.

Will Call

The act of, or a reference to, the picking up of tickets, passes, admission documents, reservations, or reservation confirmations or other access documents from a particular department of a venue for the purpose of being admitted to an event at that venue.

DETAILED DESCRIPTION OF THE INVENTION

It should be noted that although specific hardware or software components may be referenced within this detailed description, newer, improved, or successor generations of given hardware or software should be substituted as available to increase reliability, performance, or cost effectiveness or to take advantage of new or replacement technology.

The method and apparatus of the present invention will be discussed with reference to FIGS. 1a, 1b, 2a, 2b, 2c, 2d, and 2e. In one embodiment, the present invention includes a Central Controller and Presentation Processor 1000, Central Presentation and Selection Server 2000, Seller Interface 4000, Buyer Interface 5000, and Media Interface 6000. Each of these components includes hardware, software programs, databases, communications programs and devices. The present invention edits and structures data and information from an individual seller, at a single location, into consistent, designed and controlled presentations. These presentations can be simultaneously published or displayed in a variety of traditional and electronic media as chosen by the Seller through the Seller Interface 4000. The presentations can also be integrated into interactive sales-enabled standalone presentations or as unified presentations of complementing and or competing products, goods, and services. In addition, the present invention allows buyers to purchase, commit to purchase, or reserve products, goods, and services in a real-time or near real-time environment. This also allows, where appropriate, for an alternative to the advance physical delivery of tickets, passes, admission documents, reservations, reservation confirmations, or other physical methods of controlling access or proving purchase or reservation. The present invention also allows sellers to control inventory of common, unique, or time-sensitive products, goods, and services with reduced computer and communications resources while decreasing the time necessary for buyers to confirm the availability and then confirm the reservation, purchase, or commitment of purchase of that inventory. The interactive portion of the present invention enables the buyer to view or compare the products, goods, and services from a single source or a variety of sellers and then purchase or reserve those products, goods, and services in a real or near real-time environment. Where appropriate, in an embodiment of the present invention, access to events, venues, reserved services, and other access controlled products or services can be accomplished without the requirement of delivery for any tickets, passes, admission documents, reservations, reservation confirmations, or other access documents.

Design and Structure of the Present Invention

The design and structure of the first embodiment of the method and apparatus of the present invention is diagramed with reference to FIGS. 1a, 1b, 2a, 2b, 2c, 2d, and 2e. Shown in FIG. 1a, the components of the present invention are presented as a "1 each" single-level diagram of the interaction between the components. The components are the Central Controller and Presentation Processor 1000, the Central Presentation and Selection Server 2000, Seller Interface 4000, Buyer Interface 5000, and Media Interface 6000. Sub components of Seller Interface 4000 are Seller 4000A as client, Seller Accounting or Management Program 4000B, and Optional On Site Verification of Purchase Magnetic, Optical Card Reader or Biometric ID Reader with Ticket or Confirmation Printer 4350. Sub components and events of Buyer Interface 5000 are Buyer 5000A as client and Buyer Arrives at Facility or Event for Admission or Check-in 5000B as an event.

Communication between the components is accomplished by use of on-demand, direct dial-up public phone lines, network, or Internet connection between Seller Interface 4000, Media Interface 6000, and Central Controller and Presentation Processor 1000; standard Internet connections between Buyer Interface 5000 and Central Presentation and Selection Server 2000; and a high-speed network or Internet connection between Central Controller and Presentation Processor 1000 and Central Presentation and Selection Server 2000. Connections between components may be accomplished by any combination of public switched phone network, cellular, Personal Communication System, dedicated data lines, microwave, private network, shared data network, satellite network, or any other means that will provide data transfer. Seller Interface 4000, Media Interface 6000, and Buyer Interface 5000 represent components that are limited in number only by the capacity of both the Central Controller and Presentation Processor 1000 and Central Presentation and Selection Servers 2000 and the associated communications and data transfer methods. The present invention allows for the modular expansion of capacity by duplicating any component or portions of a component requiring additional capacity and running the new component in parallel with the original existing component. In the embodiment, there is one Central Controller and Presentation Processor 1000 and at least one Central Presentation and Selection Server 2000; however, the Central Controller and Presentation Processor 1000 can support more than one Central Presentation and Selection Server 2000. An example of this embodiment is shown on FIG. 1b. The Central Controller and Presentation Processor 1000 and the Central Presentation and Selection Server 2000 are separate but co-located in the embodiment, however, they could be remotely located with a high-speed data connection. Both the Central Controller and Presentation Processor 1000 and the Central Presentation and Selection Server 2000 could also coexist on the same computer in some specific low traffic or low transaction volume embodiments, In the embodiment, multiple Seller Interface 4000, Independent Presentation 3000, Media Interface 6000, and of course Buyer Interface 5000 are served, with the only limitations being the capacity of the associated processing, data storage, and communications hardware that can, as indicated above, be expanded.

Figure 2A:
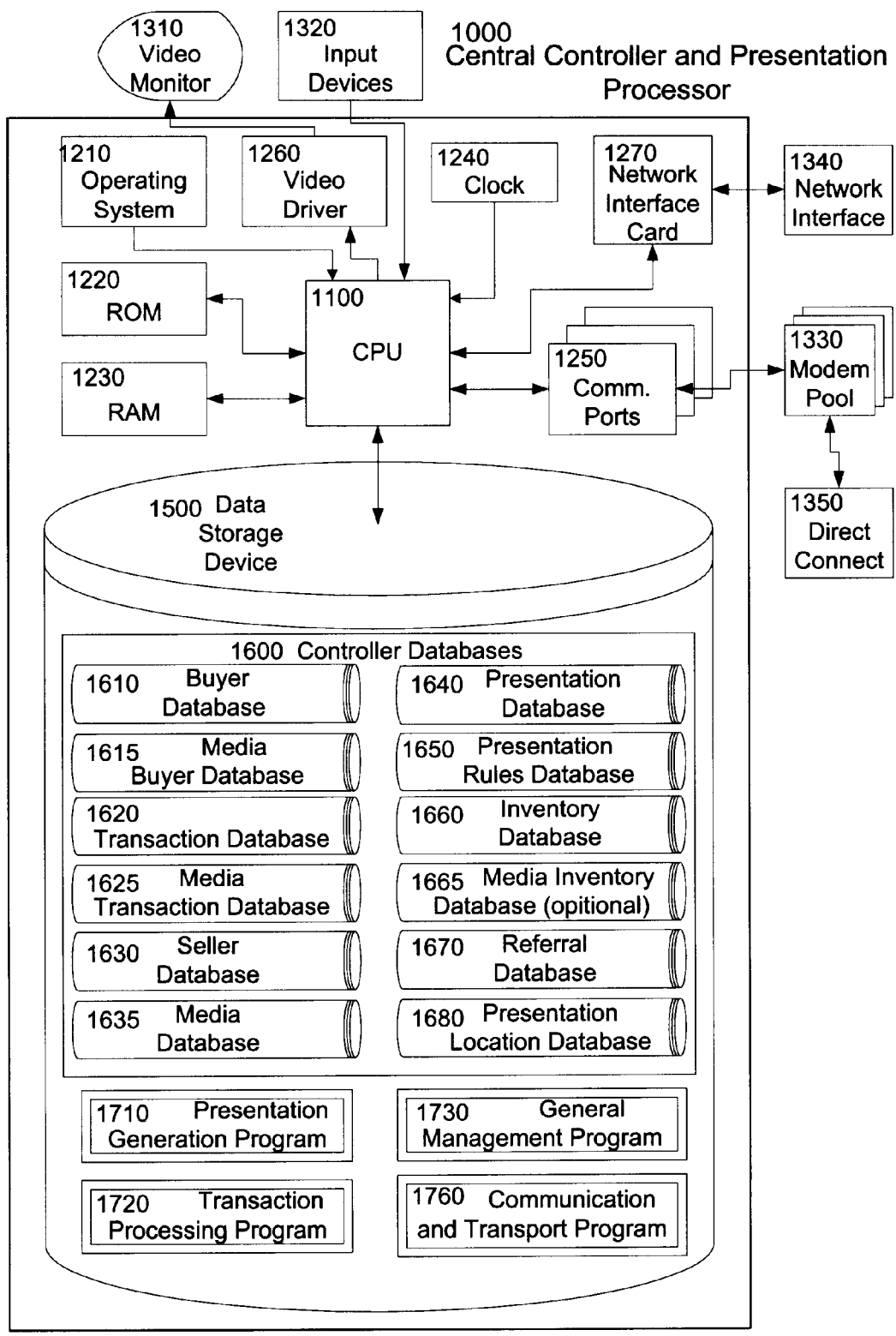
FIG. 2a is a block diagram showing one embodiment of the Central Controller and Presentation Processor.

FIG. 2a diagrams the Central Controller and Presentation Processor 1000, which includes a central processor (CPU) 1100, operating system 1210, ROM 1220, RAM 1230, clock 1240, communication ports 1250, video driver 1260, network interface card 1270, video monitor 1310, input devices 1320, modem pool 1330, network interface 1340, and data storage device 1500.

A personal, workstation, or server-grade computer with sufficient processing capacity, program and data storage capacity, and memory may be used as a Central Controller and Presentation Processor 1000. The CPU 1100 may be a single CPU or multiple CPUs as necessary to provide sufficient processing capacity. The Intel Pentium II Processor with a speed of 300 MH or any comparable capacity processor that is compatible with the chosen operating system could be used as CPU 1100. In the embodiment of the present invention, the operating system 1210 should be one that allows for multiple processors, such as Windows NT by Microsoft, so that increases in utilization of the present invention can be handled with increases of processing capacity. The video monitor 1310 is a standard "SVGA" color monitor or its equivalent. The input devices 1320 are a standard keyboard and mouse or other replacement items. The communication ports 1250 are RS232 serial ports with 16550 UART or alternatives that provide comparable connections to the Modem Pool 1330. The Modem Pool 1330 may be made up of modems such as the US Robotics 56K external made by 3Com Inc or any high-grade multi-modem equivalent. The Modem Pool 1330 should be made up of a sufficient number of modems to handle both incoming and outgoing messages from the Seller Interface 4000 using on-demand modem communications. If a given instance of the present invention generates sufficient modem traffic, the Modem Pool 1330 and its overhead and functions may be separated from the Central Controller and Presentation Processor and placed in a Modem Server to handle the Modem Pool 1330 and the associated communications overhead.

The data storage device 1500 may be one or a combination of standard hard disks, optical storage devices, CD-W drives, CD-RW drives, DVD, flash memory, magnetic tape, or other data storage devices. It must be of sufficient capacity to store all the programs and data necessary for the present invention as well as provide for future capacity needs. In the embodiment, mirrored hard disks with separate hard disk controllers provide a redundancy of data storage and therefore increased dependability and data integrity. This configuration allows for easier recovery in case of data corruption or data storage equipment failure. The aforementioned Windows NT operating system allows for this mirrored configuration. In addition to the mirrored hard disk, daily or more frequent backup of all data to tape, which is then taken off-site for storage, is a required procedure to ensure safe data. The present invention has a degree of data security built into it by design, with the most critical data kept with both the Central Controller and Presentation Processor 1000 and the Central Presentation and Selection Server 2000 FIG. 2b. In a catastrophic destruction of either the Central Controller and Presentation Processor 1000 or the Central Presentation and Selection Server 2000 FIG. 2b, the most critical data can be recovered from the surviving component in order to rebuild the lost data and ensure the integrity of all transactions.

The data storage device 1500 in the embodiment of the present invention contains relational databases controlled and managed by database software such as Microsoft SQL Server 7 by Microsoft Inc. Data used in the client control, the generation of presentations, and the processing of inventory sales in the present invention are contained within the Controller Databases 1600. The Controller Databases are the Buyer Database 1610, Transaction Database 1620, Media Transaction Database 1625, Seller Database 1630, Media Database 1635, Presentation Database 1640, Presentation Rules Database 1650, Inventory Database 1660, Referral Database 1670, the Presentation Location Database 1680, and any other databases necessary or desired to service the Buyers and Sellers.

Figure 1A:
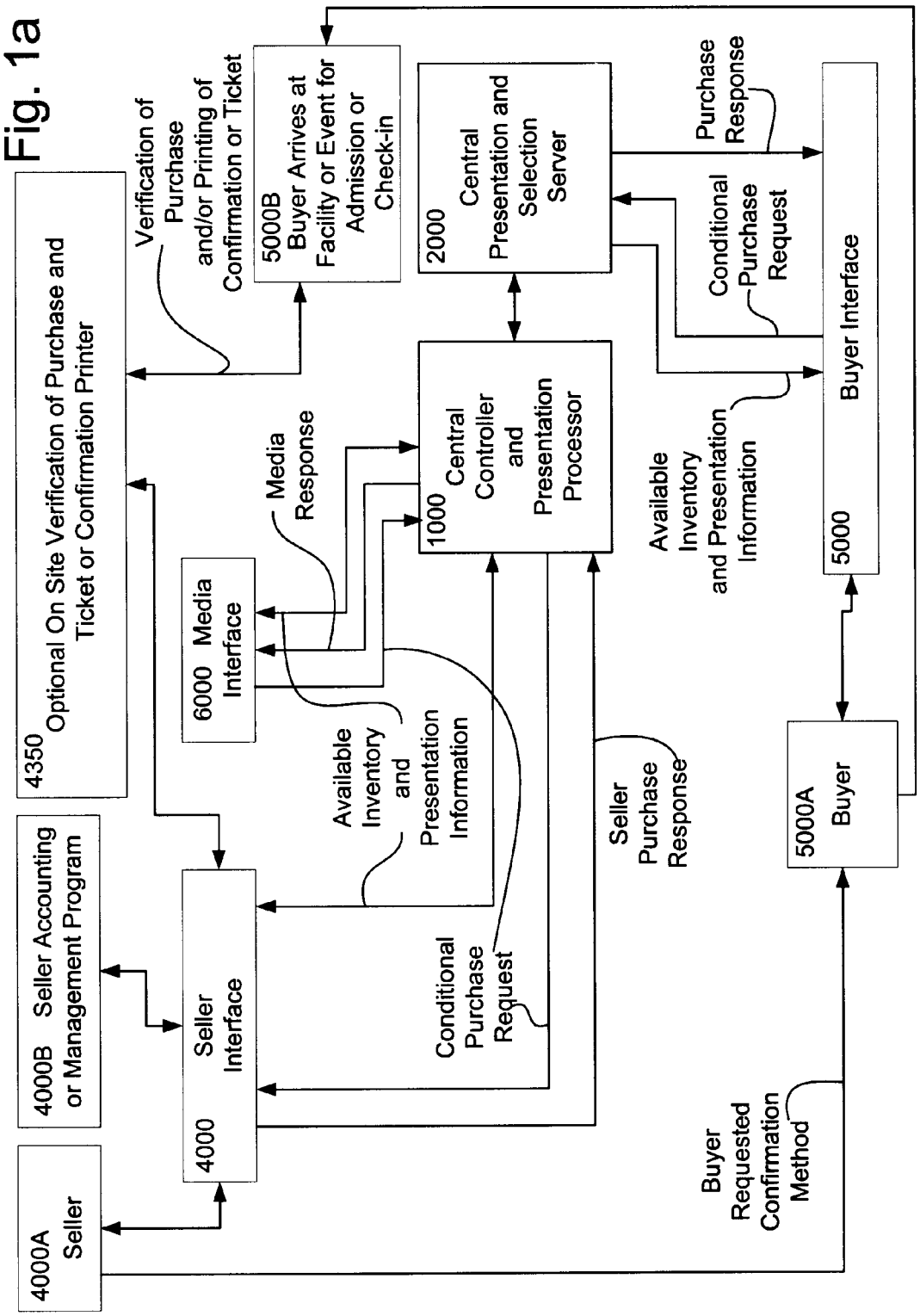
FIG. 1a diagrams an embodiment of the present invention with a single level of service without Independent Directories.
Figure 1B:
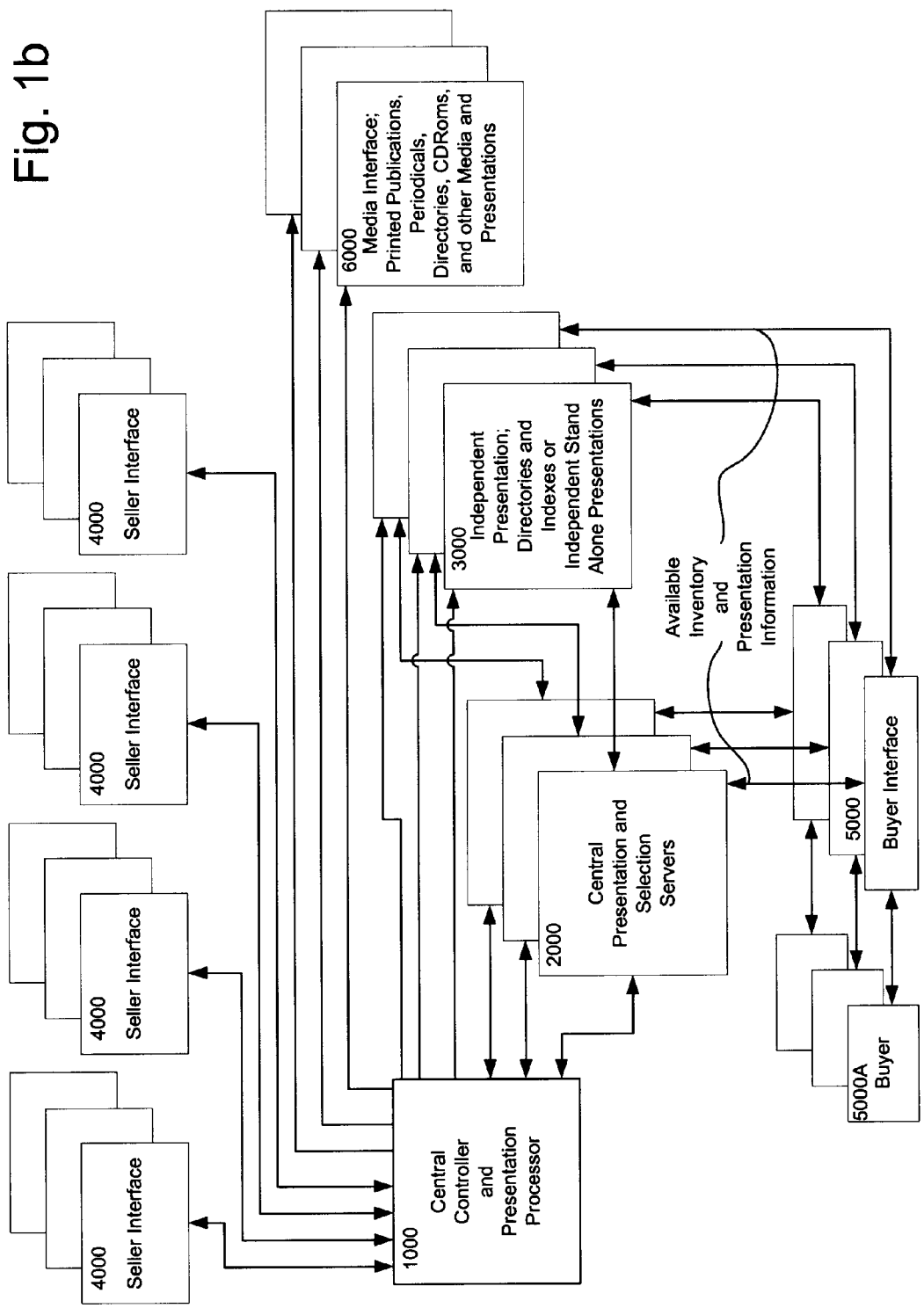
FIG. 1b diagrams an embodiment of the present invention with a sample depth of service of Sellers, Buyers, Presentation and Selection Servers, Independent Presentations, and Media.

The Buyer Database 1610 maintains data on Buyers who make interactive purchases or reservations of the products, goods, or services offered by the Sellers over the Central Presentation and Selection Server 2000 FIG. 2a or other Independent Presentation Directories and Indexes 3000 FIG. 1b. The Buyer Database 1610 will have data fields containing Buyer name, network or delivery ID, physical address, phone, email address, credit card information, and any other information deemed necessary to support the Buyers and the Seller's required buyer information. The Buyer has the option to input the information when joining the network prior to attempting a purchase. As an alternative, the Central Presentation and Selection Server 2000 will prompt the Buyer for the information after the Buyer has found a desired product, good, or service to purchase but before forwarding the purchase transaction to the Central Controller and Presentation Processor.

The Media Buyer Database 1615 maintains data on Media Buyers (Sellers) who make selections and purchases of media products or services offered by the Media through the Central Controller and Presentation Processor 1000 and the Seller Interface 4000. The Media Buyer Database 1615 will have data fields containing Media Buyer name, physical address, phone, email address, credit card information, and any other information deemed necessary to support the Media Buyers and the requirements of the Media.

Figure 2B:
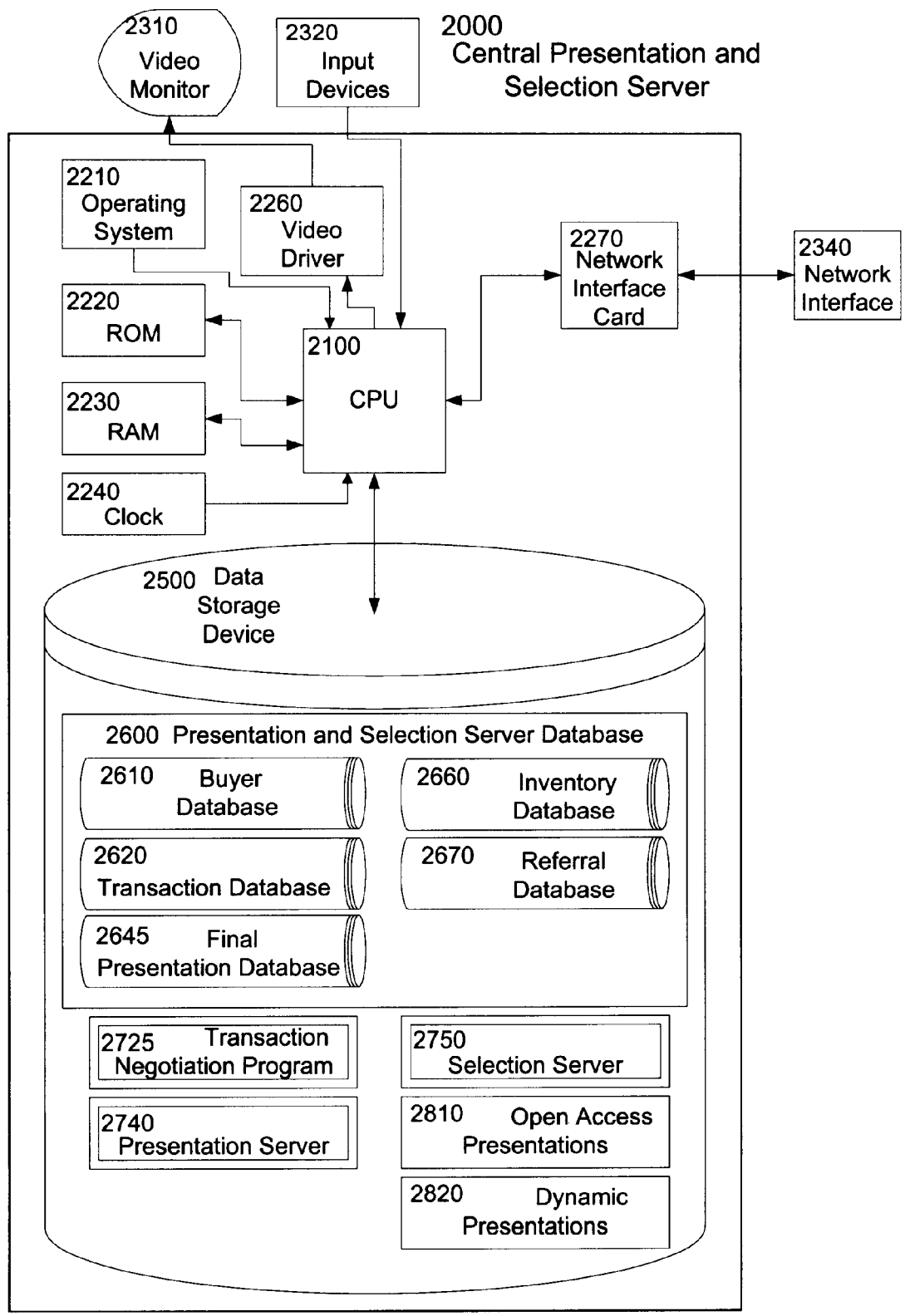
FIG. 2b is a block diagram showing one embodiment of the Central Presentation and Selection Server.

The Transaction Database 1620 maintains data on the Buyers' interactive purchases or reservations of products, goods, or services offered by the Sellers over the Central Presentation and Selection Server 2000 FIG. 2b or other Independent Presentation Directories and Indexes 3000 FIG. 1b. The Transaction Database 1620 will have data fields containing information that relates to the purchases or reservations made by the Buyer. The specific fields within the Transaction Database 1620 will depend on the type of Seller and their product, goods, or service, but would always contain the field for the purchase or reservation tracking ID. As an example, if an embodiment of the present invention were configured to present lodging facilities, the Transaction Database 1620 might contain fields for Buyer ID, room type or specific room, bed type, check-in date, check-out date, number of adults, number of children, smoking or nonsmoking, room rate paid, taxes paid, responses to requests, and any special requests such as extra pillows, late check-in, airport pickup service, etc. The information in the Transaction Database 1620 is the result of each requested purchase made with the Central Presentation and Selection Server 2000 FIG. 2b, which is then passed to the Central Controller and Presentation Processor 1000 and then to the Seller Interface 4000 FIG. 2c.

The Media Transaction Database 1625 maintains data on the Sellers' interactive purchases of non-resident media presentations offered by the management or operators of that given instance of the present invention through the Seller Interface 4000. The specific fields within the Media Transaction Database 1625 will depend on the type of media. As one example, if the non-resident media were a newspaper, the Media Transaction Database 1625 might contain publishing deadlines, placement or section requirements, rate paid, taxes paid, and any other information necessary to support that given media.

The Seller Database 1630 will have data fields containing information that relates to the Sellers who have created presentations for traditional media or offer their products, goods, and services interactively over the Central Presentation and Selection Server 2000 or other Independent Presentation 3000 FIG. 1b. The specific fields within the Seller Database 1630 will cover all necessary information on the Seller for use both within the presentations created and by the managers of the present invention for the management of the Seller's account. The Seller Database 1630 will have data fields containing company name, contact name, marketing name, physical address, phone, email address, credit card or other payment information, contract dates, product or reservation types for presentation, data transfer modem numbers, third-party accessible management software, and any other information fields deemed necessary to support the proposed sellers. The seller will input this information when first accessing the present invention and joining as a Seller. The Seller Interface 4000 FIG. 2c, specifically the Configuration and Presentation Program 4715 FIG. 2c, will prompt the Seller for the necessary information as well as obtain an agreement to a contract for the services of the present invention and the distribution and payment of all presentations.

The Media Database 1635 will have data fields containing information that relates to the Non-Resident Media organizations that have contracted with the management or operators of the given instance of the present invention to offer their services to the Sellers that are associated with the given instance of the present invention. The Media Database 1635 will have data fields containing company name, contact name, marketing name, physical address, phone, email address, contract dates, data transfer modem numbers, third-party accessible management software, and any other information fields deemed necessary to support the Non-Resident Media.

The Presentation Database 1640 will have data fields containing information that relates to the Seller's choice of media or venues as well as the presentation of their products, goods, or services offered to the Buyers. This information is the majority of the data that, when combined with portions of the information within the Seller Database 1630 and the Presentation Rules Database 1650 and processed through the Presentation Generation Program 1710, creates the presentations that are transmitted to the Central Presentation and Selection Server 2000 for presentation to the Buyer or to other non-resident media to be published. The data fields held by Presentation Database 1640 will vary from seller type to seller type, depending on the design of the presentations and the types of resident and non-resident media offered by the given instance of the present invention. As an example, if an embodiment of the present invention were configured to present lodging facilities, the Presentation Database 1640 might contain fields for facility description, facility photos, room descriptions, room photos, facility amenities, room amenities, room service menu, payment types accepted, meeting and reception services offered, meeting rooms, photos of meeting rooms, policies, rates, special package offers, media or venue choices, and any other information to assist in the presentation and sale of the lodging. The Seller Interface 4000, specifically the Configuration and Presentation Program 4715 FIG. 2c, will prompt the Seller for the necessary information for the presentations and non-resident media they have selected. The data relationship between the Presentation Database 4640 FIG. 2c, which is a part of the Seller Interface 4000 FIG. 2c, and the Presentation Database 1640 is one of continual synchronization of the Seller's information. The Presentation and Configuration Program 4715 FIG. 2c and the Communication and Transport Program 4760 maintain that synchronization. The Seller makes any updates or corrections to the presentation within the Presentation and Configuration Program 4715 FIG. 2c, which then updates the Presentation Database 4640 FIG. 2c. The Communication and Transport Program 4760 FIG. 2c sends those updates or corrections to the Central Controller and Presentation Processor 1000 for updating to the Presentation Database 1640. The Presentation Generation Program 1710 in conjunction with the Presentation Database 1640 then creates the new or updated presentations for publishing on the Central Presentation and Selection Servers or the appropriate non-resident media.

The Presentation Rules Database 1650 will have data fields containing information that controls and limits the style and editing of the presentations created by the Presentation Generation Program 1710. The Central Controller and Presentation Processor 1000 administrator or management of that given instance of the present invention inputs this information based on the types of media and interactive presentations that are supported by that given instance. For the non-resident media components of the present invention this information is submitted and updated directly by means of the Media Interface 6000 and specifically the Media Configuration Program 6715. The data fields held by the Presentation Rules Database 1650 will vary from seller type to seller type, as well as from one media type to another, depending on the design of the presentations. Some of the fields that might be maintained are presentation templates; blocked words; blocked phrases; blocked references; presentation cost and options; publication dates and deadlines; blocked URIs; grammar guidelines; spelling dictionaries; presentation size restrictions; photo or graphics specifications such as size, compression, and file format; and any other guidelines, benchmarks, or controlling algorithms. The data within the Presentation Rules Database 1650 will be synchronized with the Presentation Rules Database 4650 FIG. 2c stored on the Seller Interface 4000 FIG. 2c. This synchronization will take place by the sending of updates from the Central Controller and Presentation Processor 1000 to the Presentation and Configuration Program 4715 FIG. 2c, which then updates the Presentation Rules Database 4650.

The Inventory Database 1660 will have data fields containing information that monitors and controls the inventory of products, goods, and services offered for sale by the Sellers within the interactive sales portion of the present invention. The data fields held by the Inventory Database 1660 will vary from seller type to seller type, depending on the type of products, goods, or services that are being sold or reserved. As an example, if an embodiment of the present invention were configured to present lodging facilities, the Inventory Database 1660 might contain fields for Buyer ID, types of rooms, number of rooms available for each type, blocked rooms, blocked dates, room rates, exception date rates, and any other fields necessary to present and control that room inventory.

The Media Inventory Database 1665 (optional) will have data fields containing information that monitors and controls the media inventory offered by the Non-Resident Media to the Sellers. The data fields held by the Media Inventory Database 1665 (optional) will vary from media seller type to media seller type, depending on the type media supported by the given instance of the present invention. As an example, if an embodiment of the present invention were configured to offer a given newspaper as a Non-Resident Media the Inventory Database 1665 (optional) might contain fields for number display ads available per size, number of classified lines available, number of color pages available, and any other fields necessary to present and control that media inventory, The Referral Database 1670 will have data fields containing information from the Sellers that refers Buyers to other sources of the same products, goods, or services offered when a given Seller cannot meet the wishes or needs of the Buyer. The information within the Referral Database 1670 is provided by the Seller through prompting by the Presentation and Configuration Program 4715 FIG. 2c. This information is intended and designed to provide the Buyer with alternative sources when the products, goods, or services offered by the Seller interactively are either not available or do not meet the needs of the Buyer. The data fields held by the Referral Database 1670 will vary from seller type to seller type, depending on the type of products, goods, or services that are being sold or reserved. As an example, if an embodiment of the present invention were configured to present lodging facilities, the Referral Database 1670 might contain fields for other alternative accommodations, alternative dates, or alternative lodging facilities. An embodiment of the present invention configured to present professional services might contain alternative professionals or associates that might be acceptable to the Buyer.

The preferred embodiment of the Central Controller and Presentation Processor 1000 has a Presentation Generation Program 1710, Transaction Processing Program 1720, General Management Program 1730, Communication and Transport Program 1760, and other programs as necessary.

The Presentation Generation Program 1710 utilizes the information submitted by the Sellers and held in the Presentation Database 1640, Inventory Database 1660, and Seller Database 1630. The Presentation Generation Program 1710 uses these databases to create the requested presentations for the various desired resident or non-resident media as well as those presentations necessary for the interactive Central Presentation and Selection Servers 2000 with its interactive sales presentations, using the Presentations Rules Database 1650 for style and control guidelines. It should be noted that in the preferred embodiment of the present invention, the same rules and guidelines contained in the Presentation Rules Database 1650 are also held in the Presentation Rules Database 4650 FIG. 2c, which is part of the Seller Interface 4000 FIG. 2c. With the same rules and guidelines as those in the Presentations Rules Database 1650 applied and enforced during data input at the Seller Interface 4000 FIG. 2c module, no modification or editing should be necessary at the Central Controller and Presentation Processor 1000 module. Although the same rules and guidelines are applied and enforced at Seller Interface 4000 FIG. 2c module as at the Central Controller and Presentation Processor 1000 module, both processes should be utilized to ensure consistency and quality control. After the initial setup and publishing, the Presentation Generation Program 1710 automatically re-creates presentations either in the event of changes to the data for the Seller which affect any given presentation or upon the addition or deletion of any Seller. While creating or updating the Sellers' presentations, the Presentation Generation Program 1710 will determine which portions of the general presentation framework and structure on the overall directory or index require updating and republishing. This determination is made on a case-by-case basis for each non-resident media presentation requested by the Seller as well as for any interactive presentation on the Central Presentation and Selection Servers 2000 FIG. 2b. This embodiment of the present invention allows the Seller to determine the urgency of original or revised publishing of presentations, depending on the media and the accessibility of republishing. With the present invention, there are two publishing levels of processing. With the choice of "Urgent Publishing," the Presentation Generation Program 1710 would immediately process and publish the Seller's presentation to those non-resident media or Central Presentation and Selection Servers 2000 that are accessible for updating, but the Seller would be surcharged for this service. The Seller's second choice is "Standard Publishing," which does not carry a surcharge. This "Standard Publishing" would be performed in the normal schedule of publishing for the non-resident media. "Standard Publishing" for any Central Presentation and Selection Server 2000 presentations would be done when the Central Controller and Presentation Processor 1000 and the Central Presentation and Selection Servers 2000 FIG. 2b are at their lowest processor and network loads in handling the Buyers' requests and transactions. This economic choice gives a solution to the Seller who truly requires an immediate publishing of data while encouraging the bulk of the publishing to be done during times with less processor load. In this embodiment of the present invention, the Presentation Generation Program 1710 would be set to immediately process any "Urgent Publishing" request and any associated required structures. All other "Standard Publishing" would be processed as a batch at a preset low-traffic or low-utilization time for the Central Controller and Presentation Processor 1000 and the Central Presentation and Selection Server 2000 FIG. 2b. In this embodiment, the Central Controller and Presentation Processor processes the publishing function in the following order: all new Sellers' presentations, all Sellers' updates, then all associated structure and presentation frameworks.

With this embodiment of the present invention, the Transaction Processing Program 1720 is responsible for processing the transaction messages of all interactive sales and/or reservation of products, goods, or services offered by the Sellers and all media selections made by the Sellers from the offerings by the resident and non-resident media.

Figure 2C:
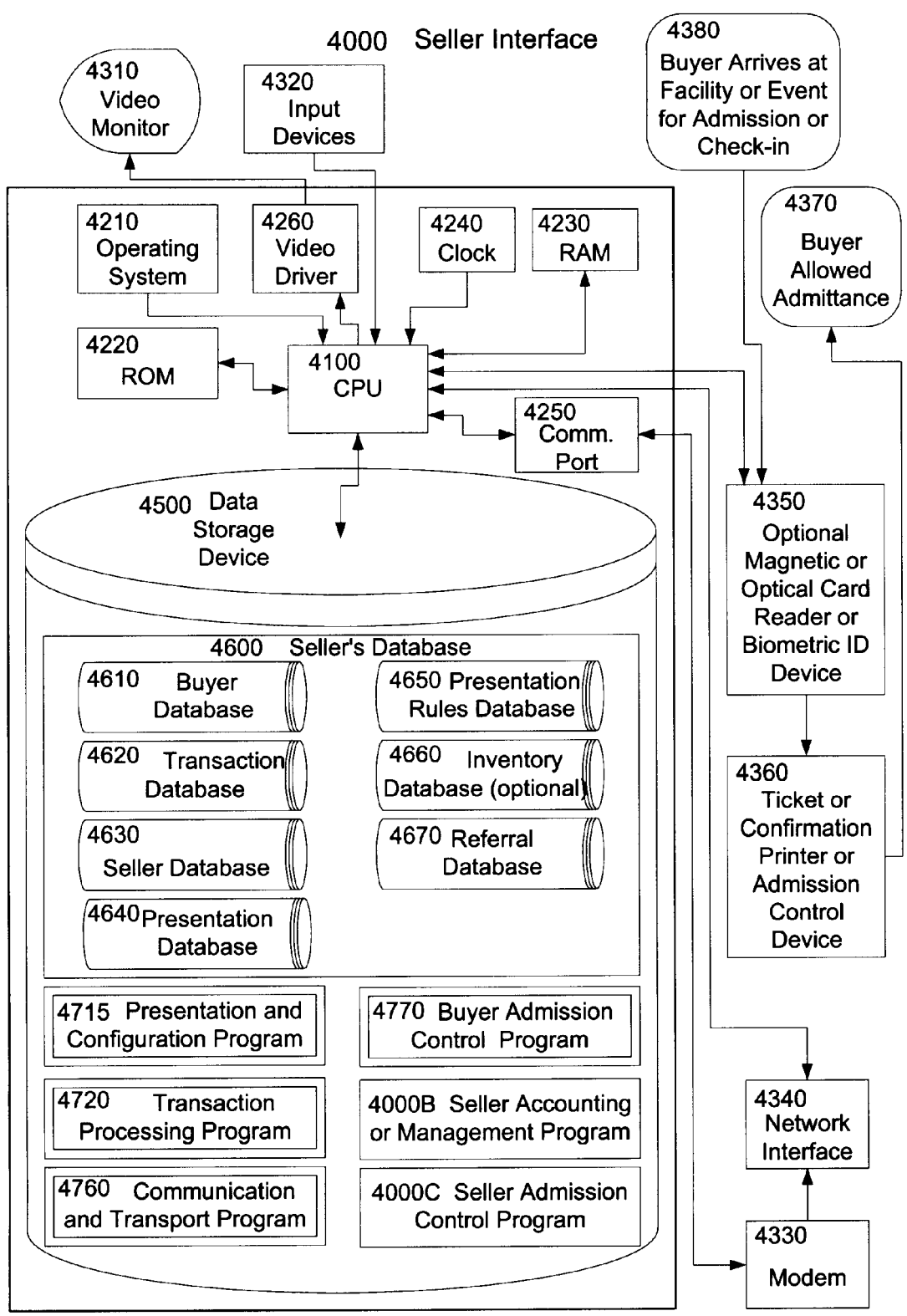
FIG. 2c is a block diagram showing one embodiment of the Seller Interface.

The Transaction Processing Program 1720 confirms available inventory and rates/pricing, updates any other Central Presentation and Selection Servers 2000 FIG. 2b and Independent Presentations Directories and Indexes 3000 FIG. 1b if necessary, updates databases, and creates and sends the transaction message to the Seller Interface 4000 FIG. 2c. The transmission of transaction messages from the Central Controller and Presentation Processor 1000 to the Seller Interface 4000 FIG. 2c takes place immediately upon processing, as there is no provision for holding those messages at this level. New Media presentation selections of the non-resident media offerings made by the Sellers are processed immediately upon receiving them from the Seller Interface 4000 and are sent to the Media Interface 6000.

With this embodiment of the present invention, the General Management Program 1730 is responsible for the business accounting, billing and collections, reporting, trend analysis, general Seller maintenance, and any other necessary functions.

Figure 2D:
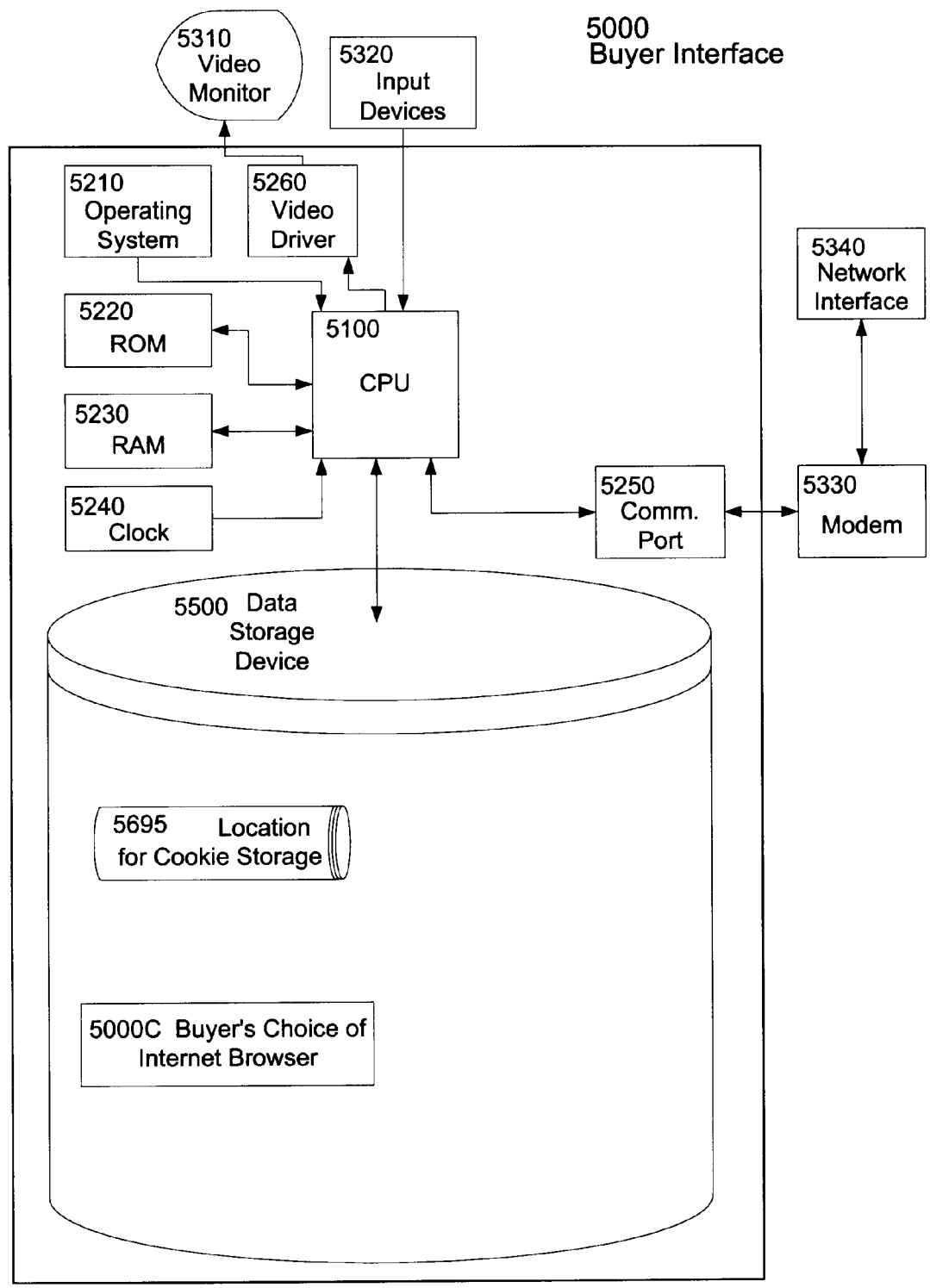
FIG. 2d is a block diagram showing one embodiment of the Buyer Interface.
Figure 2E:
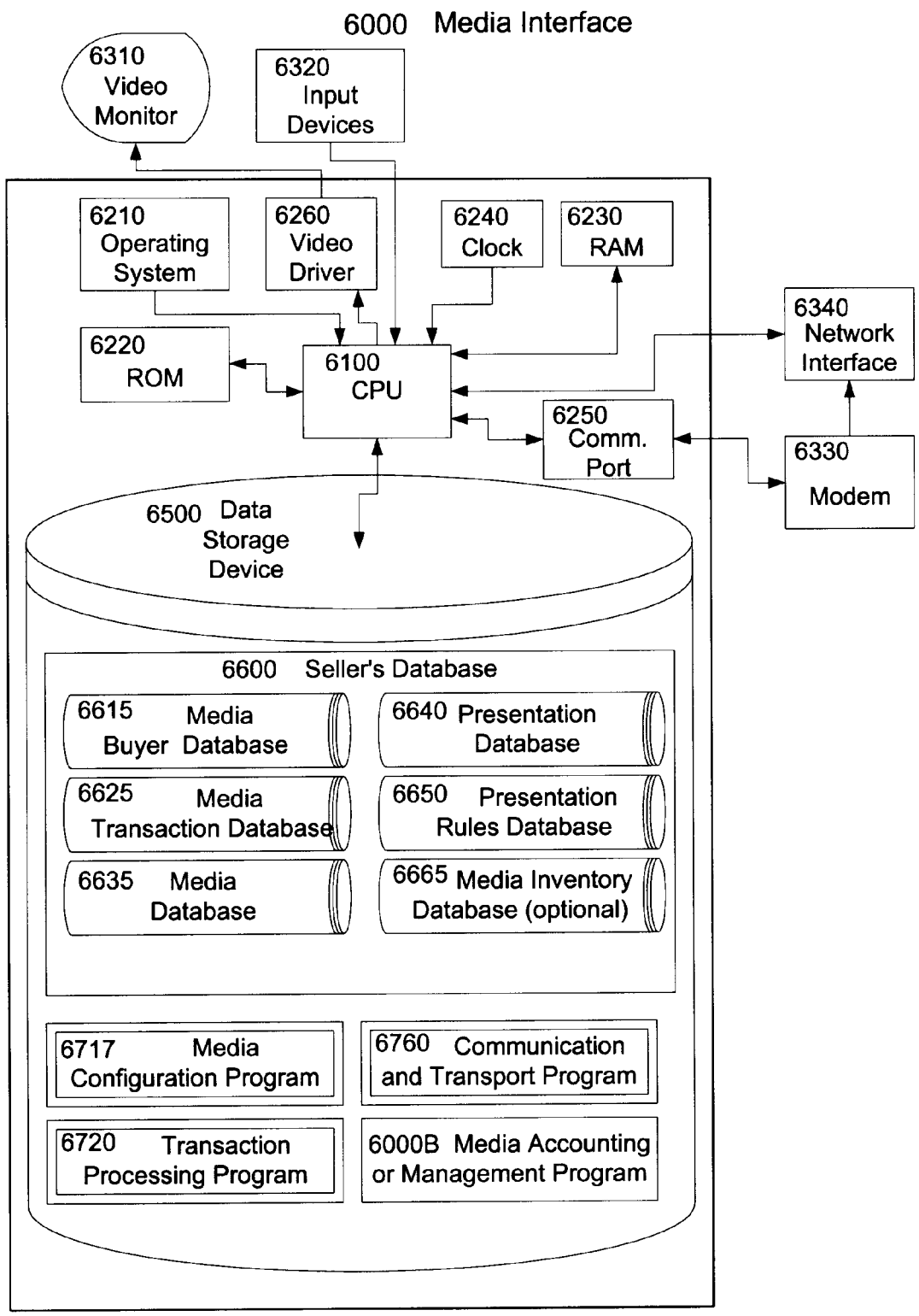
FIG. 2e is a block diagram showing one embodiment of the Media Interface.

Within this embodiment of the present invention, the Communication and Transport Program 1760 monitors, directs, and controls the receiving and transmitting of messages between the Central Controller and Presentation Processor 1000, Seller Interface 4000 FIG. 2c, and the Media Interface 6000 FIG. 2e.

FIG. 2b diagrams the Central Controller and Presentation Processor 2000, which includes a central processor (CPU) 2100, operating system 2210, ROM 2220, RAM 2230, clock 2240, video driver 2260, video monitor 2310, input devices 2320, network interface 2340, and data storage device 2500.

A personal, workstation, or server-grade computer with sufficient processing capacity, program and data storage capacity, and memory may be used as a Central Presentation and Selection Server 2000. The CPU 2100 may be a single CPU or multiple CPUs as necessary to provide sufficient processing capacity. The Intel Pentium II Processor with a speed of 300 MH or any comparable capacity processor that is compatible with the chosen operating system could be used as CPU 2100. The operating system 2210 should be one that allows for multiple processors, such as Windows NT by Microsoft, so that increases in utilization of the present invention can be handled with increases of processing capacity. The video monitor 2310 is a standard "SVGA" color monitor or its equivalent. The input devices 2320 are a standard keyboard and mouse or other replacement items or methods.

The data storage device 2500 may be one or a combination of standard hard disks, optical storage devices, CD-W drives, CD-RW drives, DVD, flash memory, magnetic tape, or other data storage devices. It must be of sufficient capacity to store all the programs and data necessary as well as provide for future capacity needs. In this embodiment of the present invention, mirrored hard disks with separate hard disk controllers provide a redundancy of data storage and therefore increased dependability and data integrity. This configuration allows for easier recovery in case of data corruption or data storage equipment failure. The aforementioned Windows NT operating system allows for this mirrored configuration. In addition to the mirrored hard disk, daily or more frequent backup of all data to tape, which is then taken off-site for storage, is a required procedure to ensure safe data.

The data storage device 2500 in this embodiment of the present invention contains relational databases controlled and managed by database software such as Microsoft SQL Server 7 by Microsoft Inc. The data used in the Central Presentation and Selection Server 2000 and in the processing of inventory sales in the present invention is contained within the Presentation and Selection Server Databases 2600. The Presentation and Selection Server Databases are the Buyer Database 2610, Transaction Database 2620, Final Presentation Database 2645, Inventory Database 2660, Referral Database 2670, and any other databases necessary or desired to service the Buyers and Sellers.

The Buyer Database 2610 maintains data on Buyers who make purchases or reservations for the products, goods, or services offered by the Sellers over the Central Presentation and Selection Server 2000 or other Independent Presentation Directories and Indexes 3000 FIG. 1*b*. The Buyer Database 2610 will have data fields containing Buyer name, network or delivery ID, physical address, phone, email address, credit card information, and any other information deemed necessary to support the Buyers and the requirements of the proposed Sellers. The Buyer has the option to input the information when joining the network prior to attempting to make a purchase or reservation. As an alternative, the Central Presentation and Selection Server 2000 will prompt the Buyer for the information after the Buyer has found a desired product, good, or service to purchase, but before forwarding the purchase transaction to the Central Controller and Presentation Processor 1000 FIG. 2*a*. The information contained in the Buyer Database 2610 is synchronized with that in the Buyer Database 1610 FIG. 2*a* on the Central Controller and Presentation Processor 1000 FIG. 2*a*. It should be noted that if an embodiment of the present invention is configured with more than one Central Presentation and Selection Server 2000 and is controlled by a single Central Controller and Presentation Processor 1000 (as in FIG. 1*b*). Then the Buyers represented on each Central Presentation and Selection Server 2000 Buyer Database 2610 will be represented on the Central Controller and Presentation Processor 1000 Buyer Database 1610 FIG. 2*a*. However all Buyers on Buyer Database 1160 may not be represented on each Central Presentation and Selection Server 2000 Buyer Database 2610. A similar relationship exists between the Central Controller and Presentation Processor 1000 and the Seller Interface 4000 in that all Buyers are represented within the Buyer Database 1610 FIG. 2*a*., but only those Buyers that any given Seller has had transactions with are represented within the Buyer Database 4610 FIG. 2*c* of any given Seller. It should also be noted that any given Buyer might choose to utilize any or all Central Presentation and Selection Servers 2000 controlled by the Central Controller and Presentation Processor 1000. When this happens, the information contained within the associated Buyer Databases 2610 would be the same, but the Transaction Databases 2620 would be different, because the Transaction Database 1620 FIG. 2*a* represents the cumulative transactions made by that particular buyer.

The Transaction Database 2620 maintains data on the Buyers' purchases of products, goods, or services offered by the Sellers over the Central Presentation and Selection Server 2000 or other Standalone Presentations or Independent Presentation Directories and Indexes 3000 FIG. 1*b*. The Transaction Database 2620 will have data fields containing information that relates to the purchases or reservations made by the Buyer. The specific fields within the Transaction Database 2620 will depend on the type of Seller and their product, goods, or service, but would always contain the field for the purchase or reservation tracking ID. As an example, if an embodiment of the present invention were configured to present lodging facilities, the Transaction Database 2620 might contain fields for Buyer ID, room type or specific room, bed type, check-in date, check-out date, number of adults, number of children, smoking or non-smoking, room rate paid, taxes paid, responses to requests, and any special requests such as extra pillows, late check-in, airport pickup service, etc. The information in the Transaction Database 2620 is the result of each requested purchase or reservation made with the Central Presentation and Selection Server 2000; this information is then passed to the Central Controller and Presentation Processor 1000 FIG. 2*a* and then to the Seller Interface 4000. The relationship between the Central Controller and Presentation Processor 1000 Transaction Database 1620 FIG. 2*a* and the Central Presentation and Selection Server 2000 Transaction Database 2620 is the same as the relationship between the Buyer Database 1610 FIG. 2*a* and Buyer Database 2610 explained above.

The Final Presentation Database 2645 will have data fields containing information that relates to the Sellers' presentations of their products, goods, or services to the Buyers on this instance of the Central Presentation and Selection Server 2000. This is data that has been designed, edited and created by the Presentation Generation Program 1710 FIG. 2*a* of the Central Controller and Presentation Processor 1000 FIG. 2*a* and then transmitted to the instance of the Central Presentation and Selection Server 2000 for presentation to the Buyers. The data fields held by Final Presentation Database 2645 will vary from seller type to seller type, depending on the structure and design of the presentations. As an example, if an embodiment of the invention were configured to present lodging facilities, the Final Presentation Database 2645 might contain fields for combined facility descriptions, room descriptions, facility amenities, room amenities, payment types accepted, meeting rooms, policies, and any other information to assist in the presentation and sale of the lodging. These fields, as used in the lodging example, would contain information for all the lodging facilities represented. The Final Presentation Database 2645 is the result of the information contained within the Presentation Database 1640 FIG. 2*a* processed by the Presentation Generation Program 1710 FIG. 2*a* in conjunction with the information contained in the Presentation Rules Database 1650 FIG. 2*a*. There is no synchronization of this data, as it only exists for the presentations on a given Central Presentation and Selection Server 2000 and is generally not transferable to other Central Presentation and Selection Servers 2000 due to differing presentation designs and structures. However the Presentation Generation Program 1710 FIG. 2*a*, using the Presentation Rules Database 1650 FIG. 2*a* and the Presentation Location Database 1680 FIG. 2*c* to identify and create the differing presentations, maintains the control of the various presentation designs and structures.

The Inventory Database 2660 will have data fields containing information that monitors and controls the inventory of products, goods, and services offered for sale by the Sellers. In the preferred embodiment of the present invention, the Inventory Database 2660 is synchronized with the Inventory Database 1660 FIG. 2*a* and the Seller Accounting or Management Program 4000B FIG. 2*c* depending on the inventory type (see discussion on Resource Saver Protocol). The Inventory Database 2660 can also be used as an alternative to Seller Accounting or Management Program 4000B with the optional Inventory Database 4660 FIG. 2*c*. The data fields held by the Inventory Database 2660 will vary from seller type to seller type, depending on the type of products, goods, or services that are being sold or reserved. As an example, if an embodiment of the present invention were configured to present lodging facilities, the Inventory Database 2660 might contain fields for Buyer ID, types of rooms, number of rooms available for each type, blocked rooms, blocked dates, exception date rates, and any other fields necessary to present and control that room inventory.

The Referral Database 2670 will have data fields containing information, from the Sellers and from the input of the management of the given instance of the present invention. This data refers Buyers to other sources of the same products, goods, or services offered when a given Seller cannot meet the wishes or needs of the Buyer. The information within the Referral Database 2670 is synchronized with the Referral Database 1670 FIG. 2*a*. See discussion of Referral Database 1670 FIG. 2*a* for reasons and origin of data.

The preferred embodiment of the Central Presentation and Selection Server 2000 has a Transaction Negotiation Program 2725, Presentation Server 2740, Selection Server 2750, and other programs as necessary.

Within the embodiment of the present invention, the Transaction Negotiation Program 2725 is responsible for the negotiations and processing of all sales and/or reservation of products, goods, and services.

The Transaction Negotiation Program 2725 of the Central Presentation and Selection Server 2000 negotiates the interactive transaction with the Buyer. The program facilitates the transaction by presenting products, goods, services, offerings, options, add-on items, rates or prices, availability, alternatives or discounts in response to unavailable or denied requests, and other choices to assist the Buyer in making the purchase transaction. During the transaction negotiations, the inventory is held or reserved for that particular Buyer. If the Buyer does not complete the purchase or reservation, the inventory is made available once again. Once the Buyer makes a purchase or reservation decision, the inventory is deemed sold and taken off the available inventory list, and the Transaction Negotiation Program 2725 transmits a transaction message to the Central Controller and Presentation Processor 1000 for confirmation and processing. This transmission either takes place immediately or on a delayed or batch basis depending on the type of inventory being sold or reserved and the settings entered by the Seller. The Transaction Processing Program 1720 FIG. 2*a* of the Central Controller and Presentation Processor 1000 FIG. 2*a* performs some of the same functions and calculations as the Transaction Negotiation Program 2725 of the Central Presentation and Selection Server when it receives the transaction message. This duplication serves as both a check of the processes and a validation of the transaction message. It should be noted that although the Transaction Negotiation Program 2725 is referred to as a program, in the embodiment of the present invention it is a collection of programs, procedures and functions that work with the Selection Server 2750 to provide the selection and negotiation environment in which the Buyer can purchase or reserve the products, goods, or services.

The Presentation Server 2740 is a fully functioning Internet or Intranet Web server. In the preferred embodiment of the present invention, the Internet Information Server by Microsoft is the Presentation Server 2740. The Presentation Server 2740 performs the function of controlling the Buyers' access to the Sellers' presentations through the Internet or Intranet. The Presentation Server 2740 is able to allow access either with or without login and password control (in the embodiment of the present invention, no password control is used). The Presentation Server 2740 would allow full access to the Open Access Presentations 2810 without restrictions.

The Selection Server 2750 is a fully functioning Internet or Intranet Dynamic Page Server. This is a server or server component that allows for presentations to be made based on the actions of the user and the functions or algorithms of the presentation designer or programmer. In this embodiment of the present invention, the server component, Active Server Pages by Microsoft, is added to the Presentation Server 2740 to provide this dynamic functionality. The Selection Server 2750 provides the control and access to the presentations held within the Dynamic Presentations 2820. These presentations are only accessible from presentations held within Open Access Presentations 2810 and cannot be independently viewed or accessed.

The embodiment of the Central Presentation and Selection Server 2000 has directory structures Open Access Presentations 2810, Dynamic Presentations 2820, and other directory structures as necessary. Not only do these directory structures provide the physical storage location for the presentation files, but they also provide the framework and path references for access to the presentations by using the Presentation Server 2740 and the Selection Server 2750.

FIG. 2*c* diagrams the Seller Interface 4000, which includes a central processor (CPU) 4100, operating system 4210, ROM 4220, RAM 4230, clock 4240, communication ports 4250, video driver 4260, video monitor 4310, input devices 4320, modem 4330, network interface 4340, and data storage device 4500. This embodiment of the present invention would also include a Magnetic or Optical Card Reader or Biometric ID Device as well as a Ticket or Confirmation Printer or Admission Control Device.

A personal, workstation, or server-grade computer with sufficient processing capacity, program and data storage capacity, and memory may be used as a Seller Interface 4000. The CPU 4100 may be a single CPU or multiple CPUs as necessary to provide sufficient processing capacity. The Intel Pentium II Processor with a speed of 300 MH or any comparable capacity processor that is compatible with the chosen operating system could be used as CPU 4100. In this embodiment of the present invention, the operating system 4210 is Windows NT by Microsoft, although Windows 98 by Microsoft should be sufficient in most cases. The video monitor 4310 is a standard "SVGA" color monitor or its equivalent, with this embodiment of the present invention being a 19-inch standard video monitor. The input devices 4320 are a standard keyboard and mouse or other replacement items. The communication ports 4250 are RS232 serial ports with 16550 UART or alternatives that provide comparable connections to the Modem 4330. The Modem 4330 may be a US Robotics 56K external made by 3Com Inc or a comparable quality modem.

A data storage device 4500 may be one or a combination of standard hard disks, optical storage devices, CD-W drives, CD-RW drives, DVD, flash memory, magnetic tape, or other data storage devices. It must be of sufficient capacity to store all the programs and data necessary as well as provide for future capacity needs. In this embodiment of the present invention, mirrored hard disks with separate hard disk controllers provide a redundancy of data storage and therefore increased dependability and data integrity. This configuration allows for easier recovery in case of data corruption or data storage equipment failure. The aforementioned Windows NT operating system allows for this mirrored configuration. In addition to the mirrored hard disk, daily or more frequent backup of all data to tape, which is then taken off-site for storage, is a required procedure to ensure safe data. The present invention has a degree of data security built into it by design, with the most critical data kept with both the Seller Interface 4000 and the Central Controller and Presentation Processor 1000 FIG. 2*a*. In a catastrophic destruction of the Seller Interface 4000, the most critical of data can be recovered from the Central Controller and Presentation Processor 1000 FIG. 2*a* and allow the rebuilding of the lost databases, thereby ensuring the integrity of all transactions.

The data storage device in this embodiment contains relational databases controlled and managed by database software such as Microsoft SQL Server 7 by Microsoft Inc. or, for smaller Sellers, Access 2000 by Microsoft Inc. Data used in the generation of presentations and for the processing of inventory sales in the present invention is contained within the Seller's Databases 4600. The Seller's Databases 4600 contains the Buyer Database 4610, Transaction Database 4620, Seller Database 4630, Presentation Database 4640, Presentation Rules Database 4650, Inventory Database 4660, Referral Database 4670, and any other databases necessary or desired to service the Sellers.

The Buyer Database 4610 maintains data on Buyers who make interactive purchases or reservations of the products, goods, or services offered by the Sellers over the Central Presentation and Selection Server 2000 FIG. 2*b* or other Independent Presentation Directories and Indexes 3000 FIG. 1*b*. The Buyer Database 4610 will have data fields containing Buyer name, network or delivery ID, physical address, phone, email address, credit card information, and any other information deemed necessary to supported the Buyers and the requirements of the Seller. The information within the Buyer Database 4610 is contained in transaction messages received from the Central Controller and Presentation Processor 1000 FIG. 2*a* along with the purchase information of a given transaction.

The Transaction Database 4620 maintains data on the Buyers' interactive purchases or reservations of products, goods, or services offered by the Sellers over the Central Presentation and Selection Server 2000 FIG. 2*b* or other Independent Presentation Directories and Indexes 3000 FIG. 1*b*. The Transaction Database 4620 will have data fields containing information that relates to purchases or reservations made by the Buyer. The specific fields within this database will depend on the type of Seller and their products, goods, or services, but would always contain the field for the purchase or reservation tracking ID. As an example, if an embodiment of the present invention were configured to present lodging facilities, the Transaction Database 4620 might contain fields for Buyer ID, room type or specific room, bed type, check-in date, check-out date, number of adults, number of children, smoking or non-smoking, room rate paid, taxes paid, and special requests such as extra pillows, late check-in, airport pickup service, etc. The information in the Transaction Database 4620 is the result of each requested purchase made with the Central Presentation and Selection Server 2000 FIG. 2*b*. This information is then passed, via transaction messages, to the Central Controller and Presentation Processor 1000 FIG. 2*a* and then to the Seller Interface 4000.

The Seller Database 4630 will have data fields containing information that relates to the Seller. The specific fields within the Seller Database 4630 will cover all the necessary information on the Seller, for use both within the Seller's presentation and by the managers of the present invention for the management of the Seller's account. The Seller Database 4630 will have data fields containing company name, contact name, marketing name, physical address, phone, email address, credit card or other payment information, contract dates, product or reservation types for presentation, data transfer modem numbers, accessible third-party management software, and any other information fields deemed necessary to supported the proposed seller. The seller will input this information when first accessing the present invention and joining as a Seller. The Configuration and Presentation Program 4715 will prompt the Seller for the necessary information as well as obtain an agreement to a contract for the services of the present invention and the distribution and payment of all presentations.

The Presentation Database 4640 will have data fields containing information that relates to the Seller's choice of non-resident media or advertising channels as well as to the interactive presentation of information and data describing their products, goods, or services for presentation to the Buyers. The data fields within Presentation Database 4640 will vary from seller type to seller type, depending on the design of the presentation and the types of other media offered by the given instance of the present invention. As an example, if an embodiment of the present invention were configured to present lodging facilities, the Presentation Database 4640 might contain fields for facility description, facility photos, room descriptions, room photos, facility amenities, room amenities, room service menu, payment types accepted, meeting and reception services offered, meeting rooms, photos of meeting rooms, policies, rates, special package offers, media or advertising channel choices, and any other information to assist in the presentation and sale of the lodging. The Configuration and Presentation Program 4715 will prompt the Seller for the necessary information for the presentations desired by the Seller. The data relationship between the Presentation Database 4640 and the Presentation Database 1640 FIG. 2*a* part of the Central Controller and Presentation Processor 1000 FIG. 2*a* is one of continual synchronization of the Seller's information. The synchronization is maintained by the Presentation and Configuration Program 4715 and the Communication and Transport Program 4760. The seller makes any updates or corrections to the presentation within the Presentation and Configuration Program 4715. These corrections are then updated to the Presentation Database 4640 and sent to the Central Controller and Presentation Processor 1000 for updating to the Presentation Database 1640 FIG. 2*a*.

The Presentation Rules Database 4650 will have data fields containing information that controls and limits the style and editing of the presentations created by the Seller using the Presentation and Configuration Program 4715. The data within the Presentation Rules Database 4650 will be synchronized with the data within the Presentation Rules Database 1650, which is stored on the Central Controller and Presentation Processor 1000 FIG. 2*a*. This synchronization will take place by the sending of updates from the Central Controller and Presentation Processor 1000 FIG. 2*a* to the Presentation and Configuration Program 4715. The data fields contained in the Presentation Rules Database 4650 will vary from seller type to seller type, depending on the types of media and interactive presentations that are supported by the given instance of the present invention and the design of the presentations. Some fields that might be maintained are presentation templates; blocked words; blocked phrases; blocked references; blocked URLs; grammar guidelines; spelling dictionaries; presentation size restrictions; photo or graphics specifications such as size, compression, and file format; and any other guidelines, benchmarks, or controlling algorithms.

The Inventory Database 4660 will have data fields containing information that monitors and controls the inventory of products, goods, and services offered for sale or reservation by the Sellers within the interactive sales portion of the present invention. In the preferred embodiment of the present invention, the inventory data is maintained by the Seller Accounting or Management Program 4000B. If that software cannot communicate or can only communicate partial data with the present invention, then the Inventory Database 4660 would be used alone or in combination with the Seller Accounting or Management Program 4000B, respectively The embodiment of the present invention communicates with the Seller Accounting or Management Program 4000B for the synchronization of inventory and other data that can be coordinated. The data fields within the Inventory Database 4660 will vary from seller type to seller type, depending on the type of products, goods, or services that are being sold or reserved. As an example, if an embodiment of the present invention were configured to present lodging facilities, the Inventory Database 4660 might contain fields for Buyer ID, types of rooms, number of rooms available for each type, blocked rooms, blocked dates, exception date rates, and any other fields necessary to present and control that room inventory.

The Referral Database 4670 will have data fields containing information from the Sellers that refers Buyers to other sources of the same products, goods, or services offered when the Sellers cannot meet the wishes or needs of the Buyers. The Seller through prompting by the Presentation and Configuration Program 4715 provides the information within the Referral Database 4670. This information is intended and designed to provide the Buyer with alternative sources when the products, goods, or services offered interactively by a given Seller are either not available or do not meet the needs of the Buyer. The data fields held by the Referral Database 4670 will vary from seller type to seller type, depending on the type of products or services that are being sold or reserved. As an example, if an embodiment of the present invention were configured to present lodging facilities, the Referral Database 4670 might contain fields for alternative accommodations, dates, or lodging facilities. An embodiment of the present invention configured to present professional services might contain alternative professionals or associates that might be acceptable to the Buyer.

The programs of the preferred embodiment of Seller Interface 4000 are a Presentation and Configuration Program 4715, Transaction Processing Program 4720, Communication and Transport Program 4760, Buyer Admission Control Program 4770, Seller Accounting or Management Program 4000B, Seller Admission Control Program 4000C, and other programs as may be necessary or desirable.

The Presentation and Configuration Program 4715 is both the gateway to the present invention and the controlling software interface for the Seller. The Presentation and Configuration Program 4715 introduces the Seller to the instance of the present invention and allows the Seller to choose in which presentations and which media or advertising channels the Seller wishes to participate. The Presentation and Configuration Program 4715 offers the choices of media and presentations to the Seller, giving requirements and cost for each. Upon choosing media and presentations, the Seller is then presented with a series of questions to answer. The answering of these questions contributes to the Seller Database 4630, Presentation Database 4640, Inventory Database 4660, Referral Database 4670, and any other databases necessary. The responses to the questions asked, text entry areas, photos, graphics, and other input, either required or optional, are monitored by the Presentation and Configuration Program 4715 using the information within the Presentation Rules Database 4650 to guide the Seller in the creation of a presentation that meets the style, editorial, and content guidelines of that instance of the present invention for each media venue or outlet chosen.

Within this embodiment of the present invention, the Transaction Processing Program 4720 is not utilized, as its functions are performed by the Seller Accounting or Management Program 4000B. If there is no Seller Accounting or Management Program 4000B or it is not able to handle those functions, then the Transaction Processing Program 4720 will perform the necessary functions to process the incoming Transaction Messages; update databases; notify Seller of product, goods, or services sold or reserved; notify Seller of prices or rates paid; perform the necessary confirmations of available inventory and rates/pricing; create or send confirmation messages to buyer or other requested confirmation methods; and perform other functions necessary to process the incoming transaction.

The Communication and Transport Program 4760 monitors, directs, and controls the receiving and transmitting of messages between the Seller and the Central Controller and Presentation Processor 1000 FIG. 2*a*. During the setup of the Presentation and Configuration Program 4715, the Communication and Transport Program 4760 is initialized and tested with the Modem 4330 and/or Network Interface 4340. The functions of the Communication and Transport Program 4760 are largely transparent to the Seller. It should be noted, however, that in this embodiment of the present invention, the Seller Interface 4000 should be left on, with the Communication and Transport Program 4760 running, 24 hours a day, 7 days a week. This is necessary so that the Transaction Processing Program 4720 can receive and process any transaction messages from the Central Controller and Presentation Processor 1000 FIG. 2*a* regardless of the hour of the day.

The Buyer Admission Control Program 4770 is present and utilized in the preferred embodiment of the present invention if the Seller's products, goods, or services lend themselves to the type of access control that has traditionally been accomplished using tickets, passes, admission documents, reservations, reservation confirmations, or other physical evidence of purchase or authorization. In this embodiment of the present invention, the Buyer Admission Control Program 4770 may be replaced with Seller Admission Control Program 4000C, a third-party program that is either currently in use or is preferred by the Seller. Normally, communications in the form of admission-controlling messages must be from either the Transaction Processing Program 4720 or the Seller Accounting or Management Program 4000B to the Buyer Admission Control Program 4770 or the Seller Admission Control Program 4000C, depending upon which software is used. In some instances, however, the Seller Accounting or Management Program 4000B may assume the duties of the Seller Admission Control Program 4000C. The Buyer Admission Control Program 4770 or the Seller Admission Control Program 4000C uses the information in the Buyer Database 4610 to confirm the admission or access of a given Buyer who is physically at the Seller's facility, site, business, venue, or other physical location seeking access. In this embodiment of the present invention, the information from the Buyer Database 4610 is confirmed by use of a magnetic or optical card reader portion of the Optional Magnetic or Optical Card or Biometric ID Device 4350 that reads the physical ID or their Biometric ID in the possession of the Buyer. This physical Magnetic or Optical Card ID is one that was previously issued to the Buyer for another use and is currently valid for that use. It could be a standard credit card, association ID, school ID, credit union ID, a driver's license, or any other "issued ID" that has been approved for use by the management of any given instance of the invention. This feature of the invention, of having the latitude to accept a variety of existing methods of identification, is important in that it allows the Buyer immediate access without requiring the Buyer to be processed to obtain a new ID. An example of this use within an embodiment of the present invention would be a "Major Credit Card" that has agreed to allow its cards to be used as identification for purchases within the invention. An example of this "alternate ID" use would be an instance of the invention that was established as a "Sports Reservation Network". When the Buyer chooses the event that he wants to attend, he would enter the number off of his "Major Credit Card" into the Buyer Interface 5000 FIG. 2d. When the Buyer arrived at the Facility or Event for Admission or Check-in 4380, the Magnetic or Optical Card Reader 4350 would read his "Major Credit Card". The Magnetic or Optical Card Reader 4350, in conjunction with the Buyer Admission Control Program 4770, which draws its information from the Buyer Database 4610, would confirm the Buyer's admission and send the ticket information to the Ticket or Confirmation Printer or Admission Control Device 4360. The Ticket or Confirmation Printer or Admission Control Device 4360 would either print the tickets, allowing the buyer to proceed to the standard ticket entry point, or trip a physical gate or bar that would allow the Buyer entry to the event (Buyer Allowed Admittance 4370).

In another example of an embodiment of the invention, the management of the invention has chosen to support the Biometric Identification method for assessing and guaranteeing the identity of the Buyer. With this method, the Buyer is first registered to use the invention by one of the Sellers who is part of the network and is equipped to perform the appropriate biometric scan. After the Buyer presents proof of identify, they submit to the biometric scan which is then transmitted to the Central Controller and Presentation Processor to become part of the Buyer's record. The Buyer is given an ID number to allow access to the invention. The next time the Buyer accesses the invention he can use the ID number to make the purchase and then when showing up at that facility his Biometric Scan becomes his ID. Biometric IDs can be any biological feature of the Buyer that is so deemed to be sufficiently unique that it can be used as a method of identification. Features such as fingerprints, palm prints, iris scans, voice, and full-face scans are just some of the currently accepted biometric identification methods. We believe this list of methods will expand and that new methods can easily be utilized by an embodiment of this invention as they are developed and become available. It should be noted that the level of certainty necessary for determining identification using biometric techniques is obviously lower for use in the present invention than the certainty required for other critical applications such as law enforcement or military security access.

In yet another example of an embodiment of the invention, the management of the invention has chosen to support a function to allow Buyers to access their identification documents through the Network in combination with their biometric identification for the purchasing of goods and services. In this embodiment the Buyer is allowed to make purchases of goods and services from those Sellers that support biometric identification using only their personal biometric identification. The charges or payments requested and the biometric ID submitted by the Seller are transmitted to the Central Controller and Presentation Processor 1000 FIG. 2a. The Transaction Processing Program 1720 verifies the biometric ID with the information held within the Buyer Database 1610. The Transaction Processing Program 1720 further verifies that sufficient funds are available for the requested transaction, either through third party sources such as the Identification Documents sponsor or through in-house financing or accounts. The acceptance or rejection of the transaction is then transmitted back to the Seller for the Sellers completion of the purchase or transaction.

FIG. 2d diagrams the Buyer Interface 5000, which includes a central processor (CPU) 5100, operating system 5210, ROM 5220, RAM 5230, clock 5240, communication port 5250, video monitor 5310, input devices 5320, modem 5330, network interface 5340, and data storage device 5500.

A personal or workstation computer with sufficient processing capacity, program and data storage capacity, and memory may be used as a Buyer Interface 5000. The CPU 5100 may be a single CPU. The Intel Pentium Processor with a speed of 166 MH or any comparable capacity processor that is compatible with the chosen operating system could be used as CPU 5100. In the preferred embodiment of the present invention, the operating system 5210 is either Windows 95 or Windows 98 by Microsoft. The video monitor 5310 is a standard 17-inch "SVGA" color monitor or its equivalent. The input devices 5320 are a standard keyboard and mouse or other replacement items. The communication ports 5250 are RS232 serial ports with 16550 UART or alternatives that provide comparable connections to the Modem 5330. The Modem 5330 may be a modem such as the US Robotics 56K external made by 3Com Inc.

A Data Storage Device 5500 may be one or a combination of standard hard disks, optical storage devices, CD-W drives, CD-RW drives, DVD, flash memory, or other data storage devices. It must be of sufficient capacity to store the programs necessary to access the Sellers' presentations.

The hardware requirements for the Buyer Interface 5000 are minimal compared to the requirements for the Central Controller and Presentation Processor 1000 FIG. 2a, Central Presentation and Selection Server 2000 FIG. 2b, and the Seller Interface 4000 FIG. 2c.

The only software or programs required for the Buyer Interface 5000 is an Internet Browser 5000C of the Buyer's choice. In the embodiment of the present invention, Internet Explorer by Microsoft would be used as Buyer's Choice of Internet Browser 5000C.

No databases are required for the Buyer Interface 5000. The only data storage required is performed by the Buyer's Choice of Internet Browser 5000C in the form of saving "cookies" in the Location for Cookie Storage 5695.

Although the above has described the preferred embodiment of the present invention, any Internet-enabled computer, operating system, and browser combination that can access the Internet and specifically standard HTML presentations should be able to serve as the Buyer Interface 5000.

FIG. 2e diagrams the Media Interface 6000, which includes a central processor (CPU) 6100, operating system 6210, ROM 6220, RAM 6230, clock 6240, communication ports 6250, video driver 6260, video monitor 6310, input devices 6320, modem 6330, network interface 6340, and data storage device 6500.

A personal, workstation, or server-grade computer with sufficient processing capacity, program and data storage capacity, and memory may be used as a Media Interface 6000. The CPU 6100 may be a single CPU or multiple CPUs as necessary to provide sufficient processing capacity. The Intel Pentium II Processor with a speed of 300 MH or any comparable capacity processor that is compatible with the chosen operating system could be used as CPU 6100. In this embodiment of the present invention, the operating system 6210 is Windows NT by Microsoft, although Windows 98 by Microsoft should be sufficient in most cases. The video monitor 6310 is a standard "SVGA" color monitor or its equivalent, with this embodiment of the present invention being a 19-inch standard video monitor. The input devices 6320 are a standard keyboard and mouse or other replacement items. The communication ports 6250 are RS232 serial ports with 16550 UART or alternatives that provide comparable connections to the Modem 6330. The Modem 6330 may be a US Robotics 56K external made by 3Com Inc or a comparable quality modem.

A data storage device 6500 may be one or a combination of standard hard disks, optical storage devices, CD-W drives, CD-RW drives, DVD, flash memory, magnetic tape, or other data storage devices. It must be of sufficient capacity to store all the programs and data necessary as well as provide for future capacity needs. In this embodiment of the present invention, mirrored hard disks with separate hard disk controllers provide a redundancy of data storage and therefore increased dependability and data integrity. This configuration allows for easier recovery in case of data corruption or data storage equipment failure. The aforementioned Windows NT operating system allows for this mirrored configuration. In addition to the mirrored hard disk, daily or more frequent backup of all data to tape, which is then taken off-site for storage, is a required procedure to ensure safe data. The present invention has a degree of data security built into it by design, with the most critical data kept with both the Media Interface 6000 and the Central Controller and Presentation Processor 1000 FIG. 2a. In a catastrophic destruction of the Media Interface 6000, the most critical of data can be recovered from the Central Controller and Presentation Processor 1000 FIG. 2a and allow the rebuilding of the lost databases, thereby ensuring the integrity of all transactions.

The data storage device in this embodiment contains relational databases controlled and managed by database software such as Microsoft SQL Server 7 by Microsoft Inc. or, for smaller Media outlets, Access 2000 by Microsoft Inc. Data used in the generation of presentations and for the processing of inventory sales in the present invention is contained within the Media's Databases 6600. The Media's Databases 6600 contains the Media Buyer's Database 6615, Media Transaction Database 6625, Media Database 6635, Presentation Database 6640, Presentation Rules Database 6650, Media Inventory Database 6665, and any other databases necessary or desired to service the Media.

The Media Buyer Database 6615 maintains data on Sellers who make interactive purchases of presentations offered by the Media over the Central Controller and Presentation Processor 1000 and the Seller Interface 4000. The Media Buyer Database 6615 will have data fields containing Seller name, physical address, phone, email address, credit card information, and any other information deemed necessary to supported the Media Buyers and the requirements of the Media. The information within the Buyer Database 6615 is contained in transaction messages received from the Central Controller and Presentation Processor 1000 FIG. 2a along with the media purchase information of a given transaction.

The Media Transaction Database 6625 maintains data on the Media Buyers' (Sellers') interactive selection and purchases of presentations offered by the Media over the Central Controller and Presentation Processor 1000 and the Seller Interface 4000. The Transaction Database 6625 will have data fields containing information that relates to the selection and purchases of presentations made by the Seller. The specific fields within this database will depend on the type of Media and their products and services. As an example, if an embodiment of the present invention were configured to offer newspaper advertising as a non-resident media the Media Transaction Database 6625 might contain fields for rates, publishing dates, publishing deadlines, etc. The information in the Media Transaction Database 6625 is the result of each requested purchase made with the Seller Interface 4000. This information is then passed, via transaction messages, to the Central Controller and Presentation Processor 1000 FIG. 2a and then to the Media Interface 6000.

The Media Database 6635 will have data fields containing information that relates to the Media. The specific fields within the Media Database 6635 will cover all the necessary information about the Media, for use both within the Media's presentation and by the managers of the present invention for the management of the Media's account. The Media Database 6635 will have data fields containing company name, contact name, marketing name, physical address, phone, email address, payment information, contract dates, product or service types for presentation, data transfer modem numbers, accessible third-party management software, and any other information fields deemed necessary to supported the proposed Media. The Media will input this information when first accessing the present invention and joining as a Media. The Media Configuration Program 6717 will prompt the Media for the necessary information as well as obtain an agreement to a contract between the Media and the management or operators of the present invention.

The Presentation Database 6640 will have data fields containing information that relates to the Media's interactive presentation of information and data describing their products or services offered to Media Buyers (Sellers). The data fields within Presentation Database 6640 will vary from Media type to Media type, depending on the design of the presentation and the types of other media offered by the given instance of the present invention. The Media Configuration Program 6717 will prompt the Media for the necessary information The data relationship between the Presentation Database 6640 and the Presentation Database 1640 FIG. 2a, part of the Central Controller and Presentation Processor 1000 FIG. 2a, is one of continual synchronization of the Media's information. The synchronization is maintained by the Media Configuration Program 6717 and the Communication and Transport Program 6760. The Media makes any updates or corrections to the presentation within the Media Configuration Program 6717. These corrections are then updated to the Presentation Database 6640 and sent to the Central Controller and Presentation Processor 1000 for updating to the Presentation Database 1640 FIG. 2a.

The Presentation Rules Database 6650 will have data fields containing information that controls and limits the style and editing of the presentations to be created by the Sellers using the Seller Interface 4000 and the Presentation and Configuration Program 4715 for this given Media's product or service. The data within the Presentation Rules Database 6650 will be synchronized with the data within the Presentation Rules Database 1650, which is stored on the Central Controller and Presentation Processor 1000 FIG. 2a. This synchronization will, take place by sending updates from the Media Interface to the Central Controller and Presentation Processor 1000 FIG. 2a. The data fields contained in the Presentation Rules Database 6650 will vary from Media type to Media type, depending on the types of media and interactive presentations that are supported by the given instance of the present invention and the design of the presentations. Some fields that might be maintained are presentation templates; blocked words; blocked phrases; blocked references; blocked URLs; grammar guidelines; spelling dictionaries; presentation size restrictions; photo or graphics specifications such as size, compression, and file format; and any other guidelines, benchmarks, or controlling algorithms.

The Media Inventory Database (optional) 6665 will have data fields containing information that monitors and controls the inventory of products and services offered by the Media within the interactive Presentation and Configuration Program 4715 of the Seller Interface 4000 of the present invention. In the preferred embodiment of the present invention, the Media Accounting or Management Program 6000B maintains the inventory data, If that software cannot communicate or can only communicate partial data with the present invention, then the Media Inventory Database 6665 would be used alone or in combination with the Media Accounting or Management Program 6000B, respectively. The embodiment of the present invention communicates with the Media Accounting or Management Program 6000B for the synchronization of inventory and other data that can be coordinated. The data fields within the Inventory Database (optional) 6665 will vary from Media type to Media type, depending on the type of products, goods, or services that are being sold or reserved. The reason that the Media Inventory Database 6665 is optional is that some media types such as newspaper classified ads or printed directories such as regional phone directories have no real limit as to the number or quantity of presentations that they can accept. Therefore there would be no need to track or control inventory.

The programs of this embodiment of Media Interface 6000 are; Media Configuration Program 6717, Transaction Processing Program 6720, Communication and Transport Program 6760, Media Accounting or Management Program 6000B, and other programs as may be necessary or desirable.

The Presentation and Configuration Program 6717 is both the gateway to the present invention and the controlling software interface for the Media. The Media Configuration Program 6717 introduces the Media to the instance of the present invention. The Media Configuration Program 6717 presents the Media with a series of questions to answer. The answering of these questions contributes to the Media Database 6635, Presentation Database 6640, Presentation Rules Database 6650, Media Inventory Database (optional) 6665, and any other databases necessary. The Media Configuration Program 6717 monitors the responses to the questions asked, text entry areas, photos, graphics, and other input, either required or optional.

Within this embodiment of the present invention, the Transaction Processing Program 6720 is not utilized, as the Media Accounting or Management Program 6000B performs its functions. If there is no Media Accounting or Management Program 600013 or it is not able to handle those functions, then the Transaction Processing Program 6720 will perform the necessary functions to process the incoming Transaction Messages. These messages may update databases; notify Media of product, goods, or services sold or reserved; notify Media of prices or rates paid; perform the necessary confirmations of available inventory and rates/pricing; create or send confirmation messages to buyer or other requested confirmation methods; and perform other functions necessary to process the incoming transaction.

The Communication and Transport Program 6760 monitors, directs, and controls the receiving and transmitting of messages between the Media and the Central Controller and Presentation Processor 1000 FIG. 2a. During the setup of the Media Configuration Program 6717, the Communication and Transport Program 6760 is initialized and tested with the Modem 6330 and/or Network Interface 6340. The functions of the Communication and Transport Program 6760 are largely transparent to the Media. It should be noted, however, that in this embodiment of the present invention, the Media Interface 6000 should be left on, with the Communication and Transport Program 6760 running, 24 hours a day, 7 days a week. This is necessary so that the Transaction Processing Program 6720 can receive and process any transaction messages from the Central Controller and Presentation Processor 1000 FIG. 2a regardless of the hour of the day.

Buyer's Use of Present Invention Demonstrating Transaction Processing and Access Delivery Substitution The preferred embodiment of the present invention allows for "open access" to all electronic presentations by assembling the presentations in an accessible format that can be searched and read by independent, public, electronic search engines as well as by individual private search programs. We are referring to Internet Search Engines such as Yahoo, Lycos, Web Crawler, Excite, Hotbot, Altavista, and other referral and/or robotic, publicly accessible "Search Engines." The block diagram of FIGS. 3a through 3k is an example of the preferred embodiment of the present invention that, for this example, has been configured for presenting lodging and event service-type sellers.

With this open-access design or architecture, the Buyer may choose any of the available access methods to find or search for the goods, products, events, or services represented. If the Buyer is aware of how to access the directory, index, or presentation site that may contain the subject presentations that the Buyer is interested in, he can go directly to the site or direct his personal search program to search the site. This searching of the site may be done either on a single search basis or as part of a group or list of sites that the Buyer wants to search. As an example, if the Buyer is looking for lodging in a given city, the Buyer might give instructions and search parameters to the Buyer's private search program. Those instructions and search parameters would include a list of sites that the Buyer wants to search. That list of sites could contain a wide range of sites that have been created under various methods including the present invention. The private search program can perform the searches while the Buyer is waiting for the results or can be scheduled to search during off-peak hours, then present the search results to the Buyer at his convenience. The search results delivered to the Buyer are a listing of those pages or presentations that meet the search instructions and parameters that were entered by the Buyer (blocks 10100, 10110–10118.

If the Buyer has the access location knowledge, he also has the option to access the presentations directly using Internet access and any Internet Browser such as Netscape 4.0 or any other browser software. Once the Buyer has accessed the site directly, he has the choice to either conduct a search for the desired products, goods, or services using the on-site search capabilities or browse the presentations much the same way one would browse the aisles of books at a library. Search methods of the present invention can vary from instance to instance, but the preferred embodiment would always give the option of a full text-based search of all presentations or a database search of the information contained within the Final Presentation Database 2645 FIG. 2b. The search function is easily accessed by the Buyer entering key words or phrases that will most likely result in finding the information that he wants (blocks 10120–10126). The search results obtained from the on-site search function will direct the Buyer to those presentations contained within that Central Presentation and Selection Server 2000, but not to other sites or sources. For the Buyer who wishes to browse the structure of the presentations contained on the Central Presentation and Selection Server 2000, the design and architecture of the presentation structure will direct him to the information he seeks by means of subject indexes and directories.

Buyers who are not aware of how to access the directory, index, or presentation site can access the presentations by using the public search engines such as Yahoo, Lycos, Web Crawler, Excite, Hotbot, Altavista, and other referral and/or robotic publicly accessible "Search Engines". With the open-access format and structure, the present invention allows the search engines to have full access to the presentations to review and index the subject matter of each presentation. Every search engine uses different algorithms to conduct the search and to establish the priorities in presenting the results of the requested searches. The result of these searches is presented to the Buyer in the form of direct references to the presentations which the search algorithms have determined contain the requested information (blocks 10102, 10104).

Once the Buyer has narrowed his information search to a manageable amount by either automated search systems or by browsing, the Buyer would then review the presentations available (blocks 10140, 10150). If, for example, the Buyer is searching for lodging, he would, after deciding on a specific lodging facility and room type, request a reservation for a given set of dates (blocks 10660, 10162). This request is made interactively while he views the presentations on the Central Presentation and Selection Server 2000. The Transaction Negotiation Program 2725 processes that request, using the information contained within the Inventory Database 2660 and the Referral Database 2670 if necessary. Continuing the lodging example, the program checks if the requested room is available for the dates requested and, if not, enters a negotiation mode. The program will suggest alternative accommodations (different rooms or even a different lodging facility and rooms), using logic to suggest the best alternative. As an example of this logic, the algorithms would not suggest a bridal suite when the Buyer has requested a single economy room, or it may offer a discount for an upgraded room (block 10170–10198). If the suggested alternatives do not meet the needs of the Buyer, then the buyer is referred back to the indexes to review the lodging possibilities again and start over (block 10140). Once the Buyer has chosen a facility, room, and dates (in the lodging example) which the Transaction Negotiation Program 2725 accepts, that program puts that particular inventory on a hold status to allow the Buyer time to respond with the additional information necessary to make the purchase or reservation (block 10200, 10202). It is important that the Buyer is not burdened with inputting the required information until the items (in the lodging example, room and dates) that he wants are confirmed to be available. If a Buyer is forced to input the additional information and then find that the inventory is not available, he will feel that the system has wasted his time and will probably not use the service in the future. Only when the program first confirms the availability of the inventory and then asks for the additional information will the Buyer view the process as appropriate and necessary. The type and amount of additional information that is required largely depends on the type of products, goods, or services that are represented. In the preferred embodiment of the present invention, the Buyer would be prompted to apply for a Delivery or Network ID. Once the Buyer has this ID number and the associated password, then he would only have to enter that ID number for future use instead of entering all required information. The Delivery or Network ID is also used as a substitute for the more traditional methods of proof-of-access such as tickets, passes, admission documents, reservations, reservation confirmations, and other physical proof of purchase. In this embodiment of the present invention, the Delivery or Network ID could also be used to give discounts for use, promotional offers, upgrades, or other marketing incentives. The information required in the application for the Delivery or Network ID would be owner names; contact names, numbers, and address; payment and credit information or payment method information; and any other information necessary to support the Delivery or Network ID. The Buyer would also be required to identify which physical card or ID that he currently holds, he intends to use as the Delivery or Network ID. (blocks 10220–10232). An example of the appropriate use for the Delivery or Network ID would be in conjunction with an instance of the present invention that is configured to represent professional sporting events. The Buyer in our example could purchase access to a given represented sporting event through the Central Presentation and Selection Server 2000, and the only requirement of the Buyer when arriving at the facility to attend the event would be to present his Delivery or Network ID for processing. If the Buyer has a Delivery or Network ID, he is prompted for the Delivery or Network ID and its password. If the Buyer does not want a Delivery or Network ID, he is prompted for the necessary information in lieu of the Delivery or Network ID. Depending on the information required and the responses from the Buyer, the Transaction Negotiation Program continues to prompt the Buyer until all information requirements have been met (blocks 10220–10262).

Having received and reviewed all the required information requested from the Buyer, the Transaction Negotiation Program 2725 then requests a transaction approval code from a credit card processing company. If the credit card is not approved, the program then requests an alternative payment method from the Buyer (blocks 10270–10282).

A Transaction ID is assigned after the Transaction Approval Code has been received (block 10290). With the assignment of the Transaction ID, the Transaction Negotiation Program 2725 creates a confirmation proof of purchase or order (Confirmation of Booking in the lodging example).

This confirmation is presented to the Buyer with prompts for choosing any additional information that may be available to add to this document prior to the Buyer printing it. With the lodging example, the additional information might include directions to the facility, description and photos of the facility and or room, list of amenities of the facility such as pool and gym, list of activities in the area, or any other information of interest or concern to the Buyer (blocks (10300–10308). If, in the preferred embodiment of the present invention, the Buyer later wishes to cancel or modify his purchase, reservation, or request, he would return to the Seller's presentation and access and modify his purchase or reservation by using his Delivery or Network ID, Transaction ID, confirmation number, credit card number, some combination of these, or some other identification method (blocks 10312–10316).

After the Transaction ID has been assigned and the Buyer has been presented with the purchase response, the Transaction Negotiation Program 2725 determines if the inventory sold or reserved was controlled by the Resource Saver Protocol. If the inventory is controlled by the Resource Saver Protocol, the program determines if the Inventory Notification Level has been reached and if so, what the remaining inventory count currently is after subtracting the transactions currently on hold (blocks 10320–10324). Regardless of whether the Resource Saver Protocol applies to a particular instance of this invention, the program must calculate the Inventory Confirmation Number (block 10330). This Inventory Confirmation Number, which varies from seller type to seller type, is used as a "check number" to confirm that all components, the Central Presentation and Selection Server 2000, the Central Controller and Presentation Processor 1000, and the Seller Interface 4000 have their associated inventory databases in synchronization.

The Transaction Negotiation Program 2725 also assigns a sequential transaction message number associated with this transaction. It is through the tracking of this number that the Central Controller and Presentation Processor 1000 and Seller Interface 4000 can determine if a gap exists and a missing transaction message needs to be requested from the component that sent the missed message.

The Transaction Negotiation Program 2725 updates Buyer Database 2610, Transaction Database 2620, Inventory Database 2660, and any other databases necessary. It uses all the aforementioned data to create the Transaction Message that is sent from the Central Presentation and Selection Server 2000 to the Central Controller and Presentation Processor 1000 (blocks 10340, 10342).

Upon receipt of the Transaction Message, the Transaction Processing Program 1720 on the Central Controller and Presentation Processor 1000 confirms the transaction logic and then updates the Buyer Database 1610, Transaction Database 1620, inventory Database 1660, and any other database affected. By confirming the transaction logic, we mean that the Transaction Processing Program 1720 recalculates all of the calculations done by the Transaction Negotiation Program 2725 on the Central Presentation and Selection Server 2000. This is done for quality control and security reasons (blocks 10360–10364).

The Transaction Processing Program 1720 then creates the Transaction Messages to send to the Seller Interface 4000 and updates any other Central Presentation and Selection Servers 2000 that may be affected by any change in inventory as a result of this transaction. It should be noted that this is an example of the savings presented by the Resource Saver Protocol. For those items of inventory that are controlled by the Resource Saver Protocol, Transaction Messages need not be sent to the related or sibling Central Presentation and Selection Servers 2000 unless the Notification Level has been reached or breached for that group of inventory. For those items of inventory that are not controlled by the Resource Saver Protocol, the Central Controller and Presentation Processor 1000 sends Transaction Messages to the Seller Interface 4000 and to all affected Central Presentation and Selection Servers 2000. In this embodiment of the present invention, the Central Controller and Presentation Processor 1000 and any Central Presentation and Selection Servers 2000 are linked via a full-time network connection, which would allow the update or Transaction Message to be sent via the network. The Sellers could be on the same network, but more likely would be communicating with the use of modem on demand, meaning that a communications link would only be established when there were Transaction Messages, Updates, or other data or information to exchange or deliver. The communications between the Central Presentation and Selection Server 2000, the Central Controller and Presentation Processor 1000 and the Seller Interface 4000 is either protected by encryption or only takes place on a private network or secure line modem (blocks 10370–10400).

Upon receiving a Transaction Message, either the Transaction Processing Program 4720 or the Seller Accounting or Management Program 4000B of the Seller Interface 4000 confirms that the purchased inventory or reservation is available and recalculates and confirms all needed data contained within the Transaction Message. If the Transaction Message is found to contain erroneous or missing data, then error messages are sent to the Central Controller and Presentation Processor 1000, the management or administrator, and to the Buyer (blocks 10410–10432). It should be noted that in this embodiment of the present invention, the Transaction Processing Program 4720 is present but disabled whenever a compatible Seller Accounting or Management Program 400013 is in use and capable of performing the functions of the Transaction Processing Program 4720.

In this embodiment of the present invention, the Transaction Processing Program 4720 or the Seller Accounting or Management Program 4000B of the Seller Interface 4000, whichever is enabled, will have the option to be set to automatically accept or reject the purchase or reservation without any further operator interaction. If the automatic option is not invoked by the management of the Seller Interface 4000, then the processing of the Transaction Message would require the human operator to review the transaction and either accept or reject the transaction and provide the appropriate responses (blocks 10440–10456).

All appropriate databases are updated, and then, if the Transaction Processing Program 4720 has been used instead of the Seller Accounting or Management Program 4000B, a Transaction Message may be sent to a second-level or non-compatible accounting or management software. An embodiment of the present invention distinguishes between a fully compatible Seller Accounting or Management Program 4000B that performs all the necessary functions and a second-level or non-compatible accounting or management software that the seller may be using that does not meet the standards of the present invention (blocks 10460–10472).

If the inventory or reservations purchased are controlled by the Resource Saver Protocol, then the Transaction Processing Program 4720 or the Seller Accounting or Management Program 4000B performs the appropriate inventory calculations. If the inventory level has reached or breached the notification level, then the Transaction Processing Program 4720 or the Seller Accounting or Management Program 4000B must send a transaction message to the Central Controller and Presentation Processor 1000, which in turn sends it to the Central Presentation and Selection Servers 2000. The transaction message prompts the Central controller and Presentation Processor 1000 and the Central Presentation and Selection Servers 2000 to update their respective databases. Regardless of whether or not the Resource Saver Protocol has been activated, the Transaction Processing Program or Seller Accounting or Management Program 4000B sends an Acknowledgment Message to the Central Controller and Presentation Processor 1000 to confirm that it has received and processed the Transaction Message (blocks 10480–10490).

Depending on the Seller type, the Transaction Message may contain a request from the Buyer for a confirmation of the purchase or reservation. This request will be delivered to the Seller and, by necessity, would primarily be handled or satisfied outside the realm of the present invention (blocks 10500–10512).

Figure 3B:
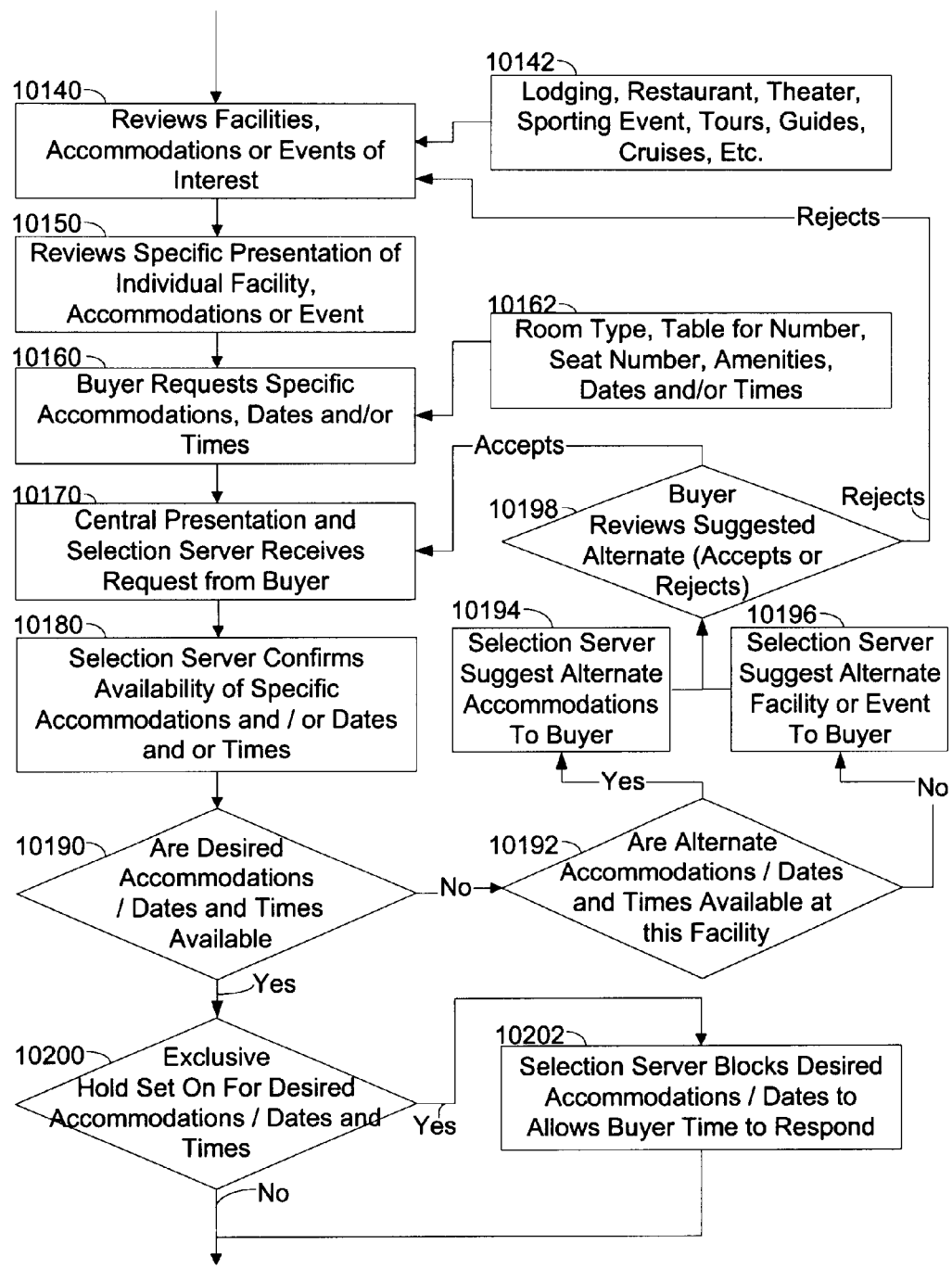
Figure 3C:
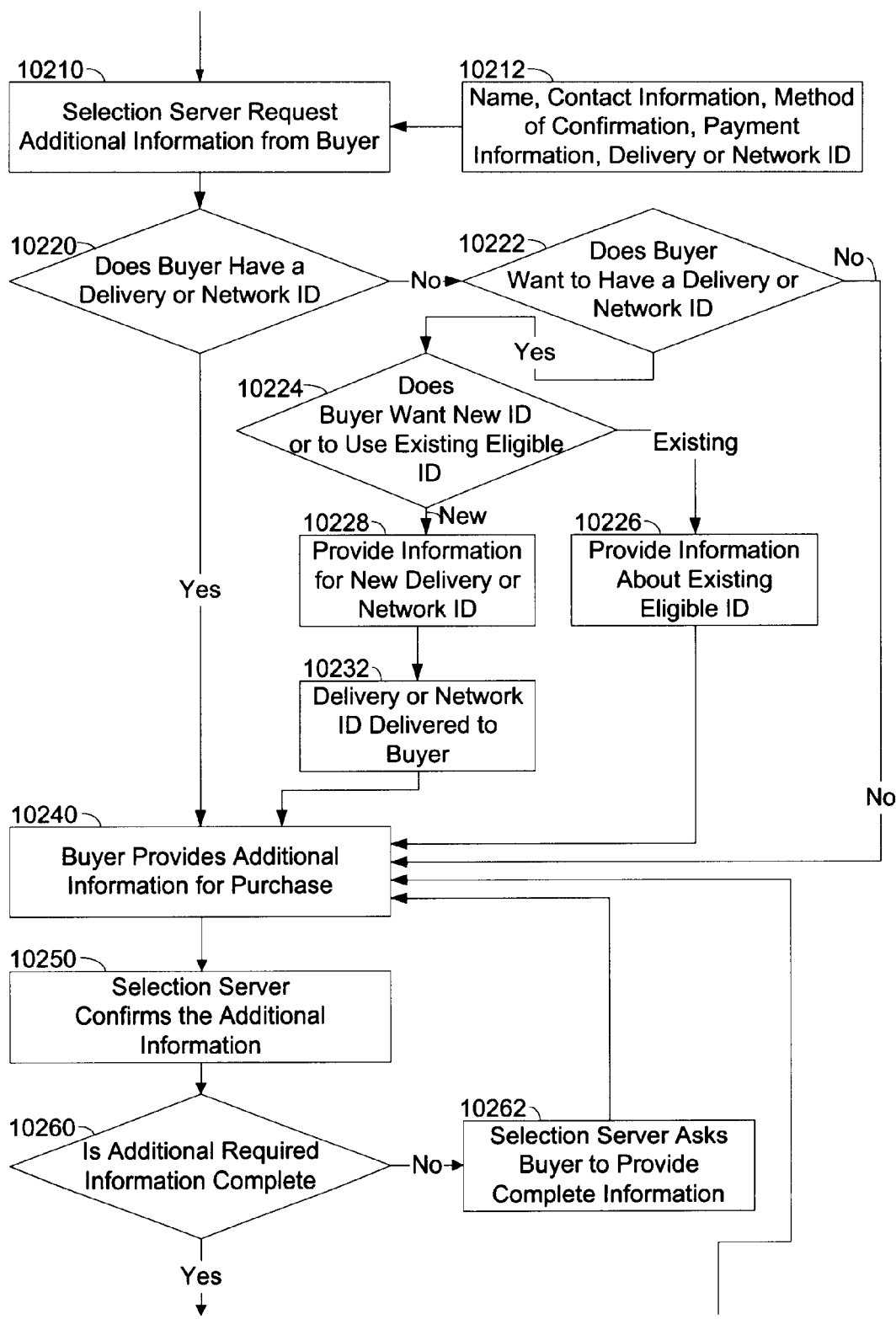
Figure 3D:
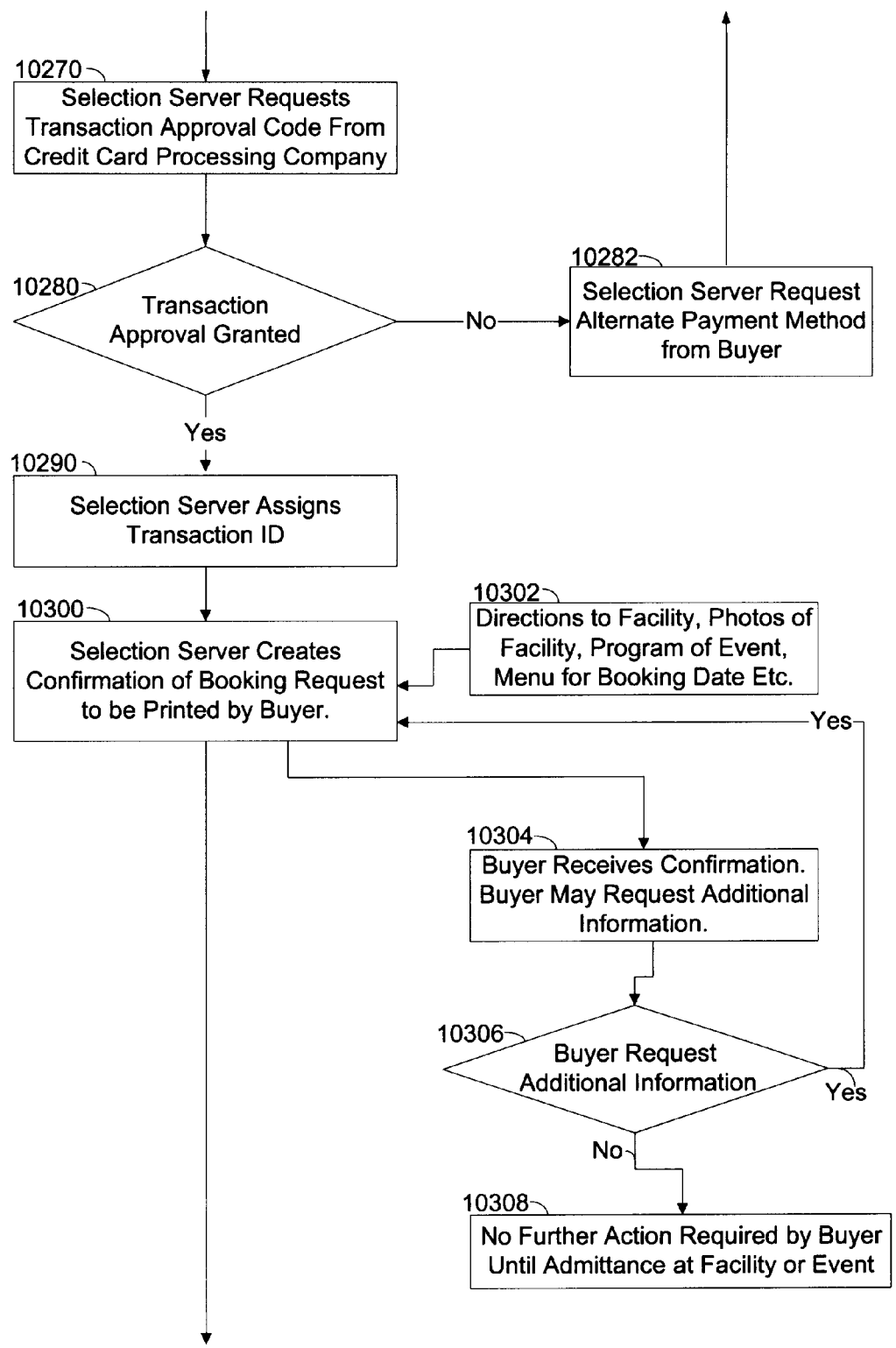
Figure 3F:
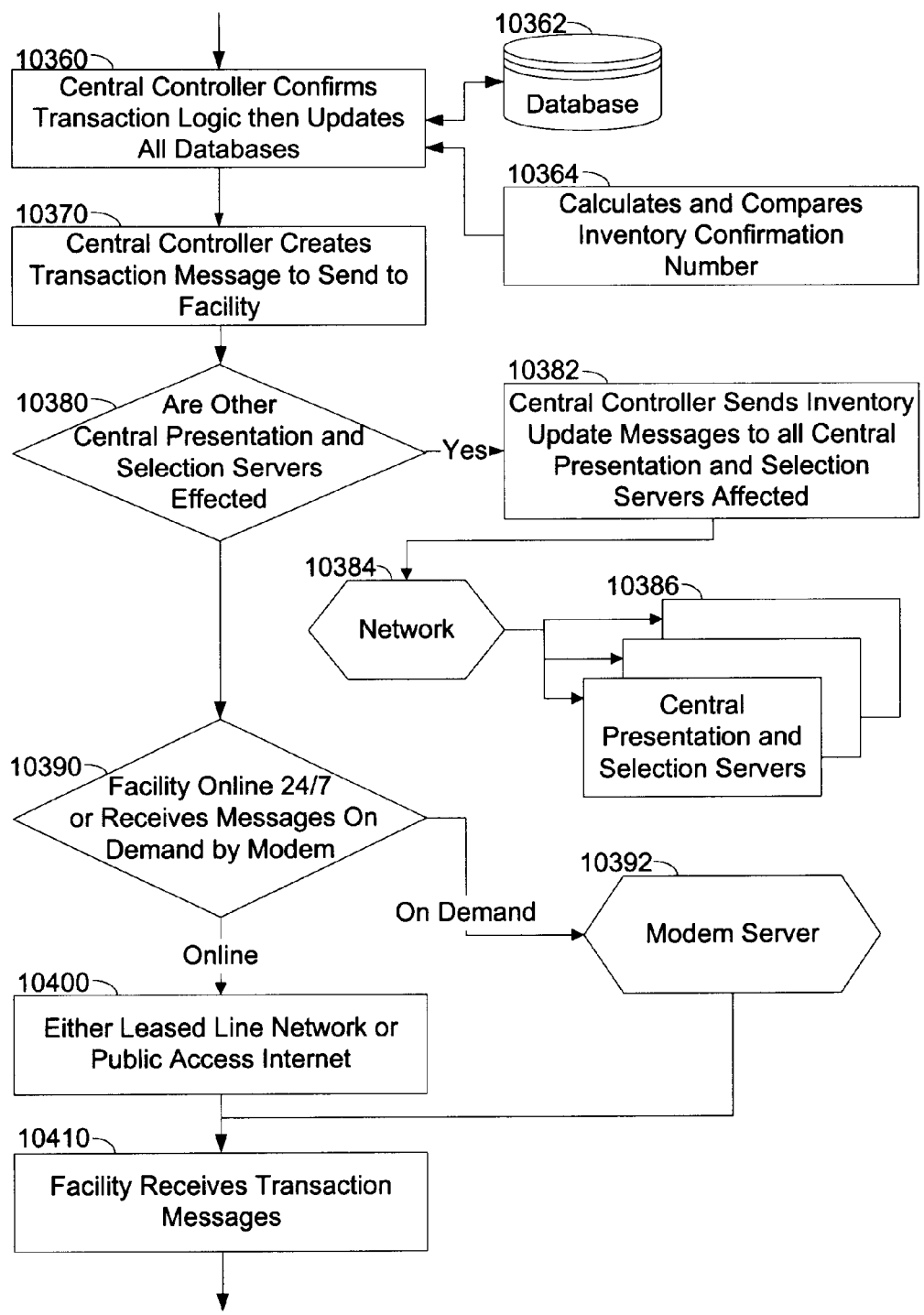
Figure 3G:
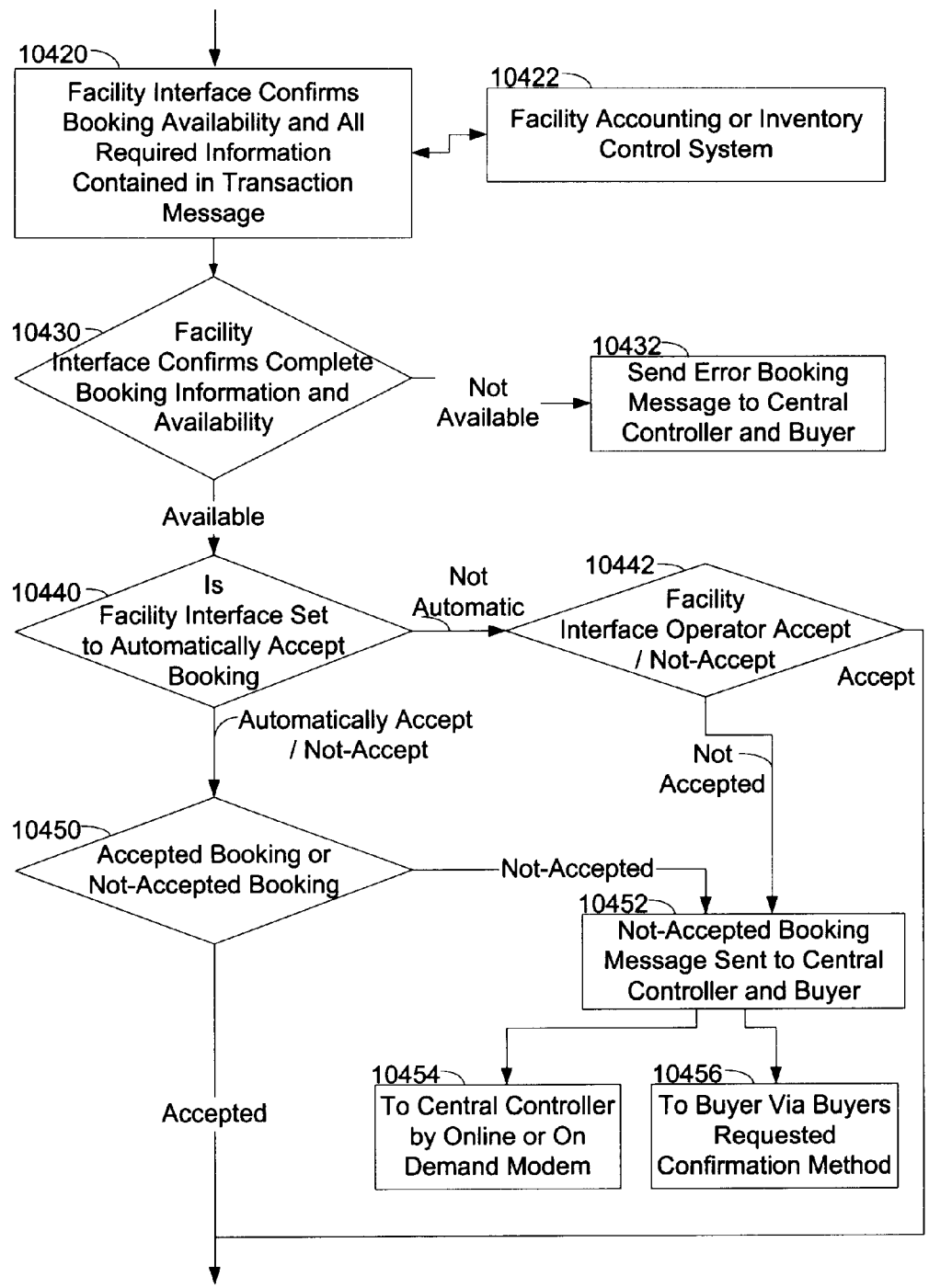
Figure 3H:
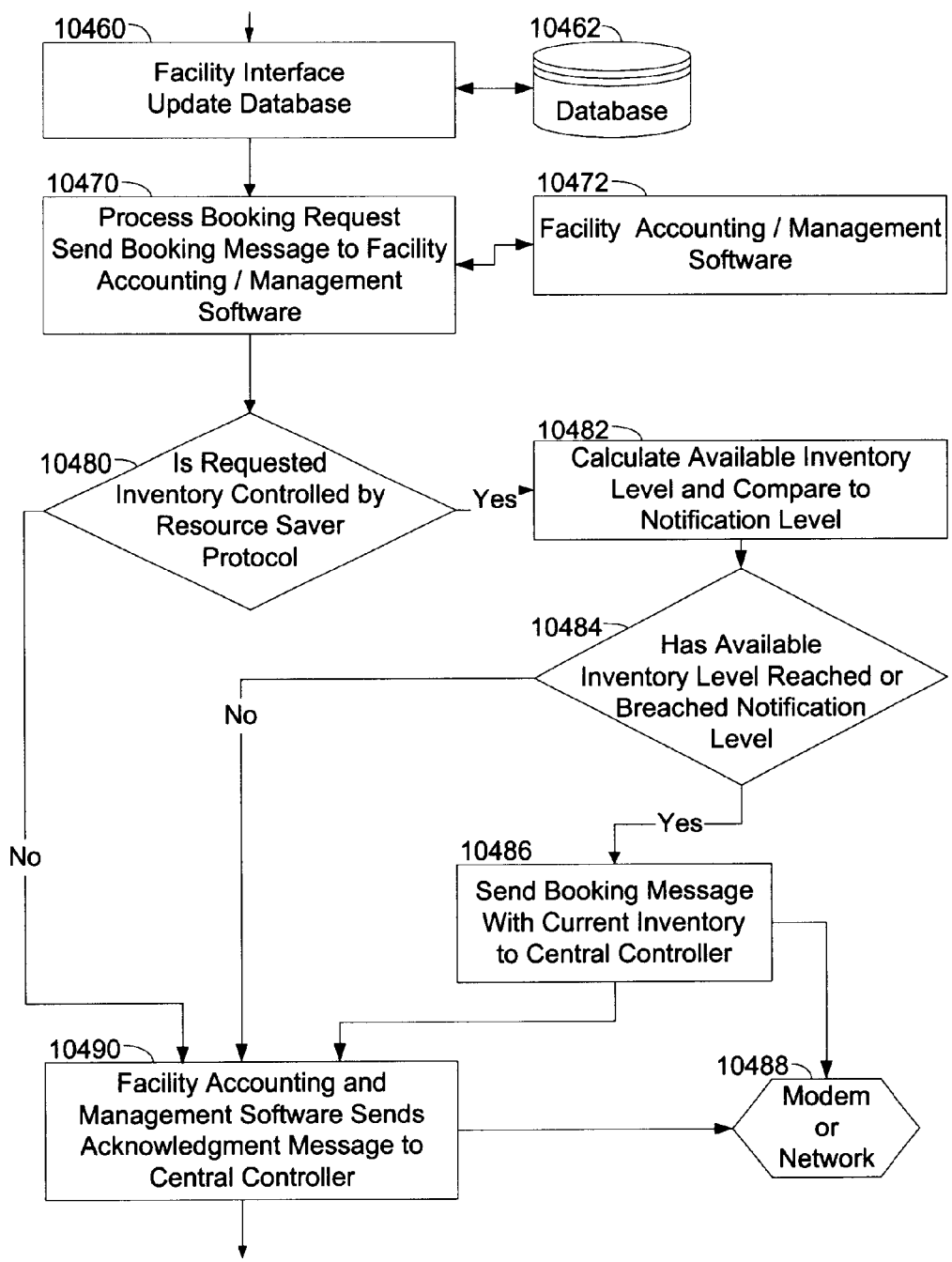
Figure 3I:
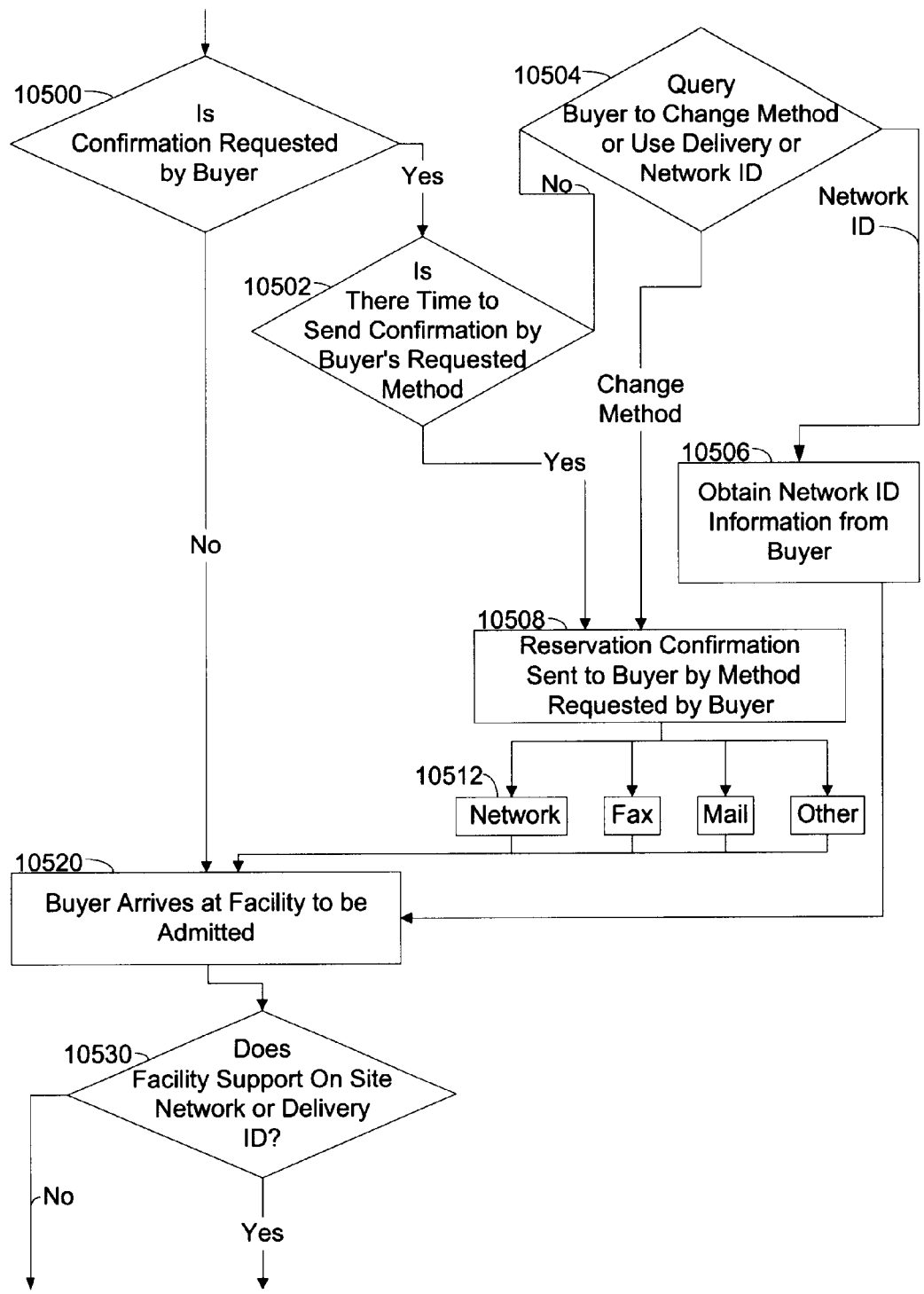
Figure 3J:
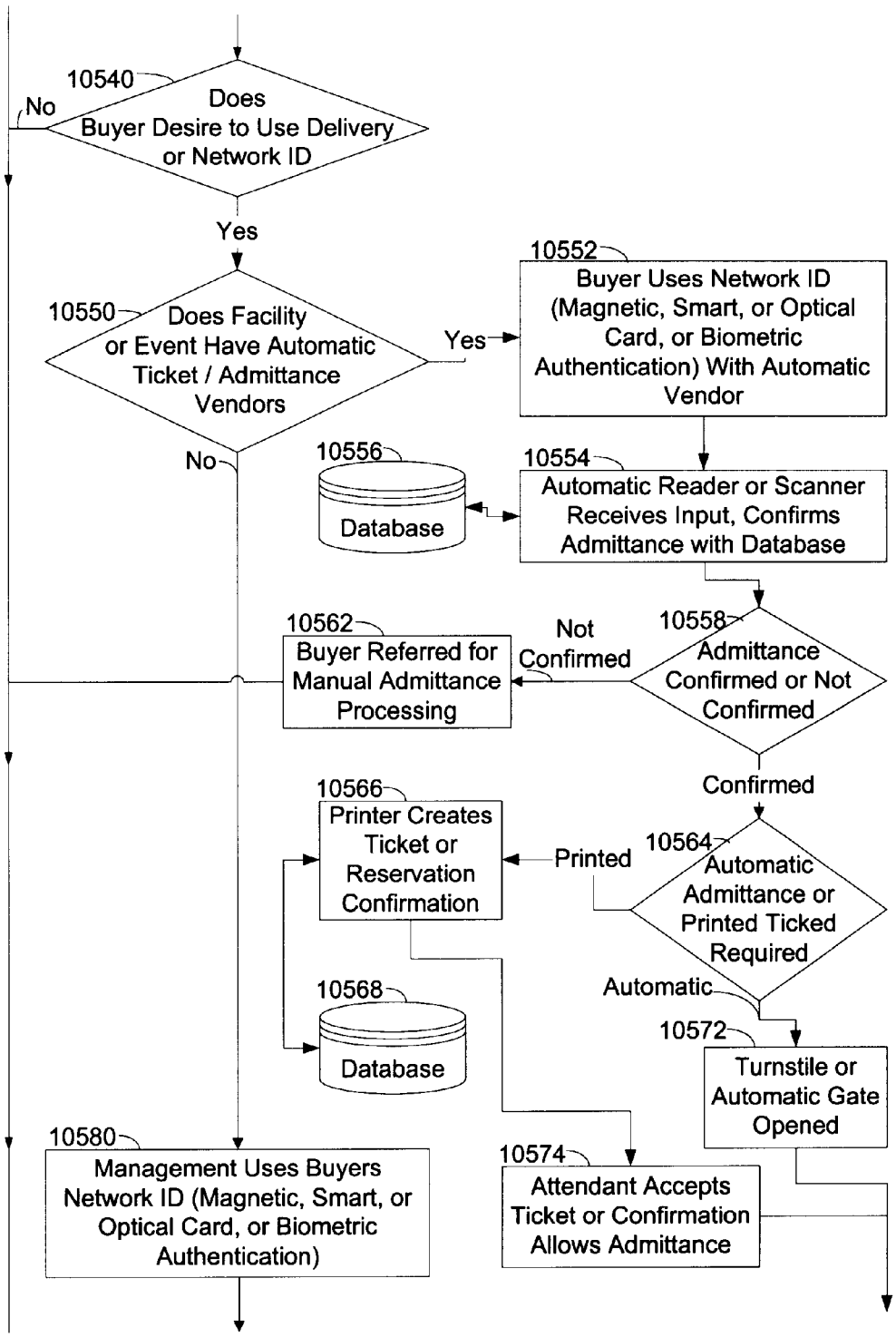
Figure 3K:
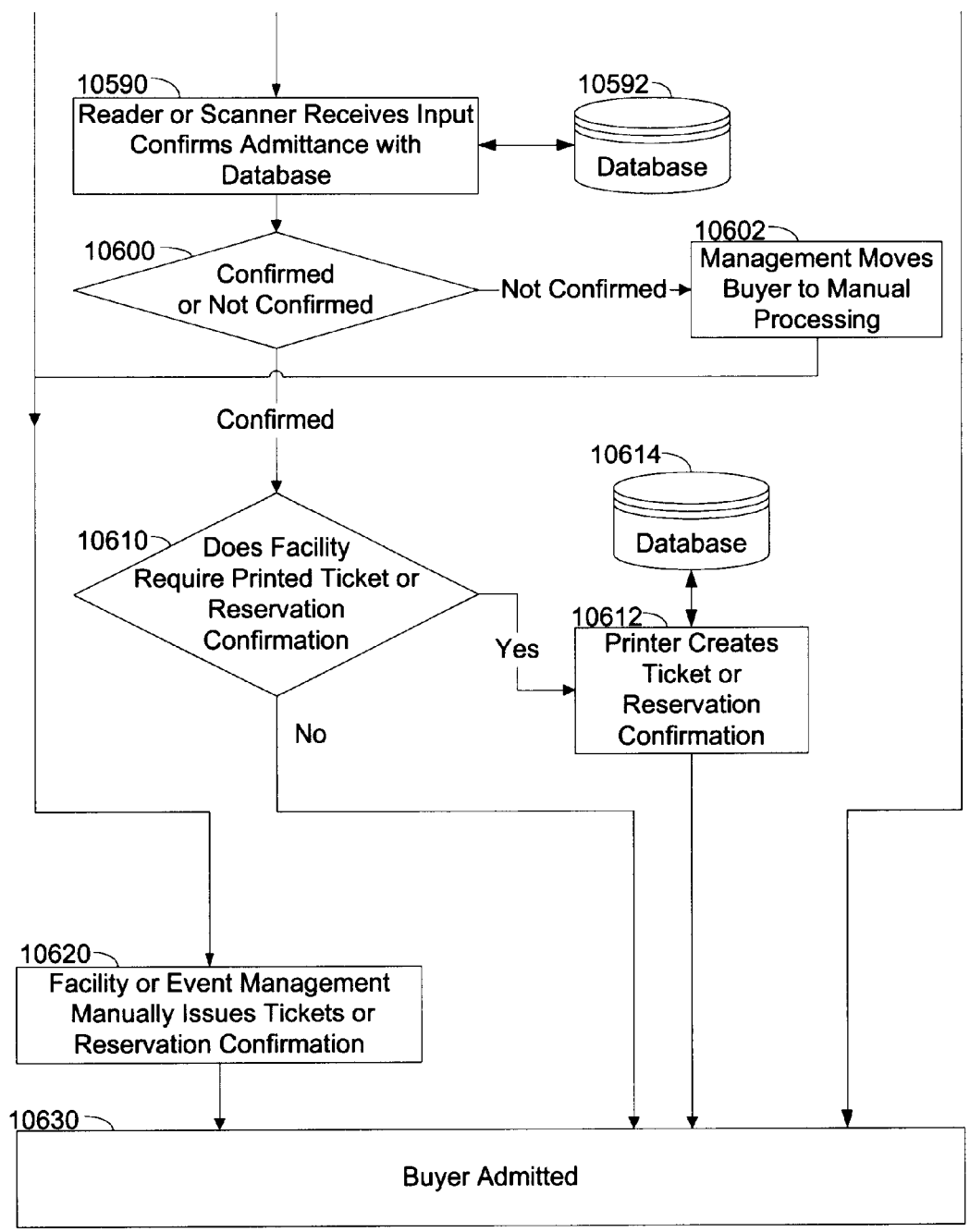

If the purchased item is to be delivered to the buyer, then the alternative block diagram FIGS. 3*i*–*a* shows the possible configuration of that transaction flow. This configuration would be for goods or products that might require physical delivery of the good or product to the Buyer. The Central Presentation and Selection Server 2000 formats and sends a Transaction Message, which contains any shipping request or special instructions to the Seller. The Central Controller and Presentation Processor 1000 processes the Transaction Message and then sends it to the Seller Interface 4000. The Seller will respond to those shipping and special requests outside the realm of the present invention. (FIG. 3*i*–*a*, blocks 10500a–10510a).

In keeping with the configuration of the block diagram that is intended for the delivery of tickets, passes, admission documents, reservations, or reservation confirmations, all processing is completed at block 10512 until the Buyer arrives at the facility, site, business, or venue to be admitted. For events that might traditionally require a ticket, pass, admission document, or reservation confirmation as proof of admittance, an instance of the present invention has several options for the confirmation and delivery of said documents. It should be noted that even though the Central Presentation and Selection Server 2000 supports the use of the Network or Delivery ID, which makes repeated use of the Central Presentation and Selection Server 2000 easier for the Buyer to utilize. The physical use of the Network or Delivery ID is optional at the level of the facility, site, business, or venue. The preferred embodiment of the present invention, when fully configured for the acceptance of the Delivery or Network ID, allows the Buyer several options. If the Buyer arriving at the facility, site, business, or venue chooses to use the Delivery or Network ID, he would simply have his ID Card read by an unattended automatic reader that would either print the necessary ticket, pass, admission document, or reservation confirmation or immediately allow admittance through a gate or turnstile (blocks 10550–10574). The savings to the Seller, in the form of time and labor for processing admittance, is obvious. The real advantage, however, comes in the form of Buyer goodwill resulting from the convenience of reducing the time it takes to be admitted or to obtain the physical tickets, passes, admission documents, reservations, or reservation confirmations. The use of the Delivery or Network ID within an embodiment of the present invention is accomplished by either the Buyer Admission Control Program 4770, which is a component of the present invention, or by compatible third-party programs such as the Seller Admission Control Program 4000C or the Seller Accounting or Management Program 4000B with an integrated admission control program to either print tickets or passes or open physical barriers.

If the Seller's facility, site, business, or venue does not support the automatic processing of the Buyer's admittance, then the Seller may use the Delivery or Network ID, with an attendant visually examining the ID or operating the scanner or reader and responding to the results with either admittance or the printing of the tickets, passes, admission documents, reservations, or reservation confirmations. This would not be as efficient as the automatic process, but may present a transition method to the full implementation of the preferred embodiment of the present invention (blocks 10580–10612). In each of these methods, there is a small risk of the physical failure of the Delivery or Network ID or of the reader to accurately identify the Buyer. In all cases of failure, the management would manually confirm the identification and process the admittance of the Buyer (block 10620). In this embodiment of the present invention, the Delivery or Network ID is a Magnetic, Smart, or Optical Card similar to a standard Credit Card. The present invention allows for the use of any unique identification method either presently in use or to be developed in the future. The use of biometric scanners for voice, full face, finger print, iris, or other identification methods are just becoming commercially economical for this type of use and will require the secure and verified obtaining of the original scan or sample.

Buyer is admitted to facility or event (block 10630).

Seller's Use of Present Invention

Figure 4A:
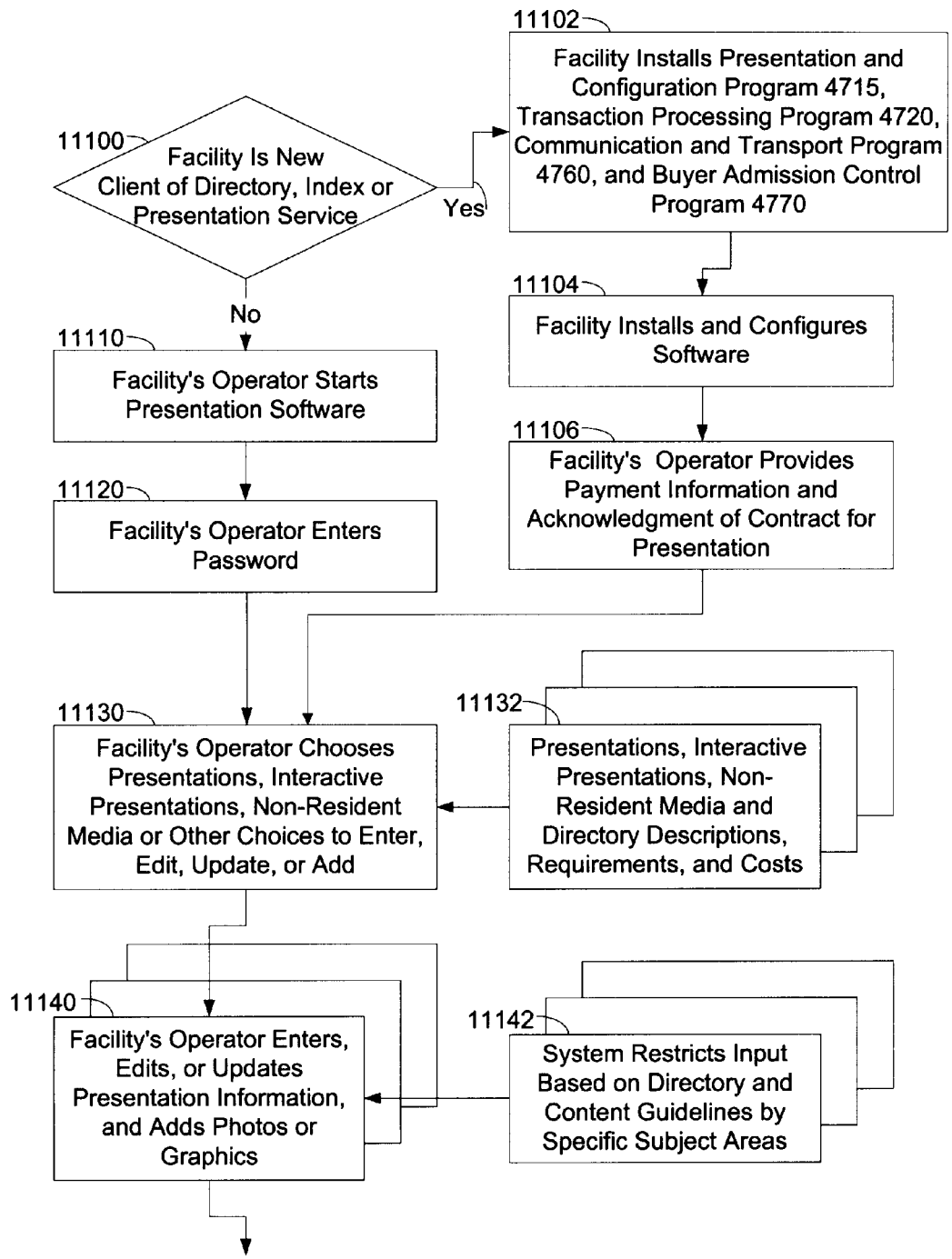
FIGS. 4a through 4h is a block diagram showing the Seller's use of the invention. This Example Embodiment is configured for delivery of tickets or reservation confirmation.
Figure 4B:
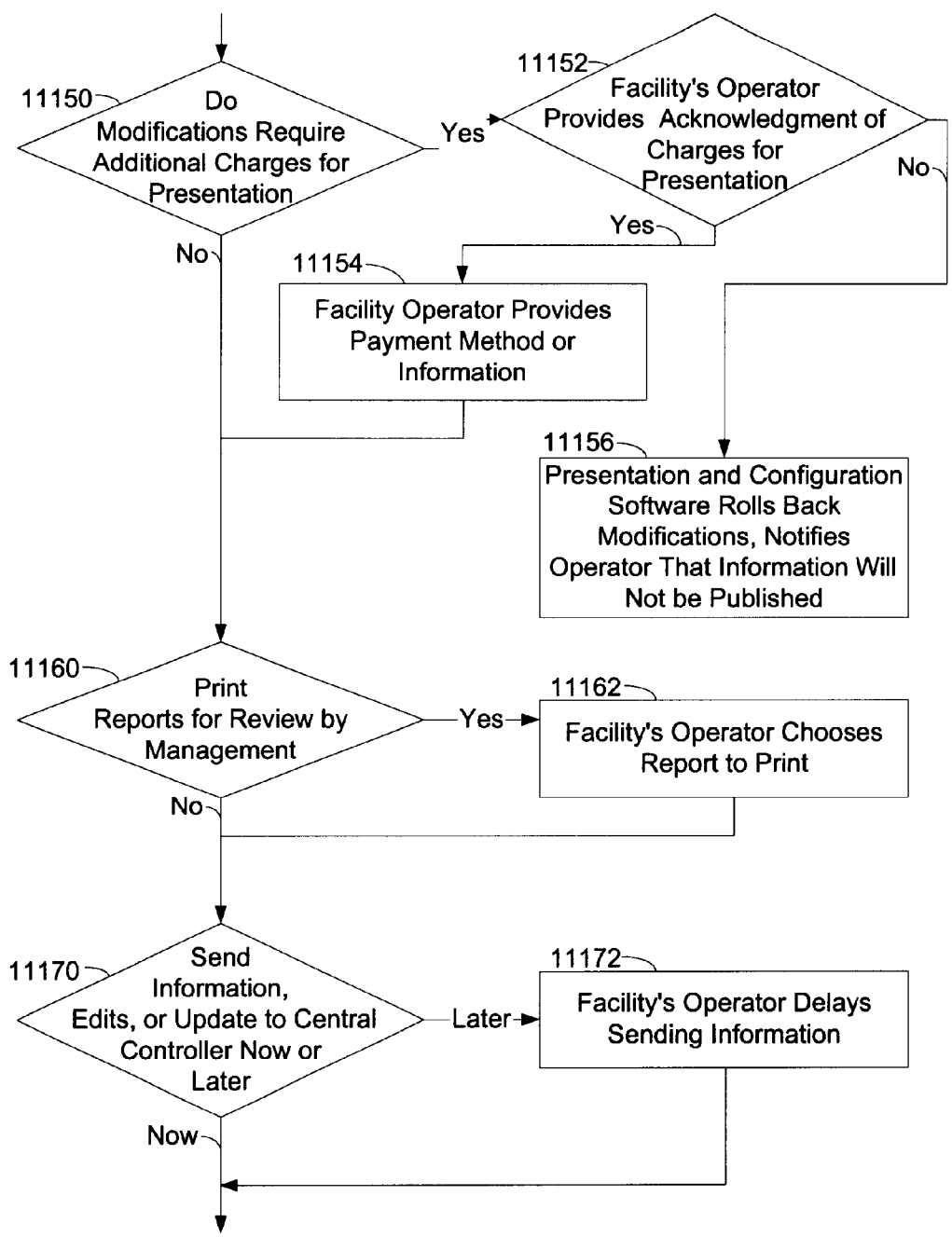
Figure 4C:
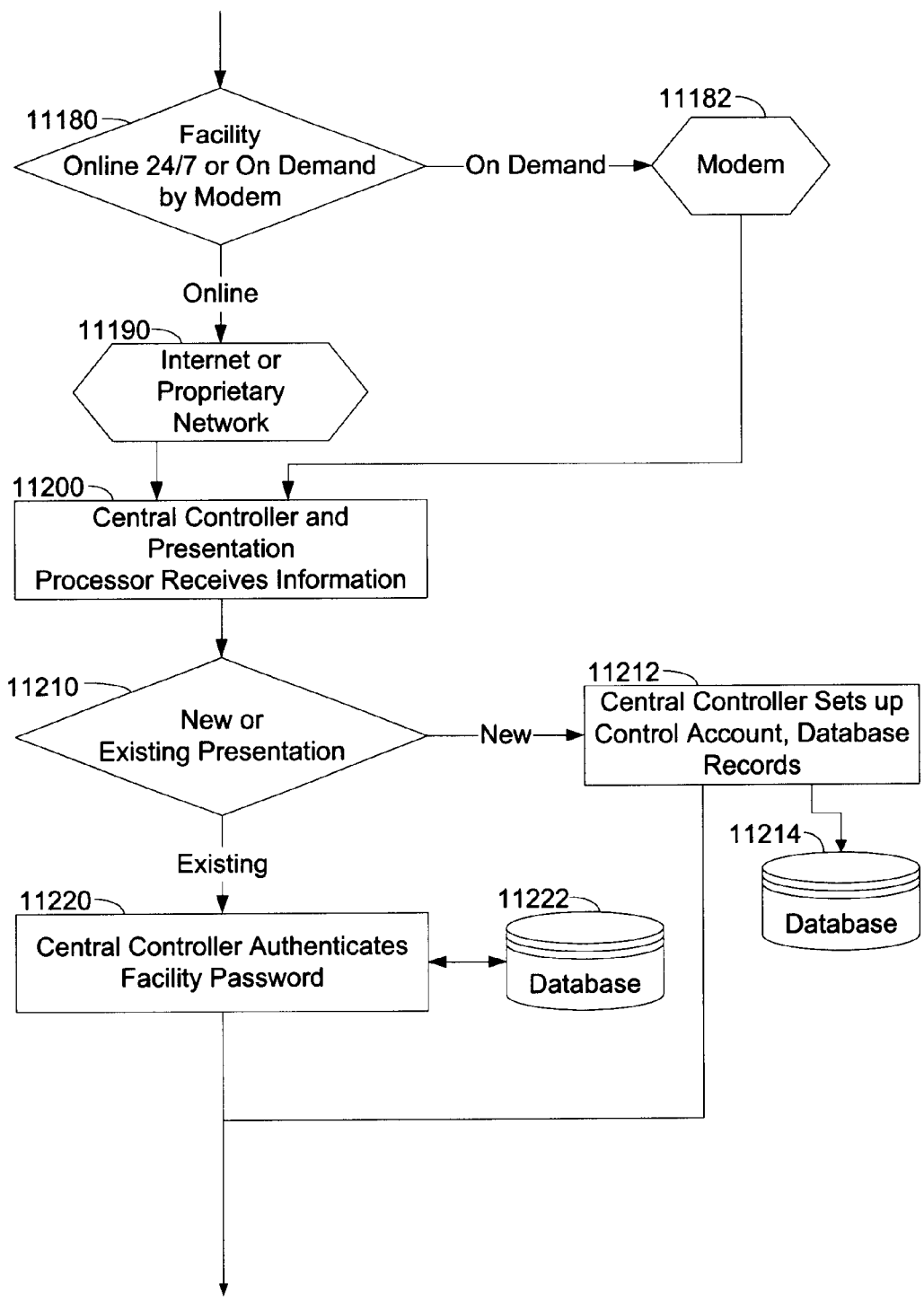
Figure 4D:
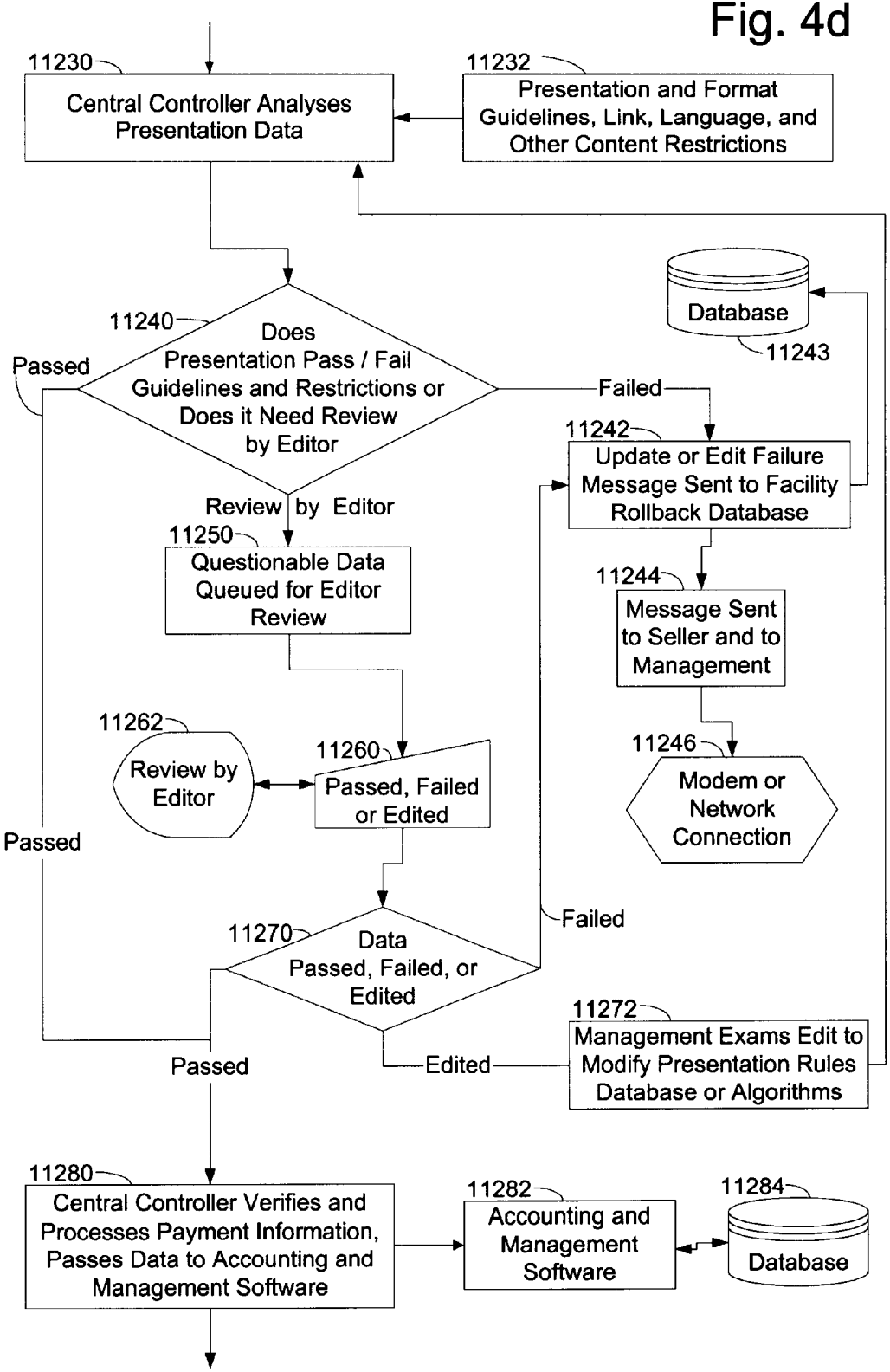
Figure 4E:
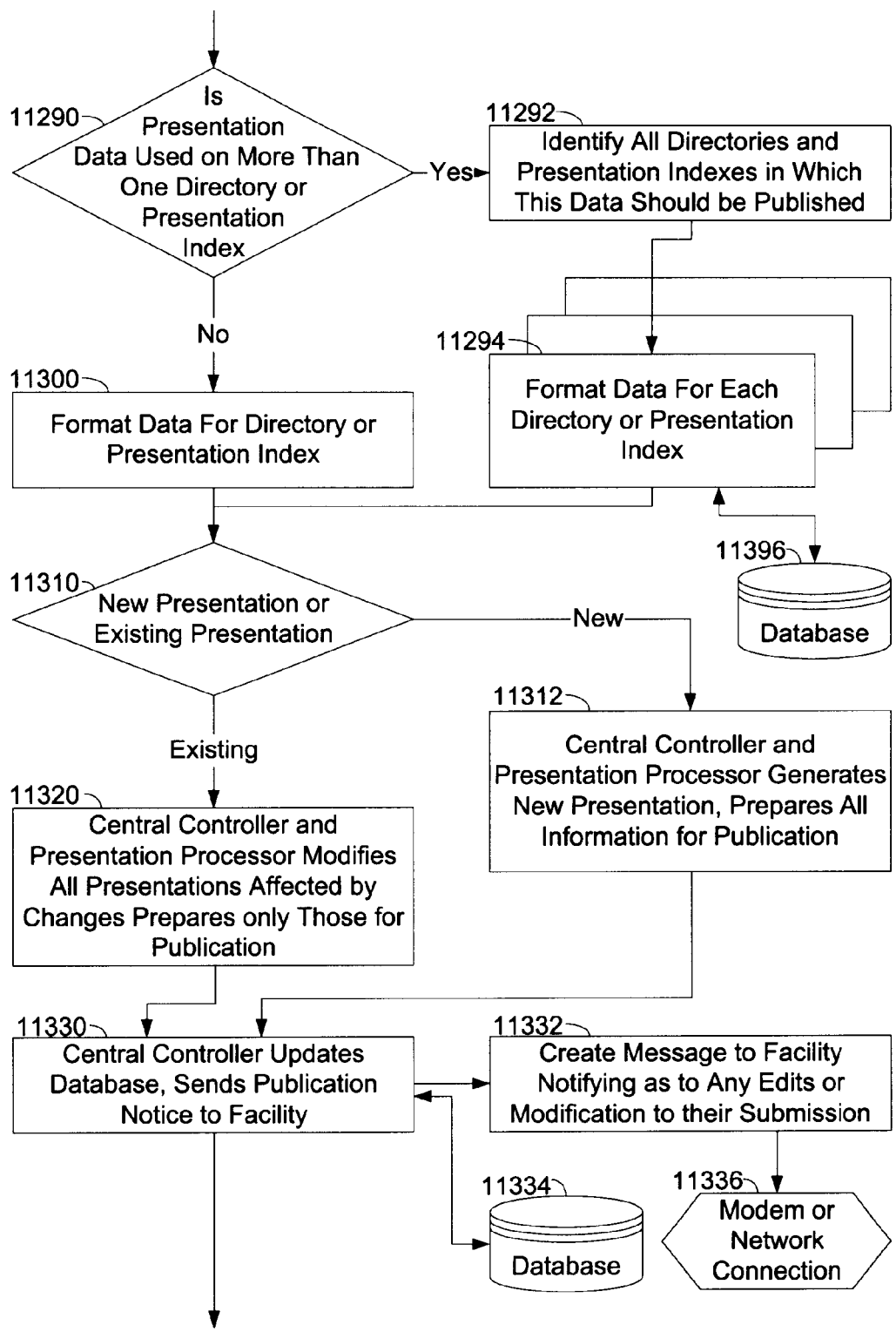
Figure 4F:
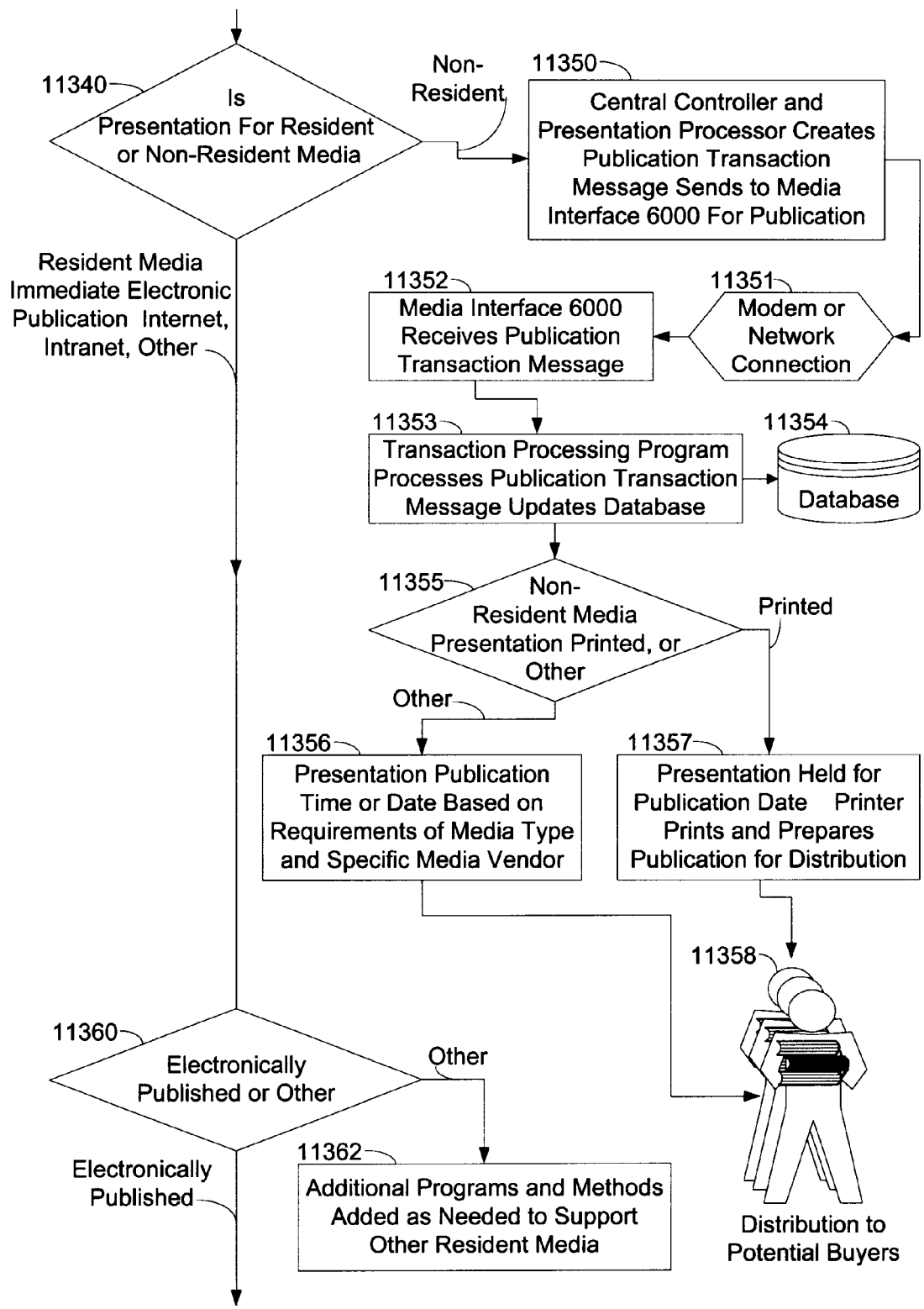
Figure 4G:
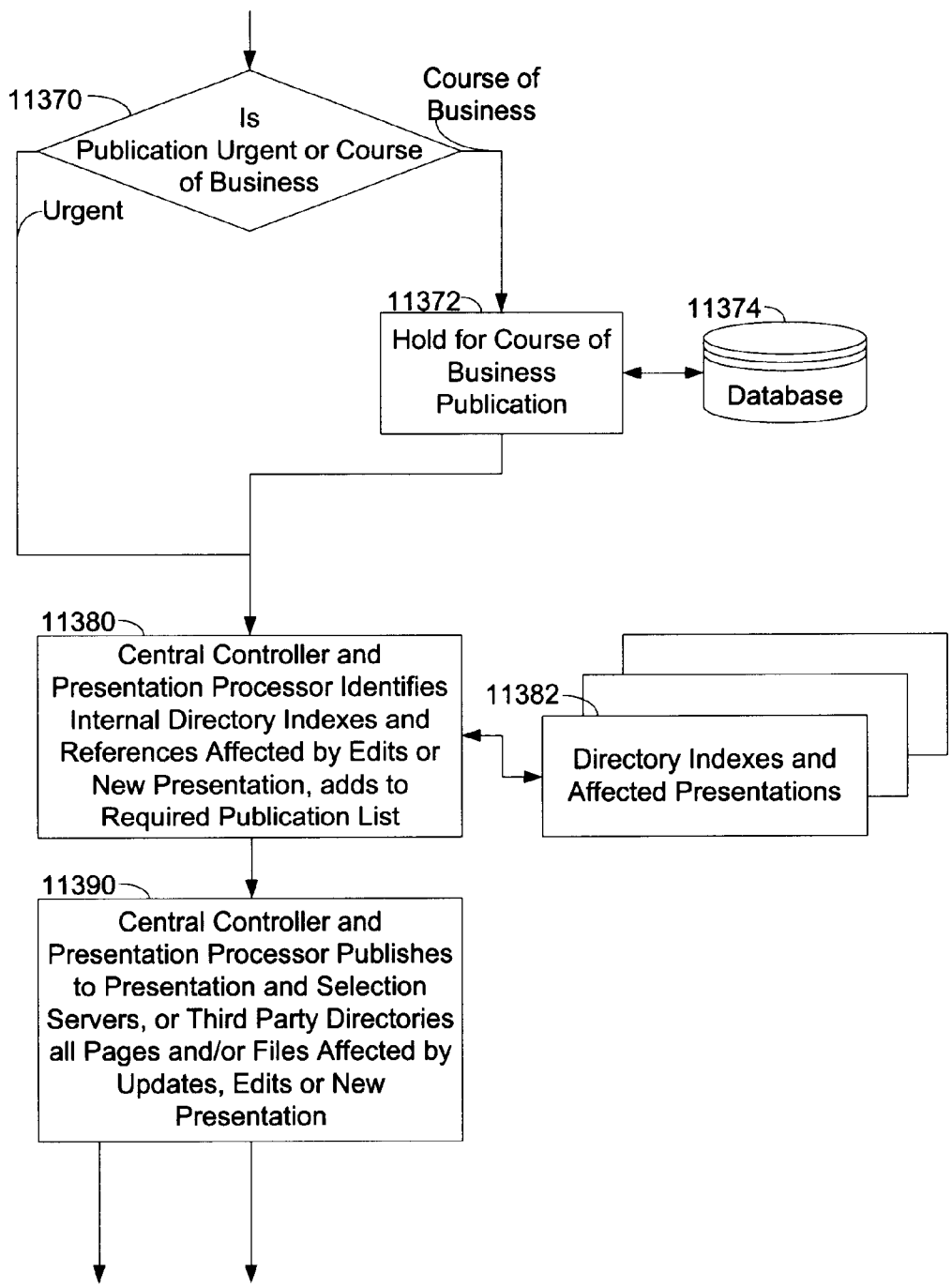
Figure 4H:
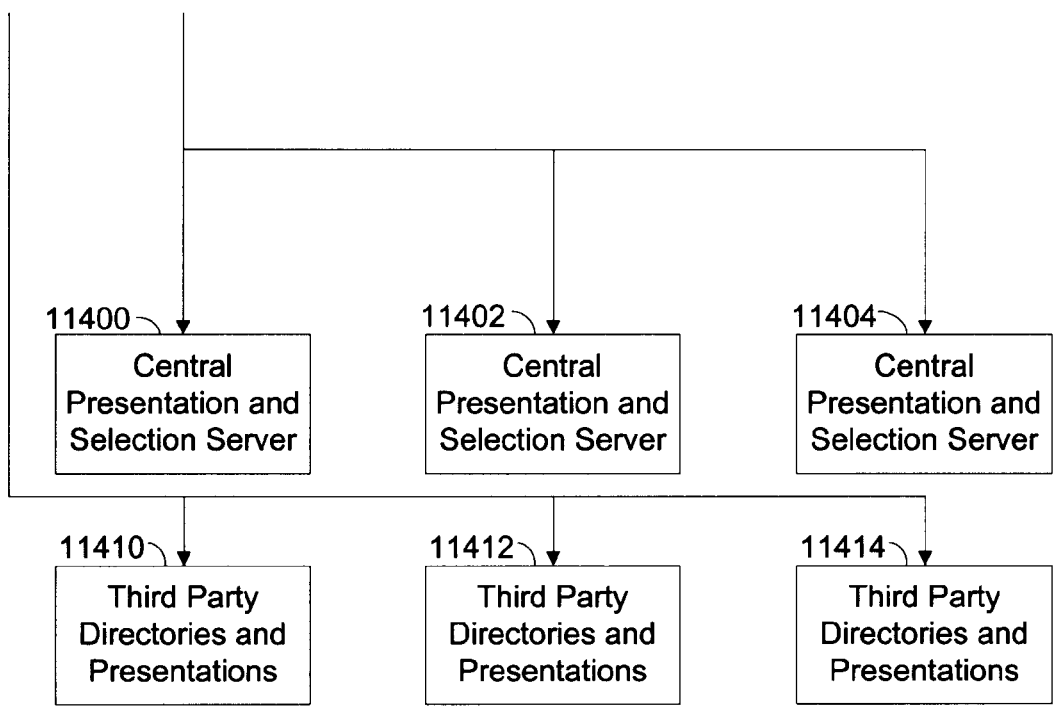

The preferred embodiment of the present invention allows Sellers to have a "self-serve" relationship to the networks, directories, indexes, printed media, and other sales and advertising channels (resident and non-resident media) available to and serviced by the given instance of the plesent invention. This relationship and process is accomplished through the Presentation and Configuration Program 4715. The Seller obtains the Presentation and Configuration Program 4715 on either a compact disc (CD-ROM), DVD disc, downloaded file, or some other method, then installs the Presentation and Configuration Program 4715 and its associated programs on an either dedicated or shared-use computer (diagrammed block 11102 to 11106 FIG. 4*a*). This embodiment of this component of the present invention is shown as Seller Interface 4000 FIG. 2*c*, which shows the relationship between the Presentation Program 4715 and the associated hardware, programs and databases of Seller Interface 4000.

Once installed and configured, the Presentation and Configuration Program 4715 allows the Seller to control access to the program through password protection (block 11120), allowing only authorized personal of the Seller to access the program. This access control is important because the Presentation and Configuration Program 4715 may control substantial portions of the seller's sales, therefore the presentations should only be created or modified by authorized personnel.

Upon accessing the Presentation and Configuration Program 4715, the new Seller/client is presented with a series of forms containing yes/no choices, text entry areas, menu-driven choices, and other data and information entry methods. These forms lead the Seller through his establishment as a client of the given instance of the present invention,. This portion of the Presentation and Configuration Program 4715 prompts the Seller for information such as contact numbers, contact address, payment methods, and other Seller/client information for the use of the management of the instance of the present invention in working with and servicing the Seller. This portion of the Presentation and Configuration Program 4715 also presents the service contract for the review and agreement of the Seller. This agreement, complete with the management information, is then transmitted to the Central Controller and Presentation Processor 1000 along with all other Seller/client information upon the first submission of the Seller's presentation information. In the case of an existing Seller/client, the Seller enters his password (block 11120) to access the body of the program for creation and maintenance of his presentations.

Upon entering the information to establish the client relationship, the new Seller/client is presented with the forms that give the choices of presentations, interactive sales presentations, resident and non-resident media that are supported by the given instance of the present invention. These choices are accompanied with descriptions of each choice and the approximate cost of each presentation for all choices of presentations, resident and non-resident media. This information comes from the Presentation Rules Database 4650. Because in many cases the Seller will be receiving transactions and taking orders over the instance of the present invention, the Seller may be given the option of paying for the services by monthly, quarterly, or annual subscriptions, on a per sale or percentage basis some combination of any of the above; or another payment method. As an example, if the instance of the present invention were configured to support "Sailboats For Sale," the Seller may be given the choice of three Internet Directories that specialize in boating-related goods and services, two printed magazines, and a subscription-based CD-ROM. The Seller could then choose one or two or all of the media/means of communication in which to be represented, with all presentations created by the Presentation and Configuration Program 4715 (blocks 11130, 11132). The Presentation and Configuration Program 4715 would then prompt the Seller for the necessary and optional information to complete the presentations (block 11140, 11142). It should be noted that each presentation might have very different standards for publishing the same information. In those cases, the same questions or at least similar prompts may be presented to the Seller, requiring the entering of virtually the same information in multiple locations on the forms. Although this may seem redundant to the Seller, the differences will become apparent because each separate entry is controlled by the information contained within the Presentation Rules Database 4650. As a simple example, the description in a particular Internet Directory may allow for up to 3000 characters, whereas a printed magazine may allow only 300, depending on the presentations chosen. As the Seller enters information, the Presentation and Configuration Program 4715, using the information contained in the Presentation Rules Database 4650, controls and monitors that entered information to conform to the controlling format and style for each targeted media venue or outlet presentation.

After the Seller has chosen the channels and means of communication and has entered the information necessary to create all the selected presentations, the Presentation and Configuration Program 4715 notifies the Seller of the cost of and payment methods acceptable for those presentations or modifications and prompts the Seller for acceptance of the charges, If the Seller does not accept the charges, then the Presentation and Configuration Program 4715 rolls the information or modifications back and notifies the Seller that the information will not be published or modified (blocks 11150–11156).

The Seller is allowed to print reports for management review or for hard copy records. Those reports include the charges and conditions that have been agreed to by the Seller (blocks 11160, 11162).

The information entered, either as a new presentation or as modifications to an existing presentation, can be sent to the Central Controller and Presentation Processor 1000 immediately or delayed for publication later. The reasons for delay could be that the presentation is geared to a given date or holiday, such as a Valentine's Day getaway offer from a resort, or is a special promotional offer to be used upon reaching a given inventory level (blocks 11170, 11172).

The Communication and Transport Program 4760 performs the transmission of the Seller's presentation information from the Seller Interface 4000 to the Central Controller and Presentation Processor 1000. The Communication and Transport Program 4760 utilizes either the modem or network connections to perform this transmission. The Communication and Transport Program 4760 applies the appropriate level of encryption of data necessary, depending on the method of transmission. In this embodiment of the present invention, the connection used for transmission between the Seller Interface 4000 and the Central Controller and Presentation Processor 1000 is a direct dial-up modem connection. This configuration is more secure than public networks, even with encryption, and, due to the relatively small amount of data transmitted, has sufficient transmission capacity (blocks 11180–11190).

Once the Central Controller and Presentation Processor 1000 receives the presentation message from the Seller Interface 4000 (block 11200), the Presentation Generation Program 1710 determines if the presentation message is information from a new Seller/client or modification to an existing current presentation from an existing Seller/client (block 11210). If it is a presentation message from a new Seller/client, the presentation message is passed to the General Management Program 1730. The General Management Program 1730 sets up the necessary Seller/client control accounts, payment information, contact information, database records, and any other administrative functions necessary to establish the Seller/client within the instance of the present invention and allows the creation of presentations by the Presentation Generation Program 1710 (blocks 11212, 11214). If the presentation message is from an existing Seller/client, the presentation message does not leave the control of the Presentation Generation Program 1710, which confirms the authenticity of the Seller/client presentation message prior to processing the message (block 11220, 11222).

Once the Presentation Generation Program 1710 has either confirmed the authenticity and origin of the presentation message or the message has passed through the General Management Program 1730, the Presentation Generation Program 1710 then analyses the information using the format and style guidelines contained within the Presentation Rules Database 1650 (blocks 11230, 11232). This process parallels the functions performed by the Presentation and Configuration Program 4715 and the Presentation Rules Database 4650. This duplication of function ensures both quality control of content and prevents tampering of the process by either the Seller or any non-authorized entity. This duplication of function also ensures that the latest version of the Presentation Rules Database 1650 has been applied to every presentation. This embodiment of the present invention updates any changes in the Presentation Rules Database 1650 to the Presentation Rules Database 4650 using update messages to the Seller Interface 4000. Although this method should result in the Presentation and Configuration Program 4715 always using the best and most current information that has been updated to the Presentation Rules Database 4650, the integrity of the presentations is critical enough to require the duplication of this function.

During the analysis of the presentation performed by the Presentation Generation Program 1710, the program reviews the information and assigns the presentations into one of three processing categories: pass, fail, and needs review (blocks 11240–11272). A presentation in the "fail" category causes a rollback of data in the Presentation Database 1640, and a message is sent to the Seller notifying them that the presentation failed and the reason why (blocks 11242–11246). Messages are also sent to the management of the instance of the present invention because the synchronization of the Presentation Rules Database 1650 and Presentation Rules Database 2650 should prevent this failure. The management would investigate the reason for the failure and take appropriate action. Those presentations in the "needs review" category are ones which have content that is not recognized as being either allowed or not allowed by the Presentation Generation Program 1710. These presentations are referred to a human operator for review (blocks 11250–11262). The operator will pass, fail, or edit the presentations at this point. Those that fail return to block 11242. Those that are edited are sent back to block 11230. This forces the analysis done by the Presentation Generation Program 1710 to pass every presentation. It is through this process of forcing corrections to be made, examined, and reviewed by management that the information contained within the Presentation Rules Database 1650 and the algorithms which apply that information within the Presentation Generation Program 1710 are refined (block 11272).

Once the presentation has worked through the analysis and review process, the Presentation Generation Program 1710 passes information to the General Management Program 1730 confirming the acceptability of the presentations. The General Management Program 1730 then confirms payment method and amounts, processes credit card payments, updates databases, and performs any other administrative procedures necessary (blocks 11280–11284).

Having passed the presentation information for content and style, the Presentation Generation Program 1710 next determines the directories and presentation indexes in which this information should be published (blocks 11290–11296). In the preferred embodiment of the present invention, each Central Controller and Presentation Processor 1000 may support any number of client outlets, channels, resident media, or non-resident media. These client outlets, channels, resident media, or non-resident media may include Central Presentation and Selection Servers 2000; Independent Presentation 3000; Printed Publications, Periodicals, Directories, CD-ROMs, and other Media Interface 6000 FIG. 2e; and other sales outlets, channels, or advertising methods.

The Presentation Generation Program 1710, using the information contained within the Presentation Rules Database 1650, then formats the presentation information for each client outlet, channel, resident media, or non-resident media (blocks 11300, 11294). New presentations are created in their entirety, while only the portions of existing presentations affected by any modifications are republished. After creating or modifying the presentations, messages confirming any edits or modifications of submissions are created and sent to the Sellers (blocks 11310–11336).

The presentations are then separated by their publication destination: resident or non-resident. The presentations destined for non-resident publication are formatted into media transaction messages and sent to the appropriate Media Interface 6000 for processing and ultimate publication. Upon receiving the media transaction message, the Media Interface 6000 and specifically the Transaction Processing Program 6720 or Media Accounting or Management Program 6000B if available, will process the message and schedule the publication of the presentation depending on media type, venue, available dates or other considerations. It should be noted that the non-resident media category and Media Interface 6000 is designed to provide a nearly seamless, self serve transaction environment that can be configured for an extremely broad spectrum of media vendors, resellers, and representatives. The makeup of these media vendors, resellers, and representatives will be in direct response to the demographics of buyers and sellers of the given instance of the present invention. The configuration of the offerings to the Sellers and also the design and configuration of the Media Interface 6000 are a result of the media vendors, resellers and representatives (blocks 11340–11358).

The presentations that are to be published in resident media are then sorted into those that the Central Controller and Presentation Processor 1000 publishes to directly, supported electronic media such as Internet, Intranet, and other similar electronic presentations and those "other" supported resident media. For any given instance of the present invention there may or may not be other resident media such as printed directories and presentations. Their inclusion is entirely optional (blocks 11360, 11362).

Presentations that the Central Controller and Presentation Processor 1000 will directly publish on media such as the Central Presentation and Selection Servers 2000 may be published either on an "urgent" or "course of business" basis. This designation is set by the Seller at the time that the "original presentation" or "update to a publication" information is sent to the Central Controller and Presentation Processor 1000 thereby allowing the Seller a measure of control if the nature of the presentation or correction warrants it. The "urgent" designation means that the Central Controller and Presentation Processor 1000 will process that presentation as soon as it receives the message. The "course of business" designation allows the Central Controller and Presentation Processor 1000 to place the presentation and any associate files into a queue for processing and publishing at a time when the resources of the network are at their lowest utilization (blocks 11370–11374).

The publications that are directed for resident media and are to be electronically published on the Internet, Intranet, or other electronic presentation channels are matched to the supporting, linking, dependent, reference, attached, or other affected parts or components of the directories, indexes, or presentation structures to which the presentations are published. Once identified, those parts or components are updated to reflect the changes caused by the new and updated presentations and information. As an example of the cascading or domino effect that the publication of a new presentation might have on an instance of the present invention, suppose the Central Controller and Presentation Processor 1000 is supporting a Central Presentation and Selection Server 2000 that is configured to represent lodging. A given directory for lodging may require that the new presentation be indexed by the state and city in which the lodging facility is located. In the interest of giving the best and most useful presentation to potential Buyers of the lodging services, the directory could also index the lodging facility by other categories to make the Buyer's selection easier. Some of the possible logical divisions are by locations such as "Lodging by the Ocean" or "Lodging in the Mountains", by services or specialties such as "Weddings" or "Business Conference and Meeting Facilities", or by promotional offerings such as "Romantic Getaways" or "Corporate Retreats". Each of these additional categories would need indexes and supporting structures that would be updated and changed when the referenced facilities were changed or updated. It should be noted that the prior art generally allowed these indexes or categories to be accessed by the buyer using database searches thereby not allowing or promoting the open access created by the present invention.

This embodiment of the present invention is not configured to support resident media other than the core presentations intended for Internet, Intranet, and interactive electronic presentations. However, depending on the demographics of the Buyers and Sellers, additional resident media can be added by the management of the instance of the present invention (block 11380).

At this point the Presentation Generation Program 1710 contains all the presentations and presentation components that have been created or edited. The Presentation Generation Program 1710 will proceed to publish or place the presentations and any supporting components in their proper locations on the Central Presentation and Selection Servers 2000 and Independent Presentation Directories and Indexes 3000 (block 11390–11414)

Seller Setup and Use of the Resource Saver Protocol

The preferred embodiment of the present invention utilizes the Resource Saver Protocol to reduce the number of messages sent and received by all components of the present invention while maintaining the control and synchronization of any qualified inventory that is offered for sale. With the reductions in the quantity of messages needed to maintain inventory synchronization, there is a corresponding reduction in all other aspects of communications and processing overhead between both collocated and remote components. This savings is especially significant, with magnified results, when more than one Central Presentation and Selection Servers 2000, sales outlets or channels are used in the marketing of the controlled inventory. Although most inventory types can benefit substantially from the utilization of the Resource Saver Protocol, it is most effective when controlling those inventory items that are substitutable but may be limited in availability.

It should be noted that the term inventory is used in a very broad and general sense. The term inventory can apply to goods, products, services, reservations for services, or any other identifiable unit or item to be sold, conveyed, or reserved.

The block diagram of FIGS. 5*a* through 5*h* is an example of the Seller's setup and use of the Resource Saver Protocol as part of this embodiment of the present invention. In the first example, the instance of the present invention has been configured to represent Hotels and Lodging, and the Seller is a hotel with 312 rooms of the following types: 200 standard rooms, 100 upgrade rooms, and 12 suites.

The setup of the Resource Saver Protocol is accomplished within the Presentation and Configuration Program 4715 of the Seller Interface 4000. The seller divides the inventory into its logical groups for marketing, presentation, and sales to the Buyers. In this case, the groups are standard rooms, upgrade rooms, and penthouse suites (blocks 13100, 13110). Each item in each group of inventory must be substitutable with all the other items within that group. With the example hotel, we will assume that all rooms are identical within their groups without special view or amenities (blocks 13120–13132). If the inventory were not absolutely substitutable to any given Buyer, then the Seller would not use the Resource Saver Protocol with this inventory. That does not mean that all the Inventory items or groups of a Seller must either be or not be controlled by the Resource Saver Protocol. The Seller may have any combination of Inventory items or groups controlled or not controlled by the Resource Saver Protocol.

In the case of the current hotel example, the inventory is considered to be both Limited and Time Sensitive. There are only a limited number of rooms of each type, and they are time sensitive in the fact that the inventory is sold by the "unit night" which, if not sold, can never be used or recovered (block 13150).

Next, the Seller must set the maximum units of inventory that any given Buyer will be allowed to purchase in any given single purchase. In our hotel example, the Seller might set a limit of 4 rooms for any given Buyer to purchase from any central Presentation and Selection Server 2000 serviced by this instance of the present invention (block 13140). By setting a reasonable maximum number of units of inventory that any given Buyer may purchase, the Seller prevents that rare but possible case of a self-serve Buyer purchasing or reserving more inventory than is available. The Buyer is still allowed to purchase as much as he would like, but the purchase must be transacted in sequential "maximum unit" transactions as opposed to one large transaction.

The explanation for blocks 13152 to 13184, which covers common inventory, follows the next example. The next decision pertaining to the suitability of each inventory group for control by the Resource Saver Protocol must be arrived at by assigning a number for the buffer inventory level. The purpose of this buffer is to allow for a margin of error, based on processing time and communications delays, that prevents the overselling of inventory (overbooking in the hotel example). This number is an estimate intended to be adjusted, based on the Seller's experience over time. The only loss of efficiency associated with setting the buffer number too high is the cost of the communications for the extra units within the buffer category (block 13190). In our hotel example, the management might set the buffer at 8 units (twice the maximum single purchase) as a starting point, to be adjusted later based on experience.

To determine if there is sufficient inventory to realize a savings by utilizing the Resource Saver Protocol, the Seller subtracts the total of maximum single purchase units and buffer units from the total inventory. In our hotel example, the 200 standard rooms minus 4 maximum purchase rooms and minus 8 buffer rooms results in 188 rooms for which the Seller could realize savings. For the upgrade rooms, the management might use the same maximum purchase number and buffer number, resulting in savings for 88 rooms. In the case of the suites, the management might set the maximum purchase at 3 and the buffer at 6, which would only result in savings on 3 units. This "savings" would probably not be worth implementing the Resource Saver Protocol (blocks 13210,13212).

If the savings are sufficient enough to utilize the Resource Saver Protocol, then the Seller must determine the Notification Level. The Notification Level equals the maximum purchase units plus the buffer units. In our hotel example, the Notification Level for the standard rooms and upgrade rooms would be 12, and the suites would not be covered by the Resource Saver Protocol at all due to the limited inventory (blocks 13210–13232).

Once all groups of inventory have been analyzed and any notification levels have been set then the Presentation and Configuration Program 4715 would update its databases and transmit the settings to the Central Controller and Presentation Processor 1000. The Central Controller and Presentation Processor 1000 would update its databases and then forward the information to any Central Presentation and Selection Servers 2000 that are affected (blocks 13260, 13262).

It should be noted that the savings generated are more substantial than they appear to be for some Seller types. This is because the typical total sales of inventory in any given period does not reach the level that triggers the notification of Central Presentation and Selection Servers 2000 or other outlets and channels. With our hotel example, the hotel may only operate above the 88 percent occupancy of the standard and upgrade rooms a few days a month, thereby not triggering the communications and processing required above that notification level except for those few days.

The savings become obvious when one looks at the processing of the individual transaction messages as outlined on FIG. 5*d*. All transactions, from all sources, are entered in such a way as to produce transaction messages that are then processed within the total system (blocks 13270–13284). As the transaction messages are processed by the Seller Interface 4000, more specifically the Transaction Processing Program 4720 or the Seller Accounting or Management Program 4000B. Only those that are not controlled by the Resource Saver Protocol and those that have reached or breached the notification level trigger the sending of transaction messages with the current inventory count to the Central Controller and Presentation Processor 1000. The Central Controller and Presentation Processor 1000 then sends that message on to all Central Presentation and Selection Servers 2000 that are affected. If that Central Controller and Presentation Processor 1000 is controlling 3 Central Presentation and Selection Servers 2000, then each message that is passed to the Central Controller and Presentation Processor 1000 generates 3 additional messages to the Central Presentation and Selection Servers 2000 (blocks 13290–13296). Those transaction messages that are controlled by the Resource Saver Protocol and do not reach or breach the Notification Level would require no messages to be sent to the Central Controller and Presentation Processor 1000 and then on to the Central Presentation and Selection Servers 2000 (blocks 13310–13320).

It would not be unreasonable to expect the hotel in our example to experience a 95 percent saving in transaction communications and the associated overhead by using the Resource Saver Protocol.

Common goods and products experience the most savings within the present invention by utilizing the Transmission Level Method in conjunction with the setting of the Transmission Period.

As an example, consider a Seller of music CDs. The Seller would separate his inventory into titles to be offered. each CD of a given title is obviously substitutable with any other CD with that same title and is available in an almost unlimited supply. The Seller could order or press more if needed (blocks 13100 to 13130). The inventory is substitutable and almost unlimited in supply, therefore common. The setting of the maximum units of inventory that any given Buyer will be allowed to purchase with common inventory is not as critical to prevent overselling as with Limited or Time-Sensitive inventory; however, this is one of the controlling factors in setting the Transmission Level (block 13140). With a common type inventory, the savings of communications and processing while utilizing the present invention comes from the periodic processing and transmission of all transaction messages based on the setting of Transmission Levels, Transmission Periods, and Transmission Times. The use of these settings is possible with common inventory items because there is no concern for overselling the inventory. The Transmission Level is the total cumulative number of inventory items sold at any given Central Presentation and Selection Server 2000 or outlet that forces a transmission of the transactions messages. The Transmission Level is the maximum units of inventory allocated by the transaction messages saved, stored, or held as a batch by the Central Presentation and Selection Server 2000 or outlet that then forces the transaction messages to be transmitted to the Central Controller and Presentation Processor 1000. The initial setting of this number by the Seller requires the consideration of the availability of inventory and the processing and delivery of the sold inventory. With our CD Seller example, if the Seller were represented on 20 Central Presentation and Selection Servers 2000, the potential sales surge caused by the maximum held units is 20 times the setting of the Transmission Level. It may be unlikely that all Central Presentation and Selection Servers 2000 and outlets would reach maximum hold items at the same time, but this volume can be handled with planning. If the CD Seller were to set the Transmission Level at 100, then whenever each Central Presentation and Selection Servers 2000 or outlet was holding that many combined sales, it would trigger the transmission of all transaction messages and the clearing of that number or buffer (blocks 13152–13158). If the Seller utilizes the Transmission Level Method, he must also set the Transmission Period. This prevents the Central Presentation and Selection Servers 2000 or outlet from holding the transactions messages indefinitely when the Transmission Level has not been reached and ensures a reasonable processing flow of transactions. If the Seller does not utilize the Transmission Level Method, he may set the Transmission Period alone to control the sending of transaction messages on a regular basis (block 13146).

The setting of the Transmission Time Control allows the Seller to direct the Central Presentation and Selection Servers 2000 or outlets to transmit their transaction messages at a specific time. The intent of this setting is to allow the Seller to schedule the transmissions to take place when the communications and processor utilization is at the lowest point during the daily business cycle. The Seller is allowed to either set each Central Presentation and Selection Server 2000 or outlets to a specific time for transmission or set a specific time to be used with random offsets that have been set for the Central Presentation and Selection Servers 2000s or outlets. The use of offsets creates a spread or staggering of the times at which the Central Presentation and Selection Servers 2000s or outlets are transmitting their transaction messages, thereby better utilizing all communications and processing resources (blocks 13162–13184).

In the CD Seller example, the major savings experienced utilizing the Resource Saver Protocol would not only be in limiting the number of times messages are transmitted back and forth, but would also be in the utilization of the automatic scheduling of the communications and processing usage times so that transaction messages will be received at times of less usage. This last method of savings is even more powerful when the Seller realizes more accessibility by potential buyers at high usage times when the computers and networks are freed up from transaction Messages.

The block diagram of FIG. 5*e* through 5*f* is an example of the Resource Sever Protocol as used by an instance of a Central Presentation and Selection Server 2000 as part of the preferred embodiment of the present invention.

Once the Buyer has made his purchase decision and has provided the necessary purchase information, the Central Presentation and Selection Server 2000 and more specifically the Transaction Negotiation Program 2725 processes and creates a transaction message for transmission to the Central Controller and Presentation Processor 1000 (block 13330). If the item of inventory is "common" and the Seller is using the Transmission Level method to control the transmission of the transaction messages, then the transaction messages being processed are placed on hold. If the total of all sold inventory represented by the held transaction messages equals or exceeds the Transmission Level, then all messages are immediately sent to the Central Controller and Presentation Processor (blocks 13342 and 13366). The Transmission Level is set by the Seller to prevent the accumulation of too much sold inventory on any given Central Presentation and Selection Server 2000 or other sales outlet. If the accumulated inventory sales exceed the Transmission Level at any time, then all messages are sent immediately. If the Transmission Level has not been exceeded, then the transaction messages are held until the Transmission Period has elapsed and the Transmission Time has arrived (blocks 13262 through 13366). By setting the Transmission Period, the Seller can require all transaction messages being held to be transmitted on a regular or periodic basis. As an example, the Seller might require the transaction messages to be sent every 24 hours. This setting allows the Seller to set the urgency of the processing of transactions messages and ensures that transaction messages are processed in a timely fashion. Another setting that allows the Seller to control the workflow and processing of transaction messages is the Transmission Offsets, which are specific to each sales outlet. The Transmission Offset is a number of minutes that is assigned to each sales outlet, which is then added to the Transmission Time that has been selected by the Seller. This sets the actual time an outlet is to transmit its accumulated transaction messages. This offset allows the Seller to prevent all Central Presentation and Selection Server 2000 and other sales outlets from attempting to transmit their transaction messages at exactly the same time (blocks 13356–13366). The Seller has the option of not utilizing the Transmission Level, instead setting only the Transmission Period (blocks 13340, 13350). This combination might be used for a Seller that has an unlimited inventory such as the music CDs. If the Seller sells out of current inventory, they can create unlimited additional units.

If the inventory is of a more unique or time-sensitive nature, then the Seller would probably not use the previous two methods, instead favoring the Notification Level method of the Resource Saver Protocol for all but the very unique inventory items (block 13370). With the Notification Level being the controlling method of processing, the criterion is whether the Notification Level as set by the Seller has been reached or breached. If the current status of the Notification Level is such that it has not been reached or breached, then the transaction message is transmitted immediately to the Central Controller and Presentation Processor 1000 If the current Notification Level has been reached or breached then the current sold units of inventory are subtracted from the inventory count and that information is updated to the database and added to the transmission message to be sent to the Central Controller and Presentation Processor 1000. The transmission message is processed and then transmitted from the Central Controller and Presentation Processor 1000 to the Seller Interface 4000 (blocks 13372–13400).

It should be noted that the Seller Interface 4000, and specifically the Transaction Processing Program 4720 or the Seller Accounting or Management Program 4000B, will make the determination for when the Notification Level has been reached or breached (block 13410). As soon as any given transaction, either electronic or otherwise, has reduced the available inventory so that the Notification Level is reached or breached, then either the Transaction Processing Program 4720 or the Seller Accounting or Management Program 4000B sends updates to the Central Controller and Presentation Processor 1000 and any other sales outlets affected. The Central Controller and Presentation Processor 1000 processes the message, updates its databases, and then sends the updates to any Central Presentation and Selection Servers 2000 under its control (blocks 13410–13418). In any given instance of the present invention, once the Central Presentation and Selection Servers 2000 or any other sales outlet has been notified that the Notification Level has been reached or breached and given the current inventory level, then each Central Presentation and Selection Server 2000 or outlet adjusts the available inventory and adds that information to each future transaction message processed (blocks 13372–13376).

The block diagram of FIGS. 5g through 5h is an example of the inventory setup and maintenance using the Resource Saver Protocol and Seller Interface 4000 as part of the preferred embodiment of the present invention.

Initial setup of adjustment of the inventory takes place by the Seller when first setting up their account and creating their presentations within the Presentation and Configuration Program 4715. The seller establishes the type of inventory and the settings that are appropriate for the inventory's sale and control (blocks 13500). Replaceable inventory is managed by either the Transaction Processing Program 4720 or by the Seller Accounting or Management Program 4000B setting, adding to, or adjusting the inventory count as appropriate (blocks 13502–13516). Fixed inventory is managed at the Central Presentation and Selection Server 2000 level with the inventory being set into the future at the given level set by the Seller from the Seller Interface 4000 (blocks 13510–13562). The inventory level may vary even with fixed inventory based on Buyers purchasing or canceling the purchase of the inventory. This means that the controls utilized by the Notification Level for a given inventory could be turned on, then off, then back on, several times based on purchases and cancellation of purchases. This on-again off-again tracking of inventory, although appealing confusing, will maintain the synchronization of the inventory and prevent overselling to the Buyer.

If the Resource Saver Protocol is not used to control inventory, then the inventory offered for sale is synchronized by the present invention between all components, Seller Interface 4000, Central Controller and Presentation Processor 1000, and Central Presentation and Selection Server 2000. This synchronization is maintained at all times with the utilization of the transaction messages between all components.

When the Notification Level method of the Resource Saver Protocol is used, then the inventory offered for sale is synchronized by the present invention from the time the Notification Level is reached or breached until all inventory is sold. When all inventory is sold in either case above, then the Transaction Negotiation Program 2725 of the Central Presentation and Selection Server 2000 of an instance of the present invention notifies the buyer that no inventory is available and may offer possible alternatives or substitutes. The adding to or the replacement of inventory increases the inventory count or level. These events are processed as transactions messages that are sent from the Transaction Processing Program 4720 or the Seller Accounting or Management Program 4000B of the Seller Interface 4000 to the Central Controller and Presentation Processor 1000. The data for the inventory increase or replacement is either entered by the operator of the Seller Interface or is automatically updated by the aforementioned programs. The Central Controller and Presentation Processor 1000 then transmits transaction messages to any Central Presentation and Selection Servers 2000 or other outlets that are affected. Those Central Presentation and Selection Servers 2000 or outlets reset their inventory counts or levels and any control settings that are affected.

The invention allows sellers to present their inventory, products, goods and services in a choice of one or a variety of supported media outlets: in print, such as newspapers, magazines, periodicals, guidebooks, catalogs, brochures, fliers, and directories; in electronic form, such as online directories, web sites, bulletin boards, news groups, CD-ROMs, and interactive media and networks; and in other media, such as billboards, skywriters, bus benches, radio, interactive kiosk and any other form of customer outreach or information distribution. When these media choices are made, the present invention prompts the seller for information that is then used in the creation of presentations for the media outlets he has chosen. The Presentation Rules Database 1650 and 4650 holds all the criteria, formatting architecture, and distribution factors for each participating media outlet. The present invention's Presentation Generation Program 1710, along with the Presentation Rules Database 1650 and 4650, then creates a presentation for each and every media outlet the seller has chosen. The Presentation Generation Program 1710 then either transmits the presentation to the appropriate destination or holds it for a publication date to be submitted for a particular deadline or predetermined promotional market.

The seller can then print out a report that shows him each presentation, distribution or media outlet, and the pricing of each media choice for an overall marketing valuation.

The present invention allows the Seller to update, change, control inventory, and automatically process sales either from his in-house or third-party accounting or management software that has a compatible communication component with the present invention or in the present invention. He can accomplish this updating and inventory control to all media outlets simultaneously.

The Presentation Generation Program 1710 creates presentations that can be accessed by the buying public in location/outlet appropriate formats and availability through the Central Presentation and Selection Server 2000; Independent Presentation Directories and Indexes or Independent stand-alone Presentations 3000; Printed Publications, Periodicals, Directories, CD-ROMs, and other Media and Presentations 6000; and the Buyers Interface 5000. The present invention allows buyers to review descriptions; specifications; photos; graphics; pricing; and the availability of products, goods, and services, including time- and allocation-critical services. The buyer can access this information and these resources through either a search specific mode or a browsing mode, depending on the advertising channel or media outlet he is using.

The invention allows buyers to hold or commit to the purchase; reservation; or utilization of those products, goods, and services, within the practical limits of the expiration of their utility or availability, on those media outlets supported by a Central Presentation and Selection Server 2000. The buyer can confidently select products, goods, and services with real-time or near real-time purchasing. Once the buyer has committed to a purchase, the commitment is transmitted to the seller and the inventory is updated. With the present invention, inventory control of the suppliers, vendors, service providers, purveyors, and other types of sellers is maintained with transaction and, when necessary, confirmation message units sent between the Central Controller and Presentation Processor 2000 and those same suppliers, vendors, service providers, and purveyors.

Once the buyer makes a purchase or reservation, he can choose a method of confirmation, get a print-out of seller's commitment for delivery, an entry code number or whatever means of confirmation determined by the Seller. As an example, the buyer can even get a complete printout of directions to the facility if the purchase involves him arriving at a place of lodging, restaurant, arena, store, or any other facility. All these methods of confirmation can be near real-time. The buyer does not have to wait for printed tickets, passes, admission documents, reservation confirmations, or other physical substantiation to be mailed or conventionally delivered to him.

Thus, the full implementation of the present invention makes the usual requirement of delivery of tickets, passes, admission confirmations, or reservation confirmations unnecessary. These traditional conveyance forms are replaced or augmented by the buyer's Reservation/Ticket Network ID card or confirmation of biometric ID. The present invention allows buyers of tickets, passes, admission documents, and reserved services to purchase or reserve those tickets, passes, admission documents, or services remotely via electronic network presentations, Internet, Intranet, dial-up self-serve or operator-served systems using standard telephone communications, or other means. The invention allows the buyer to confirm or prove his purchase at the facility, site, business, or venue by means of magnetic, smart, or optical ID cards or by electronic biometric authentication. These means of proof can be issued by the operators of an instance either for exclusive use for that instance of the present invention, for multi-use in conjunction with other entities and the operators of the other instances of the present invention, or through a "piggy-back" method that will allow the issue of Credit Cards, Membership ID Cards, or other ID Cards. For those services or events that require printed tickets, passes, admission documents, reservation confirmations, or other physical substantiation, those means of confirmation can be printed on demand from either automatic or manual vendors upon electronic reading or scanning of the buyer's Network ID card, the buyer entering a code, or by biometric authentication.

The invention's Resource Saver Protocol allows for the coordination and synchronization of the sales and availability of products, goods, and services between interactive electronic presentations and other sales outlets, channels, or sources while reducing the communications and resources necessary to maintain that coordination and synchronization. The present invention does this while both allowing for the purchase or reservation through electronic networks and other diverse channels or outlets and keeping control of inventory to prevent overselling or overbooking. The seller can define his inventory and establish the settings that are appropriate for the sale and control of said inventory. Then communications will be transmitted when the levels he sets are reached or breached, when a notification time has been reached, or when a notification level has been met. If the seller does not have similar or substitutable inventory, then transmissions must be made for each and every sale. However, the seller may have some inventory that can benefit from the Resource Saver Protocol while other inventory is unique. This cost saving device will also allow the seller to schedule transmissions to be made when other uses of the Central Presentation and Selection Servers 2000 is at a low traffic level.

The invention will not only transmit all sales and reservations to the seller's compatible in-house accounting and management program or to an instance of the present invention at his location, but it will also update and control inventory offered on all the media channels and outlets on which that seller has chosen to sell his products, goods, and services.

Example Use of Invention

The following is a hypothetical example for the use of the present Invention in one possible embodiment. Only the major steps are included in this example to give an overview of one possible application or embodiment of the present invention. This example demonstrates some of the possible interface and interactions between operators of the invention, sellers or providers of goods or services, and customers or buyers of those goods or services. It is also meant to give an overview of the transaction flow of information, purchase decisions, and possible consummation of those purchase decisions.

For the purpose of this hypothetical example, we will presume that this instance of the Invention has been established for some time and is managed by the ABC Company that promotes it to Professional Sports Franchises and Venues.

Example Clients Are

Seller:
    XYZ is a corporation that owns the XYZ professional basketball team and wishes to promote that team and sell its tickets as efficiently as possible.

Media:
    DEF is a basketball oriented web site owned by the DEF Corporation with content and discussion groups about the sport of basketball. Its demographics are centered on young male basketball enthusiasts.

GHI is an all sports oriented web site owned by the GHI Corporation with content and discussion groups covering all sports. Its demographics are largely young male.

JKL is a national sports magazine, published by the JKL Corporation monthly with subscription and retail rack sales. Its demographics are centered on an all sports audience.

MNO is a sports newsletter, published by the MNO Corporation with a circulation that is primarily within the geographic area of the home stadium of the XYZ basketball team.

PQR is a broad-based chain of newspapers published across the country by the PQR Holding Corporation. Their circulation is a general one with a sports section daily and a special sports insert on weekends.

STU is a chain of music and video stores that have displays within their stores allowing sports and event information and ticket sales. Their stores are located within urban malls and their customer base primarily is mixed gender between 15 and 25 years of age with good disposable income and leisure time. STU has also installed the biometric readers necessary to do the initial entry of buyers into the ticket and reservation network, which is part of the ABC instance of the invention.

Buyer:
    John Q. Public is a basketball enthusiast.

Media Participation

The DEF Corporation was approached by the ABC Company and agrees to be represented on the ABC instance of the invention.

1) The DEF Corporation decides that it will promote one of the five Internet Web Sites that it publishes on the ABC instance of the invention, DEF will promote its basketball site because it matches well with the focus and demographics of the ABC instance of the invention.
2) ABC sends DEF the necessary software to be installed on their computer.
3) A computer operator at DEF installs the software on their computer that then is configured as Media Interface 6000 FIG. 2e.
4) After installation and setup the DEF operator does basic information input as prompted by the Media Interface 6000 FIG. 2e of the present Invention.
5) After the input of basic information by the operator, the Media Interface 6000 prompts the operator for input that describes and sets the standards for the presentations that Seller Clients of ABC will use (by way of the invention to publish presentations) on the DEF Web Site. The inputs set the upper and lower limits of quantities such as amounts of text and size of images, restrictions of language and reference, standards of style and presentation, choices of type fonts and colors, as well as the cost of presentations and demographics of the DEF subscribers or viewers. Any disclaimers and contracts or agreements are added to be delivered and acknowledge electronically concurrent with the submission of presentations.
6) DEF has also chosen to offer interactive sales of appropriate products and services through its web site as managed by the ABC Central Presentation and Selection Server.
7) At any point during the input of information the operator may test the presentations that will be created using the standards set within the Media Interface 6000 FIG. 2e. This allows the operator and DEF's management to insure that those presentations received for publication from the ABC Seller Clients will indeed meet the standards for DEF publication.
8) The other Media GHI, JKL, MNO, PQR, and STU have gone through a similar process to establish their Media offerings on the ABC instance of the invention.
9) The following steps pick up from the Sellers Participation below at step number 18. That Seller's action effects the following media.
10) The DEF Sports Web receives electronically the Seller information, agreements, payment information, web pages to be displayed and banner advertising to be placed on their web site. DEF also receives the web interface for the sale of the XYZ tickets.
11) The KLM Newspaper Chain receives electronically the Seller information, agreements, payment information, a requested schedule of ad placement and publishing, and the formatted ads. Because KLM also maintains the associated web site it also receives the web interface for the sale of the XYZ tickets.
12) The HIJ Basketball Magazine receives electronically the Seller information, agreements, payment information, a requested schedule of ad placement and publishing, and the formatted ads to be placed in their magazine.
13) The STU music stores receive electronically the Seller information, agreements, payment information, and the interface for the sale of the XYZ tickets on its in-store displays.
14) Once the Ads and Presentations are received by the Media, any changes or updating are either allowed or denied by the Seller Interface 4000 FIG. 2c based on the restrictions entered by the Media during their setup.

Seller Participation

1) The XYZ Corporation makes the decision to use ABC's services to promote its Basketball team.
2) ABC sends XYZ the necessary software to be installed on their computer.
3) A computer operator at XYZ installs the software on their computer that then is configured as Seller Interface 4000 FIG. 2c,
4) After installation and setup the XYZ operator does basic information input as prompted by the Seller Interface 4000 FIG. 2c of the present Invention.
5) After the input of basic information by the operator, the Seller Interface 4000 presents available media venues and associated information for review by the XYZ Corporation management.
6) ABC currently represents 15 different Media venues within its instance of the present invention. Information such as distribution, users or viewers, price, content restrictions, etc. about each Media venue is available for review by the XYZ management.
7) XYZ management reviews available media and chooses The DEF Sports Web, The HIJ Basket Ball Magazine, and The KLM Newspaper Chain to advertise their schedule of games. With the KLM Newspaper there is also the associated KLM Web Site on which KLM offers information as well as sales of products and services as advertised within the KLM Chain of newspapers. STU music stores are also chosen strictly for the distribution and sales of tickets.
8) The Seller Interface 4000 then presents the publication dates, any specific disclaimers, and the charges for review and approval by the XYZ management,
9) Upon approval of those items, the Seller Interface 4000 prompts the operator for the necessary text, graphics, and any other information as required by the three chosen media to create and format the individual ads for the chosen media.
10) XYZ management has also elected to offer tickets to their basketball games held within the XYZ stadium. They have installed the necessary software that synchronizes the XYZ ticket sales and accounting software with the sales and inventory control provided by the ABC instance of the invention within the Central Presentation and Selection Server 2000. XYZ chooses to offer ticket sales on the DEF Sports Web, the KLM Newspaper associated site that offers interactive electronic sales, and the STU music and video stores in store electronic ticket sales displays,
11) Due to the large number of seats within the stadium and similarity of pricing and desirability among each class of seat, XYZ management has also elected to use the Resource Saver Protocol to allow for better customer service between the various sales outlets.
12) The XYZ management sets the various seat and ticket restrictions, standards and pricing. This information will be available to the Buyer when purchasing through the ABC Central Presentation and Selection Server. Each seat or ticket class is assigned a maximum single purchase number and a buffer number, the total of those two numbers become the notification level. It is the notification level that controls the flow of the communications involving the sale of tickets for XYZ.
13) In order to take full advantage of the services offered by the ABC Central Presentation and Selection Server XYZ elects to install new automatic ticket vendors using the existing ID cards and biometric methods supported by the ABC Central Presentation and Selection Server.
14) At any point during the content input phase, the operator may view the final formatted presentation products based on each Media venue's restructuring of the information to create specific Media presentations.
15) When the XYZ management is satisfied with the results, as presented by the Seller Interface 4000, they indicate their approval of the presentations and charges and then transmits the information to the ABC Central Controller and Presentation Processor 1000. In addition to the presentation information, the game dates, ticket prices, and information that synchronize current sold and available tickets are transmitted also.
16) When the ABC Central Controller and Presentation Processor 1000 receives the presentation information it establishes an account for XYZ, reviews and analyzes the presentation information submitted, and then notifies XYZ as to the acceptance, editing or rejection of the material and any adjusted publishing dates.
17) The ABC Central Controller and Presentation Processor 1000 then transmits the appropriate formatted presentations to each media that was selected by XYZ.
18) The flow of information transfers to the Media Participation section above at step 9.

Buyer Use

For this example we will follow John Q. Public (our example buyer) as he uses the invention.

John is an avid basketball fan and subscribes to the JKL sports magazine, receives the local PQR newspaper, and frequents the DEF web site to participate in the free discussion groups centering on basketball that are hosted there. John has seen the ads within the PQR newspaper promoting the teams winning record and giving dates of upcoming games. Within the ads it was stated that tickets could be obtained from the PQR web site.

(1) Unexpectedly one of John's friends called, stated that he would be in town the next night and would it be possible to go to the basketball game. John said that he would find out and call back. John remembered that the PQR newspaper ad for the XYZ team stated that one could buy tickets at the PQR web site.
(2) John uses his computer and navigates to the PQR web site. Once there he finds the XYZ ticket purchase section, chooses the seats he wants, and asks for availability.
(3) With availability confirmed John enters his payment information and is then asked how he wants the tickets delivered to him. This presents a dilemma for John because he must work tomorrow and will not have time to go to the stadium to pickup the tickets. He could pick them up at a "will call" station when he and his friend go to the game, but there is always a long line and John does not want to wait.
(4) Another option that is presented to John is that of using one of several forms of ID (either credit cards, ID cards, or biometric) as the identification method in lieu of advanced ticket delivery to him, John recognizes that he has one of the accepted brands of Credit Card and chooses to use the system using that Credit Card as his personal ID. He enters the card number as his ID, the system accepts the ID and gives John instructions as to the systems use when they arrive at the stadium.
(5) John calls his friend back and they agree to meet just before the game.
(6) When John and his friend meet at the stadium they are late and the game is about to start. There is a long line at the "will call" booth and John is glad to avoid that line. John goes to the Automatic Ticket Vending Machine, swipes his credit card, and the Automatic Ticket Vending Machine prints the tickets with the seat location and dispenses them to John.

(7) John and his friend enter the stadium to watch the game.

(8) During the game John notices within the free program a notice that he can have his thumbprint taken at the "Will Call" both and then that will become his identification method when he next attends an event at the XYZ stadium. As John is leaving the game, he stops and has his thumb print scanned to serve as his future identification.

SUMMARY

In the simplest scenario when the chosen section or ticket category was not near a sell out (reaching notification level), the sales location that John was purchasing from simply assigned a set of tickets for that section and confirms the sale. The sales location then transmits all data to the Central Presentation and Selection Server 1000 that transmits the information to the XYZ Seller Interface 4000 that then passes the information to the XYZ in-house Accounting and Ticket Sales software.

Whenever sales in any given section reaches the notification level then all sales sites are notified that the quantity of available tickets is limited and that all sales must be confirmed with the Seller prior to releasing confirmation of the sale to the buyer.

With the Biometric scan (thumbprint) that John had done as he was leaving the stadium he can now reserve seats at any of the events featured on the ABC instance of the current invention and will be able to use his thumbprint as his ID for access to the event or facility instead of or in addition to his existing Credit Card.

Presentation Generation Program

This component of the present invention relates to the creation and placement of presentations of commercial information with the purpose of informing buyers as to available products, goods, and services. The invention's purpose is to allow the seller the ability to influence the buyer and induce said buyer to purchase those products, goods, and services while specifically allowing for the advanced purchase or reservation of those products, good, and services when appropriate.

The invention allows sellers to create presentations on their computers that are automatically transmitted to be published and viewed on a variety of traditional and electronic media networks. The present invention partially resides on the sellers' computers, controls and edits the presentation, and then automatically transmits that information and data for publication on traditional media and electronic networks.

The invention allows for the automatic publishing or updating of presentations within a simple environment that does not require lower-level coding or formatting of the presentation material. The present invention employs a text-only entry of information and data, thereby not requiring the seller to have knowledge of presentation computer codes or low-level formatting.

The invention will provide substantial savings in this area of commerce because the seller can choose the media or outlet for sale of his products, goods, or services. His instance of the present invention can then create presentations that conform to each and every media outlet he chooses, submit the presentation, and prepare a report of the cost for such publication choices. The present invention allows sellers to offer their inventory, products, goods, and services for sale in a choice of one or a variety of supported media outlets: in print, such as newspapers, magazines, periodicals, guidebooks, catalogs, brochures, fliers and directories; in electronic form, such as online directories, web sites, bulletin boards, news groups, CD-ROMS, and interactive media and networks; and in other media, such as billboards, skywriters, bus benches, radio, interactive kiosk, and any other form of customer outreach or information distribution.

After the seller makes these media choices, the present invention prompts him for information, based on the criteria set forth by each media outlet and held in The Presentation Rules Database 1650 and 4650, that is then used in the creation of presentations. The Presentation Rules Database 1650 and 4650 holds all the criteria, formatting architecture, distribution factors, and prices for each participating media outlet.

The present invention's Presentation Generation Program 1710, along with the Presentation Rules Database 1650 and 4650, not only creates a presentation designed to conform to the requirements set forth by each media, but it also "dynamically generates" both static presentations which can be accessed by traditional search methods of the buyer and dynamic presentations which respond to the buyer. This function creates two very distinctively different presentations in a labor-saving database method so the seller can save time and resources while creating presentations that incorporate the best of both "dynamic" and "static" type of presentations. {Note: static presentations are easily indexed and accessed by search engine and search modes. These are the best formats for accessibility in electronic media, Dynamic presentations are database-driven and respond to the queries of the viewer (buyer) with current and real-time inventory changes, updates, and control}. An Internet or Intranet presentation that utilizes both methods for delivering information is far superior to any other presentation online today.

The Presentation Generation Program allows for the creation of traditional and electronic sales and information by minimally trained personnel who merely have to input information into the program, aided by prompting from the present invention.

Once the present invention generates the presentation, it either automatically publishes the presentation to the appropriate electronic destination or holds the presentation for a scheduled publication date to be submitted for a particular deadline or predetermined promotional market. These presentations can be updated for either presentation content or inventory control in near real time by either manual or automatic means via electronic message units from third-party management or inventory control software. This means the seller can update or control his inventory in every media with just one in-house updating function.

The presentations created by the present invention allow for the sale of the products, goods, or services and for the making of payments by buyers on those interactive sites that support electronic sales. Inventory adjustments for production, sales, and other reasons are made in near real time, allowing for an accurate presentation of availability of inventory to buyers in all supported media. The present invention, when used in both electronic and traditional media, also allows for lower cost to both the seller and the media management by creating a self-serve, automated billing environment for the seller's creation and publishing of the presentations. The present invention provides substantial savings in the area of commerce because it allows for transactions to occur instantly at "point of sale" or, to use an appropriately faster term, "point of decision".

Interactive Sale and Reservations

On the buyer's side of the process, the present invention provides consistent, vendor-appropriate information in all forms of media for products, goods, and services offered for sale. Prior art, in regards to online presentations, often does not give the buyer current information because that inventory must be manually updated, so real-time or near real-time transaction becomes an inaccurate phrase. The information the buyer gets from one media outlet, electronic mall, or directory may be in conflict from another media outlet, electronic mall, or directory. This conflicting information may contribute to a Buyer's potential dissatisfaction of the Seller and the whole online presentation and sales process.

As previously stated, the present invention's electronic presentations are created to give the buyer products, goods, and services that are easily accessible and that dynamically produce the latest, current information, pricing, and availability. Because the seller can automatically update all media outlets from his in-house management or accounting software or an instance of the present invention, the buyer can feel confident in getting current information and inventory. The Buyer has the choice to either conduct a search for the desired products, goods, or services using the on-site search capabilities or browse the presentations much the same way one would browse the aisles of books at a library.

Once the buyer has made a selection on those supported interactive outlets, he can purchase, reserve, or hold products, goods, or services. The present invention will then tell him that his request is available and ask him to reaffirm his choice.

If his selection is not available, the present invention may give him the opportunity to choose something else, change his purchase request, or provide him with optional choices from the Referral Database 2670. The Referral Database is an option that Sellers can use to recommend other Sellers of similar products, goods, and services. In the case of lodging facilities, often Sellers will refer their overflow to other lodging facilities in their immediate area. In the preferred embodiment of the present invention, Sellers will input referral to other Sellers into their instance of the present invention.

Once the Buyer has been assured that his choice of a product, goods, or service is available, the present invention will then prompt him to enter the information required by the Seller. The Buyer Database 2610 maintains data on buyers who make interactive purchases or reservations of the products, goods, and services offered by the Seller over the Central Presentation and Selection Server 2000 or Independent Presentations 3000. Data fields may contain Buyer's name, network or delivery ID, physical address, phone, email address, credit card information, and any other information deemed necessary to support the Buyer and the Seller's required buyer information. If the Buyer has previously made a purchase through the same instance of the present invention, most or all the information needed may already be in the Buyer Database 2610. In this case, the information required by the Seller will come up on the screen and the Buyer will be prompted to update any Information that may have changed or needs to be added.

Once the buyer has committed to a purchase and has completed all the transaction data required, the commitment is transmitted to the seller and the inventory is updated. With the present invention, inventory control of the suppliers, vendors, service providers, purveyors, and other types of sellers is maintained with a transaction and confirmation message unit sent between the Central Presentation and Selection servers 2000, Central Controller and Presentation Processor 1000, and those suppliers, vendors, service providers and purveyors.

The present invention will then ask the Buyer to choose a confirmation method. Choices of confirmation may be by phone, fax, email, confirmation number, or any requirements the Seller may select for proof of purchase. Once the Buyer chooses a method of confirmation, he can get a printout of the Seller's commitment for delivery, a confirmation number, or whatever means of confirmation determined by the Seller, As an example, he can even get a complete print-out of directions to the facility if the purchase involves him arriving at a place of lodging, restaurant, arena, store, or any other facility.

Network ID Card

This component of the present invention relates to the verification and substantiation of the purchase of access or admission to those services or events that traditionally have controlled access by means of tickets, passes, admission documents, reservations, reservation confirmations, or other substantiation at the facility, site, business, or venue.

The full implementation of the present invention makes the usual requirement of delivery of tickets, passes, admission confirmations, or reservation confirmations unnecessary. These traditional conveyance forms are replaced or augmented by the buyer's Reservation/Ticket Network ID card or confirmation of biometric ID. The present invention allows buyers of tickets, passes, admission documents, and reserved services to purchase or reserve those tickets, passes, admission documents, or services remotely.

The present invention allows the buyer to confirm or prove his purchase at the facility, site, business, or venue by means of his existing magnetic, smart, or optical ID card; by entry code, or by electronic biometric authentication. These means of proof can be approved by the operators of an instance either for exclusive use for that instance of the present invention, for multi-use in conjunction with other entities and the operators of the other instances of the present invention, or by a "piggy-back" method that will allow the issue or use of new or existing Credit Cards, Membership ID Cards, or other ID Cards.

For those services or events that require printed tickets, passes, admission documents, reservation confirmations, or other physical substantiation, those means of confirmation can be printed on demand from either automatic or manual vendors upon electronic reading or scanning of the buyer's ID card, entry of a code, or biometric authentication. Network or Delivery ID cards may be approved by either one operator of an instance of the present invention or a group of operators of different instances of the present invention with cross-use allowed. Network or Delivery IDs may be Single-use or Multi-use cards that are also access cards to the Network or Delivery ID.

Resource Saver Protocol

This component of the present invention provides a method and apparatus to control, coordinate, and synchronize the sales and availability of either common, unique, or time-sensitive products, goods, and services. The present invention does this while allowing for the purchase or reservation of these products, goods, and services through electronic networks and other diverse channels or outlets and keeping control of inventory to prevent overselling or overbooking. The preferred embodiment of the present invention utilizes the Resource Saver Protocol to reduce the number of messages sent and received by all components of the present invention while maintaining the control and synchronization of any qualified inventory that is interactively offered for sale. With the reductions in the quantity of messages needed to maintain inventory synchronization, there is a corresponding reduction in all other aspects of communications and processing overhead between the remote components and sales outlets.

The invention automatically updates all components of the present invention on multiple sites or media channels in a time-sensitive and time-appropriate basis. The automatic two-way network communications method of the present invention provides the necessary coordination of inventory and sales. With the added dimension of the Resource Saver Protocol, the Seller can divide his inventory into logical groups for marketing, presentation, and sales to the Buyer. Using a hotel as an example, the instance of the present invention is configured to represent Hotels and Lodging, and the Seller is a hotel with 312 rooms of the following types: 200 standard rooms, 100 upgrade rooms, and 12 suites.

The setup of the Resource Saver Protocol is accomplished within the Presentation and Configuration Program 4715 or the Seller Interface 4000. The Seller divides the inventory into its logical groups for marketing, presentation, and sales to the Buyer. In this case, the groups are standard rooms, upgrade rooms, and suites. Each item in each group of items must be substitutable with all the other items within that group.

If the inventory were not absolutely substitutable to any given Buyer, then the Seller would not use the Resource Saver Protocol in this inventory. That does not mean that all the Inventory items or groups of a Seller must either be or not be controlled by the Resource Saver Protocol. The Seller may have any combination of Inventory items or groups controlled or not controlled by the Resource Saver Protocol.

In the case of the current hotel example, the inventory is considered to be both Limited and Time Sensitive. There are only a limited number of rooms of each type, and they are time sensitive in the fact that the inventory is sold by the "unit night" which, if not sold and utilized by that night, can never be used or recovered.

The Seller must then set the maximum units of inventory that any given Buyer will be allowed to purchase in any given single transaction. In the hotel example, the Seller might set a limit of 5 rooms for any given Buyer to purchase from any Central Presentation and Selection Server 2000 or other outlets serviced by this instance of the present invention. By setting a reasonable maximum number of units of inventory that a Buyer may purchase, the Seller prevents that rare but possible case of a self-serve Buyer purchasing or reserving more inventories than is available. The Buyer is still allowed to purchase or reserve as much inventory as he likes, but the purchase must be transacted in sequential "maximum unit" transactions as opposed to one large transaction.

Next, the Seller sets a buffer number for each of the groups of items to be offered to the Buyer. The purpose of this buffer is to allow for a margin of error, based on processing time and communication delays, to prevent the overselling of inventory (overbooking in the hotel example). This number is an estimate intended to be adjusted, based on the Seller's experience over time. In the hotel example, the management might set the buffer number at 10 units (twice the maximum single purchase) as a starting point, to be adjusted later based on the Sellers experience.

Then the Seller must determine the Notification Level. This level equals the maximum purchase units a Buyer can make at one time plus the buffer number. For instance, if the Seller is a hotel, it has for purchase 200 units of the same type of room, the maximum purchase units are 5 rooms, and the buffer number is 10 rooms, then his Notification Level would be 15. This means that the Seller would receive transmissions from all of his outlets when a purchase is made, However, he would not have to communicate back to those outlets (via one transmission message to the Central Processor and Control Server 1000) until his remaining units reached or breached the available inventory level of 15 units. If the level were reached or breached, transmissions for units within the unit group would be communicated back and forth for each purchase from the available inventory level of 15 until all units are sold for that period of time.

A demonstration of the transmission savings for the example hotel would be as follows. There are 100 rooms available at the example hotel and 5 sale outlets or channels are used. Without the use of the Resource Protocol, 320 (80 messages each to 4 outlets) inventory update messages would have to be sent in order to accomplish the total individual booking of 80 rooms. Each outlet or channel would maintain the availability count for the rooms, and one update message for the booking of each room would be sent to each of the sale outlets or channels that did not originate a given sale. With presale verification of available inventory for each transaction, our same example hotel would receive and send a combination of 240 queries, responses, and updates (80 each) to reach the 80 rooms booked. The actual number could be much more because the 240 number assumes that each query results in a booking, whereas in actual practice, the experience would be that many queries did not result in booking. In addition, the buyer would be required to wait for the amount of time that it took for the transaction verification process to take place. That amount of time may or may not be significant, depending on several factors such as the current network use, network connection speeds, etc.

With the present invention, each sales outlet, channel, or other source of unique or time-sensitive products queries availability only after receiving notice of a predetermined inventory level or count. This means that with our example hotel, only 80 booking messages would he sent if the management sets the notification level (predetermined available inventory count) at 15 units remaining. This would cause a 66% to 80% savings of communications and computer resources. For our example hotel to reach 100% occupancy, the total message load would be 160 messages (100 booking plus 60 update to four outlets or channels). With verification being required, the total message load would be 190 (100 booking plus 60 update plus 30 queries and responses). This compares with a total of 500 messages without verification and 700 messages with verification (100 booking, plus 400 inventory update message, plus 200 queries and responses for verification), showing savings of 68% to 73%, depending on the method used after the notification level is reached or breached.

It should be noted that the savings generated are more substantial than they appear to be for some Seller types. This is because the typical total sales of inventory in any given period does not reach the level that triggers the notification of the Central Presentation and Selection Servers 2000 or other outlets and channels.

For more common or commodity-like products, goods, or services, there is little concern of overselling. In order to conserve on communication and other resources, the Resource Saver Protocol allows the electronic networks and traditional sales outlets, channels, or other sources of sales to batch or hold the sales transaction messages. These messages are then transmitted once a certain quantity has been sold, once a specified time period has passed, or a combination of both bases. The operator of a given instance of the present invention has the option of settings for transmission levels or transmission periods and specific transmission times, or general transmission times plus specific outlet offsets.

As an example, a Seller of music CDs who has sufficient inventory might set the transmission level at 35, the transmission period at 24 hours, and the transmission time at 01:00 AM plus any offset. This would then set the electronic networks and traditional sales outlets, channels, or other sources to either transmit transaction messages any time they are holding 35 transactions or more, transmit transaction messages at least every 24 hours, and/or transmit any remaining transactions at 01:00 AM plus any offset. The instruction for transmitting any remaining transactions at a specific time plus offset allows the Seller to set each outlet's specific transactions so that the transmissions are spread over some time frame. The Seller can then choose a time for transmission so he can take advantage of low processing and communications loads. The potential savings by using the present invention in connection with controlling the inventory and sales of common products, goods, or services are obvious but widely varied, based on the Seller's settings and goals.

Operators of the present invention may provide additional transaction certainty and verification in the form of "confirmation of the transaction" messages or "inventory count" and/or "sequence numbers" data fields with each transaction message. All of these methods are optional at the discretion of the operators of the instance of the present invention, based on their experience or concerns.

With the "confirmation of the transation" method, a confirmation message is sent back to the originating outlet, repeating or confirming each transaction message that has been sent. Although this doubles the message units passed between Sellers and outlets, these "confirmation of the transaction" messages can be sent at times of low processing and communications loads, thereby reducing the impact of their use. The use of these confirmation messages virtually reduces transmission errors to zero. This method can be used during initial periods to build operator confidence in the present invention more than as a method that is used all the time.

The "inventory count" is a field that is passed on all transaction messages where a total inventory has been established and each outlet is comparing and subtracting each sales transaction from that inventory. The establishment of total inventory or noticed inventory is based on whether or not the Seller is using the Notification Level method of monitoring and controlling inventory. If the Seller is not using that method, then the total inventory is known by the outlets and is used as the "inventory count" to be passed. If the Seller is using the Notification Level method, then the "inventory count" field is only included after the Notification Level has been reached or breached at the Seller's location and the Notification Level messages have been sent to the outlets. This "inventory count" is used by the present invention to verify that each component (Seller's location and all sales outlets) is synchronized as to the inventory level that all are working off of.

Although the embodiments of the present invention have been described in detail herein, it is to be understood that these descriptions are merely illustrative. The inventive system may be modified in a variety of ways and equivalents in order to suite a particular purpose while still employing the unique concepts set forth.

What is claimed is:

1. A method of using a network of computers to facilitate and control access, admission to facility, site, business, or venue comprising:
   a) providing means for a buyer to identify an existing drivers license, identification card, membership card, or academic identification card;
   b) providing means for a buyer to select the facility, site, business, or venue;
   c) providing means for transmitting buyer's said drivers license, identification card, membership card, or academic identification card information and said selection to the facility, site, business or venue; and
   d) providing means for verifying the buyer's drivers license, identification card, membership card, or academic identification card at the facility, site, business, or venue;

whereby the buyer may identify their existing drivers license, identification card, membership card, or academic identification card, select a facility, site, business, or venue and transmit that information to the facility, site, business or venue thereby gaining access or admission to the facility, site, business, or venue by presenting said drivers license, identification card, membership card, or academic identification card.

2. The method of claim 1 further providing an automatic vendor of tickets, passes, admission documents or access information at the facility, site, business, or venue.

3. The method of claim 1 further providing an automatic general access at the facility, site, business, or venue.

4. The method of claim 1 further providing means of transmitting buyer's payment information.

5. A method of using a network of computers to facilitate and control access, admission to sporting events comprising:
   a) providing means for a buyer to identify an existing identification document;
   b) providing means for a buyer to select the sporting event;
   c) providing means for transmitting buyer's said identification document information and said selection to the sporting event; and
   d) providing means for verifying the buyer's identification document at the sporting event;

whereby the buyer may identify their existing identification document, select a sporting event and transmit that information to the sporting event thereby gaining access or admission to the sporting event by presenting said existing identification document.

6. The method of claim 5 further providing an automatic vendor of tickets, passes, admission documents or access information at the sporting event.

7. The method of claim 5 further providing an automatic general access at the sporting event.

8. A method of using a network of computers to facilitate and control access, admission to reserved services comprising:
   a) providing means for a buyer to identify an existing identification document;
   b) providing means for a buyer to select the reserved service;
   c) providing means for transmitting buyer's said identification document information and said selection to the reserved service; and d) providing means for verifying the buyer's identification document at the reserved service;

whereby the buyer may identify their existing identification document, select a reserved service and transmit that information to the reserved service thereby gaining access or admission to the reserved service by presenting said existing identification document.

9. The method of claim 8 further providing an automatic vendor of tickets, passes, admission documents or access information at the reserved service.

10. The method of claim 8 further providing an automatic general access at the reserved service.

11. The method of claim 8 further providing for the admission to a facility, site or business where the reserved services are provided.

* * * * *